United States Patent [19]
Pawa et al.

[11] Patent Number: 5,913,164
[45] Date of Patent: Jun. 15, 1999

[54] CONVERSION SYSTEM USED IN BILLING SYSTEM FOR MOBILE SATELLITE SYSTEM

[75] Inventors: Robert L. Pawa; David R. Maxfield; Gary Nemirovsky; Jeffrey W. Duncan, all of Reston, Va.

[73] Assignee: AMSC Subsidiary Corporation, Reston, Va.

[21] Appl. No.: 08/598,556

[22] Filed: Feb. 8, 1996

Related U.S. Application Data

[60] Provisional application No. 60/007,803, Nov. 30, 1995.

[51] Int. Cl.$^6$ ........................................................ H04Q 7/24
[52] U.S. Cl. ........................ 455/427; 455/406; 455/411; 455/12.1
[58] Field of Search .................................. 455/427, 428, 455/430, 435, 11.1, 12.1, 13.1, 13.2, 410, 411, 426, 432, 433, 461, 406–408, 405; 370/316

[56] References Cited

U.S. PATENT DOCUMENTS

| | | | |
|---|---|---|---|
| 5,287,541 | 2/1994 | Davis et al. | 455/427 |
| 5,394,561 | 2/1995 | Freeburg | 455/427 X |
| 5,446,756 | 8/1995 | Mallinckrodt | 455/427 X |
| 5,526,404 | 6/1996 | Wiedeman et al. | 455/430 |
| 5,537,474 | 7/1996 | Brown et al. | 455/411 X |
| 5,664,006 | 9/1997 | Monte et al. | 455/427 X |

OTHER PUBLICATIONS

"North American Mobile Satellite System Signaling Architecture", Lawrence White et al., American Institute of Aeronautics and Astronautics, Inc., pp. 427–439. C. 1992.

"The AMSC/TMI Mobile Satellite Services (MSS) System Ground Segment Architecture", J. Lunsford, et al., American Institute of Aeronautics and Astronautics, Inc., pp. 405–426. C. 1992.

"Call Control in the AMSC Mobile Satellite Service System", William R.H. Tisdale, et al., Pre–Publication Review Copy, American Institute of Aeronautics and Astronautics, Mar. 1, 1994, pp. 1–13.

(List continued on next page.)

*Primary Examiner*—Reinhard J. Eisenzopf
*Assistant Examiner*—Philip J. Sobutka
*Attorney, Agent, or Firm*—Pepper Hamilton LLP

[57] ABSTRACT

In a mobile satellite system, a mobile communication system includes a system for managing a mobile satellite system and a mobile communication system responsively connected thereto for registration. The system includes a management system (CMIS) requesting registration of the mobile communication system in the satellite communication system and creating a CMIS record responsive thereto, and a protocol conversion system (DM). The DM performs the functions of receiving and converting the CMIS record to a common record, and transmitting the registration request to the central controller of the CGS. The DM also receives a registration acknowledgement from the central controller indicating that the registration request was completed by the CGS, converts the registration acknowledgement into the common record, and transmits the registration acknowledgement to the CMIS. The DM also receives a ready indication for a commissioning status message from the central controller, transmits the status change response to the CMIS indicating a ready for commissioning status. The DM receives and transmits to the CMIS an operational/failed status message indicating whether the mobile communication system was successfully commissioned.

26 Claims, 47 Drawing Sheets

OTHER PUBLICATIONS

"Westinghouse MSAT Mobile Terminal Channel Emulator", A. Fasulo et al., American Institute of Aeronautics and Astronautics, Inc., pp. 256–260 c 1993.

"MSAT Network Communications Controller and Network Operations Center", Tony Harvey et al., American Institute of Aeronautics and Astronautics, Inc., pp. 270–279 C 1993.

"MSAT and Cellular Hybrid Networking", Patrick W. Baranowsky II, W. Baranowsky Westinhouse Electronic Corporation Jun. 1993.

"Feederlink Earth Station to Provide Mobile Satellite Services in North America", Robert H. McCauley, et al., American Institute of Aeronautics and Astronautics, Jan./Feb. 1994, pp. 1–9.

"Radio Transmission in the Amercian Mobile Satellite System", Charles Kittiver, Amercian Institute of Aeronautics and Astronautics, Inc., pp. 280–294. c. 1994.

"Summary of the AMSC Mobile Telephone System", Gary A. Johanson, et al., American Institue of Aeronautics and Astronautics, Inc., pp. 1–11. c. 1994.

"Implementation of a System to Provide Mobile Satellite Services in North America", Gary A. Johanson, et al., presented at International Mobile Satellite Conference'93, Jun. 16–18, 1993.

"The American Mobile Satellite Corporation Space Segment", David J. Whalen, et al., pp. 394–404.

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| PARAMETER | BITS | FUNCTION |
| --- | --- | --- |
| PAGE NUMBER | 3 | PAGE NUMBER ASSOCIATED WITH THIS SU. |
| UPDATE NUMBER | 5 | INCREMENTED WHENEVER CONTENTS OF THIS PAGE ARE CHANGED |
| SU NUMBER | 8 | SEQUENCE NUMBER OF THIS SU IN THE PAGE. |
| RETRANSMISSION TIMEOUT | 8 | TIMEOUT VALUE FOR RETRANSMISSION MET-SR CHANNEL. SPECIFIED IN 100 ms INCREMENTS. NOMINALLY [10] |
| MAXIMUM RETRANSMISSIONS | 3 | MAXIMUM NUMBER OF RETRANSMISSIONS ALLOWED PER MESSAGE (0, 1, .. 7). NOMINALLY [4]. |
| RANDOMIZING INTERVAL | 5 | RANDOMIZATION INTERVAL USED FOR RETRANSMISSION. SPECIFIED IN 100 ms INCREMENTS. THIS INTERVAL IS DOUBLED FOR EVERY SUBSEQUENT RETRANSMISSION OF A SU. NOMINALLY [5]. |
| NUMBER OF REPEATS | 3 | NUMBER OF TIMES AN SU (COMMAND, RESPONSE) IS REPEATED TO IMPROVE CHANNEL ERROR PERFORMANCE. 0, 1, ... |
| RESPOND TO REPEAT COMMANDS | 1 | MET MUST RESPOND TO EACH REPEATED COMMAND SU. |
| REPEAT INTERVAL | 4 | INTERVAL BETWEEN REPEATS IN 100 MILLISECOND INCREMENTS. |
| CLIENT REF TIMEOUT | 4 | MGSP CLIENT REFERENCE TIMER VALUE IN SECONDS. |
| SERVER REF TIMEOUT | 4 | MGSP SERVER REFERENCE TIMER VALUE IN SECONDS. |
| ACCESS SECURITY FILL BITS | 24 | FILL BITS USED TO EXTEND THE PLAIN TEXT INPUT TO THE ACCESS SECURITY CHECK FIELD GENERATION PROCESS |

FIG. 18

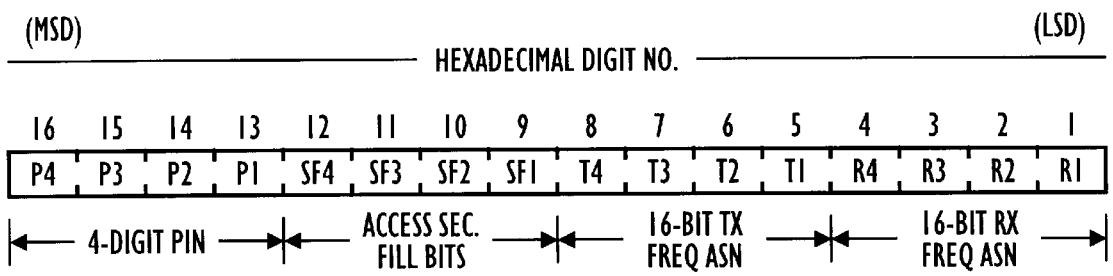

LEGEND: SFn = nth 4-BIT SEGMENT OF (LOWEST ORDER FOUR) ACCESS SECURITY
FILL BITS, REPRESENTED AS HEXADECIMAL CHARACTER, n = 1-4
Tn = nth 4-BIT SEGMENT OF TRANSMIT FREQUENCY ASSIGNMENT,
REPRESENTED AS HEXADECIMAL CHARACTER, n = 1-4
Rn = nth 4-BIT SEGMENT OF RECEIVE FREQUENCY ASSIGNMENT,
REPRESENTED AS HEXADECIMAL CHARACTER, n = 1-4
Pn = nth 4-BIT SEGMENT OF PIN CODE, REPRESENTED AS
HEXADECIMAL CHARACTER, n = 1-8

FIG. 20

| PARAMETER | BITS | FUNCTION |
|---|---|---|
| VIRTUAL NETWORK IDENTIFIER | 16 | IDENTIFIES THE VIRTUAL NETWORK ACCESSED |
| CALL IDENTIFIER | 24 | IDENTIFIES THE CALL |
| TRANSMIT FREQUENCY | 24 | TRANSMIT CHANNEL FREQUENCY |
| RECEIVE FREQUENCY | 24 | RECEIVE CHANNEL FREQUENCY |
| CHANNEL TYPE | 4 | IDENTIFIES MODULATION AND BANDWITH REQUIRED |
| EIRP | 4 | FES EIRP REQUIREMENT (REPRESENTED AS 2's COMPLEMENT BINARY WITH 1.0dB RESOLUTION) |
| SATELLITE ID | 3 | IDENTIFICATION OF SATELLITE |
| BEAM ID | 5 | IDENTIFICATION OF SATELLITE BEAM |
| CONTROL GROUP ID | 4 | INDICATES THE CONTROL GROUP ID |
| CHANNEL UNIT POOL (CUP) | 8 | INDICATES THE CONTROL UNIT POOL TO USE |
| MT SOFTWARE VERSION | 4 | INDICATES A SPECIFIC CCU SETUP (e.g. VOCODER TYPE) |
| CALL TYPE | 4 | CALL TYPE (e.g. VOICE, FAX, DATA)<br>000 - VOICE    0011 - 4800bps DATA<br>0001 - FAX     0100 - ALTERNATE VOICE/DATA<br>0010 - 2400 bps DATA |
| FFA VECTOR | 32 | FES FEATURE ACTIVATION VECTOR (A DETAILED DESCRIPTION AND FORMAT ARE PROVIDED IN SECTION A1-1.1.) |
| ACCESS SECURITY CHECK FIELD | 32 | USED TO VERIFY MET AUTHENTICITY |
| SECONDARY SECURITY CHECK FIELD | 32 | USED TO REVERIFY MET AUTHENTICITY |
| CALL COUNT VARIABLE CHECK FIELD | 16 | USED TO PROVIDE MET CCV AUTHENTICITY CHECK |
| AUTHENTICATION PROCEDURE DISABLE (APD) | 1 | USED TO DISABLE ACCESS SECURITY CHECK PROCEDURE<br>0 - PERFORM AUTHENTICATION PROCEDURE<br>1 - DO NOT PERFORM AUTHENTICATION PROCEDURE |
| CELLULAR ESN | 32 | USED BY GWS TO AUTHENTICATE MET |
| CALLED NUMBER OF DIGITS | 6 | INDICATES NUMBER OF DIGITS TO FELLOW |
| CALLED DIGIT n | 4 | HEXADECIMAL REPRESENTATION OF THE nth DIGIT IN THE CALLED NUMBER. |
| CALLING NUMBER OF DIGITS | 6 | INDICATES NUMBER OF DIGITS TO FOLLOW |
| CALLING DIGIT n | 4 | HEX REPRESENTATION OF THE nth DIGIT IN THE CALLED NUMBER. |

FIG. 21

| PARAMETER | BITS | FUNCTION |
|---|---|---|
| SCRAMBLING VECTOR | 16 | USED TO RESET THE SCRAMBLER. |
| ACCESS SECURITY CHECK FIELD | 32 | USED TO VERIFY MET AUTHENTICITY |
| BIT RATE | 4 | USED TO ESTABLISH END-TO-END BIT RATE FOR ASYNCHRONOUS DATA CALLS<br>0000 - 1200<br>0001 - 2400<br>0010 - 4800 |
| CHARACTER FORMAT | 4 | USED TO ESTABLISH CHARACTER FORMAT FOR ASYNCHRONOUS DATA CALLS<br>0000 - 1 START BIT, 7 DATA BITS, EVEN PARITY, 1 STOP BIT<br>0001 - 1 START BIT, 7 DATA BITS, ODD PARITY, 1 STOP BIT<br>0010 - 1 START BIT, 7 DATA BITS, NO PARITY, 2 STOP BITS<br>0011 - 1 START BIT, 7 DATA BITS, MARK, 1 STOP BIT<br>0100 - 1 START BIT, 7 DATA BITS, SPACE, 1 STOP BIT<br>0101 - 1 START BIT, 8 DATA BITS, NO PARITY, 1 STOP BIT |
| CALL COUNT VARIABLE (CCV) CHECK FIELD | 16 | USED TO PROVIDE MT CCV AUTHENTICATION CHECK |

FIG. 22

| EVENT | TRANSACTIONS | DIRECTION | VERB | OBJECT |
|---|---|---|---|---|
| INITIAL SERVICE (VOICE, DATA, FAX, AND/OR AVD) FOR A NEW MT WITH ONE OR MORE VN MEMBERSHIPS WITH CORRESPONDING SERVICES AND CALL BARRING | SEND MT INFO DATA | CMIS-DM | ADD | MT INFO |
| | SEND MT ASK | CMIS-DM | ADD | MT ACCESS |
| | SEND VN MEMBERSHIP DATA (1-16) | CMIS-DM | ADD | VN MEMBERSHIP |
| | SEND MT SERVICE DATA (1-64) | CMIS-DM | ADD | MT SERVICE |
| | SEND CALL BARRING LISTS (1-112) | CMIS-DM | ADD | CALL BARRING |
| | SEND REGISTRATION DATA | DM-NOC | ADD | MT |
| | SEND REGISTRATION RESPONSE | NOC-DM | | UPDATE RESULTS |
| | RESPOND TO EACH CMIS TRANSACTION | DM-CMIS | | RESPONSE (4-194) |
| | SEND UNSOLICITED MT STATUS CHANGE RESPONSE-REGISTERED | NOC-DM | | EVENT |
| | SEND UNSOLICITED MT STATUS CHANGE RESPONSE-REGISTERED | DM-CMIS | | MT STATUS CHANGE |
| | SEND UNSOLICITED MT STATUS CHANGE RESPONSE-READY FOR COMMISSIONING | NOC-DM | | EVENT |
| | SEND UNSOLICITED MT STATUS CHANGE RESPONSE-READY FOR COMMISSIONING | DM-CMIS | | MT STATUS CHANGE |
| | SEND UNSOLICITED MT STATUS CHANGE RESPONSE-OPERATIONAL OR FAILED | NOC-DM | | EVENT |
| | SEND UNSOLICITED MT STATUS CHANGE RESPONSE-OPERATIONAL OR FAILED | DM-CMIS | | MT STATUS CHANGE |

FIG. 27

* AT THIS POINT MT IS REGISTERED. IF FAILED AFTER COMMISSIONING TEST, ATTEMPT TO FIX OR REPLACE MT AND USE THE UPDATE MT STATUS TRANSACTION TO COMMUNICATE TO THE CGS THAT THE MT SHOULD NOW BE OPERATIONAL.

| EVENT | TRANSACTIONS | DIRECTION | VERB | OBJECT |
|---|---|---|---|---|
| CHANGE FEATURES ON EXISTING VOICE SERVICE | SEND MT DATA UPDATE<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | MODIFY<br>MODIFY | VN MEMBERSHIP<br>VN MEMBERSHIP<br>UPDATE RESULTS<br>RESPONSE |
| CHANGE EQUIPMENT ON EXISTING MT | SEND CUSTOMER CONFIG UPDATE<br>SEND CUSTOMER CONFIG UPDATE<br>RECEIVE UPDATE RESPONSE<br>RESPONSE TO CMIS TRANSACTION<br>PERFORM MT REGISTRATION<br>PROCESS TO ADD AS A NEW MT | CMIS-DM<br>DM-NOC<br>NOC-DM<br>DM-CMIS | DELETE<br>DELETE | MT<br>MT<br>UPDATE RESULTS<br>RESPONSE |
| ADD CALL BARRING VALUE ON EXISTING MT WHEN OTHER VALUES FOR THAT TYPE OF BARRING EXIST WITHIN THE VN MEMBERSHIP | SEND CALL BARRING ADD<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | ADD<br>ADD | CALL BARRING<br>CALL BARRING<br>UPDATE RESULTS<br>RESPONSE |
| ADD CALL BARRING ON EXISTING MT WITHIN A VN MEMBERSHIP THAT CURRENTLY HAS NO BARRING | SEND VN MEMBERSHIP<br>SEND CALL BARRING<br>SEND VN MEMBERSHIP<br>RECEIVE UPDATE RESPONSE<br>RESPONSE TO CMIS TRANSACTION<br>SEND CUSTOMER CONFIG UPDATE<br>RECEIVE UPDATE RESPONSE<br>RESPONSE TO CMIS TRANSACTION | CMIS-DM<br>CMIS-DM<br>DM-NOC<br>NOC-DM<br>DM-CMIS<br>DM-NOC<br>NOC-DM<br>DM-CMIS | MODIFY<br>ADD<br>MODIFY<br><br><br>ADD | VN MEMBERSHIP<br>CALL BARRING<br>VN MEMBERSHIP<br>UPDATE RESULTS<br>RESPONSE<br>CALL BARRING<br>UPDATE RESULTS<br>RESPONSE |
| REMOVE CALL BARRING LIST ON EXISTING MT SO THAT NO CALL BARRING REMAINS OF THAT TYPE WITHIN THE VN MEMBERSHIP. | SEND CALL BARRING<br>SEND UPDATED VN MEMBERSHIP<br>SEND CUSTOMER CONFIG UPDATE<br>RECEIVE UPDATE RESPONSE<br>RESPONSE TO CMIS TRANSACTION<br>SEND CUSTOMER CONFIG UPDATE<br>RECEIVE UPDATE RESPONSE<br>RESPONSE TO CMIS TRANSACTION | CMIS-DM<br>CMIS-DM<br>DM-NOC<br>NOC-DM<br>DM-CMIS<br>DM-NOC<br>NOC-DM<br>DM-CMIS | DELETE<br>MODIFY<br>DELETE<br><br><br>MODIFY | CALL BARRING<br>VN MEMBERSHIP<br>CALL BARRING<br>UPDATE RESULTS<br>RESPONSE<br>VN MEMBERSHIP<br>UPDATE RESULTS<br>RESPONSE |
| REMOVE CALL BARRING LIST ON EXISTING MT WHEN CALL BARRING REMAINS OF THAT TYPE WITHIN THE VN MEMBERSHIP. | SEND CALL BARRING<br>SEND CUSTOMER CONFIGURATION UPDATE<br>RECEIVE UPDATE RESPONSE<br>RESPONSE TO CMIS TRANSACTION | CMIS-DM<br>DM-NOC<br><br>NOC-DM<br>DM-CMIS | DELETE<br>DELETE | CALL BARRING<br>CALL BARRING<br><br>UPDATE RESULTS<br>RESPONSE |
| ADD VOICE SERVICE TO AN EXISTING MT WITH NO NEW FEATURES WITH FAX &/OR DATA WITHIN AN EXISTING VN MEMBERSHIP | SEND SERVICE<br>SEND CUSTOMER CONFIGURATION UPDATE<br>RECEIVE UPDATE RESPONSE<br>RESPONSE TO CMIS TRANSACTION | CMIS-DM<br>DM-NOC<br><br>NOC-DM<br>DM-CMIS | ADD<br>ADD | MT SERVICE<br>MT SERVICE<br><br>UPDATE RESULTS<br>RESPONSE |
| ADD VOICE SERVICE TO EXISTING MT WITH NEW FEATURES WITHIN AN EXISTING VN MEMBERSHIP | SEND SERVICE<br>SEND VN MEMBERSHIP<br>SEND CUSTOMER CONFIGURATION UPDATE<br>RECEIVE UPDATE RESPONSE<br>RESPONSE TO CMIS TRANSACTION<br>SEND CUSTOMER CONFIGURATION UPDATE<br>RECEIVE UPDATE RESPONSE<br>RESPONSE TO CMIS TRANSACTION | CMIS-DM<br>CMIS-DM<br>DM-NOC<br><br>NOC-DM<br>DM-CMIS<br>DM-CMIS<br><br>NOC-DM<br>DM-CMIS | ADD<br>MODIFY<br>ADD<br><br><br>MODIFY | MT SERVICE<br>VN MEMBERSHIP<br>MT SERVICE<br><br>UPDATE RESULTS<br>RESPONSE<br>VN MEMBERSHIP<br><br>UPDATE RESULTS<br>RESPONSE |

FIG. 29a

| | | | | |
|---|---|---|---|---|
| ADD FAX SERVICE TO AN EXISTING MT WITH DATA &/OR VOICE WITHIN AN EXISTING VN MEMBERSHIP | SEND SERVICE<br>SEND CUSTOMER CONFIGURATION UPDATE<br>RECEIVE UPDATE RESPONSE<br>RESPONSE TO CMIS TRANSACTION | CMIS-DM<br>DM-NOC<br><br>NOC-DM<br>DM-CMIS | ADD<br>ADD | MT SERVICE<br>MT SERVICE<br><br>UPDATE RESULTS<br>RESPONSE |
| ADD DATA SERVICE TO AN EXISTING MT WITH FAX &/OR VOICE WITHIN AN EXISTING VN MEMBERSHIP | SEND SERVICE<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | ADD | MT SERVICE<br>MT SERVICE<br>UPDATE RESULTS<br>RESPONSE |
| REMOVE VOICE, DATA AND/OR FAX SERVICE FOR A MT WITH ONE OR MORE SERVICES REMAINING WITHIN AN EXISTING VN MEMBERSHIP | SEND SERVICE<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | DELETE<br>DELETE | MT SERVICE<br>MT SERVICE<br>UPDATE RESULTS<br>RESPONSE |
| CHANGE PHONE NUMBER FOR AN EXISTING VOICE, DATA OR FAX SERVICE | SEND SERVICE<br>SEND SERVICE<br>SEND CUSTOMER CONFIG UPDATE<br>RECEIVE UPDATE RESPONSE<br>SEND CUSTOMER CONFIG UPDATE<br>RECEIVE UPDATE RESPONSE<br>RESPONSE TO CMIS TRANSACTION<br>RESPONSE TO CMIS TRANSACTION | CMIS-DM<br>CMIS-DM<br>DM-NOC<br>NOC-DM<br>DM-NOC<br>NOC-DM<br>DM-CMIS<br>DM-CMIS | DELETE<br>ADD<br>DELETE<br><br>ADD | MT SERVICE<br>MT SERVICE<br>MT SERVICE<br>UPDATE RESULTS<br>MT SERVICE<br>UPDATE RESULTS<br>RESPONSE<br>RESPONSE |
| CHANGE SERVICE ASSOCIATED WITH AN EXISTING SERVICE'S PHONE NUMBER | SEND SERVICE<br>SEND SERVICE<br>SEND CUSTOMER CONFIG UPDATE<br>RECEIVE UPDATE RESPONSE<br>SEND CUSTOMER CONFIG UPDATE<br>RECEIVE UPDATE RESPONSE<br>RESPONSE TO CMIS TRANSACTION<br>RESPONSE TO CMIS TRANSACTION | CMIS-DM<br>CMIS-DM<br>DM-NOC<br>NOC-DM<br>DM-NOC<br>NOC-DM<br>DM-CMIS<br>DM-CMIS | DELETE<br>ADD<br>DELETE<br><br>ADD | MT SERVICE<br>MT SERVICE<br>MT SERVICE<br>UPDATE RESULTS<br>MT SERVICE<br>UPDATE RESULTS<br>RESPONSE<br>RESPONSE |
| CHANGE SIGNALING PRIORITY OF AN EXISTING MT | SEND MT INFORMATION<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | MODIFY<br>MODIFY | MT INFORMATION<br>MT INFORMATION<br>UPDATE RESULTS<br>RESPONSE |
| CHANGE TRUNK ACCESS PRIORITY OF AN EXISTING MT | SEND VN UPDATE<br>SEND CUSTOMER CONFIG UPDATE<br>RECEIVE UPDATE RESPONSE<br>RESPONSE TO CMIS TRANSACTION | CMIS-DM<br>DM-NOC<br>NOC-DM<br>DM-CMIS | MODIFY<br>MODIFY | VN MEMBERSHIP<br>VN MEMBERSHIP<br>UPDATE RESULTS<br>RESPONSE |
| CHANGE SIGNALING PRIORITY AND TRUNK ACCESS PRIORITY OF AN EXISTING MT | SEND MT INFORMATION<br>SEND VN UPDATE<br>SEND CUSTOMER CONFIG UPDATE<br>SEND CUSTOMER CONFIG UPDATE<br>RECEIVE UPDATE RESPONSE<br>RESPONSE TO CMIS TRANSACTION<br>RECEIVE UPDATE RESPONSE<br>RESPONSE TO CMIS TRANSACTION | CMIS-DM<br>CMIS-DM<br>DM-NOC<br>DM-NOC<br>NOC-DM<br>DM-CMIS<br>NOC-DM<br>DM-CMIS | MODIFY<br>MODIFY<br>MODIFY<br>MODIFY | MT INFORMATION<br>VN MEMBERSHIP<br>MT INFORMATION<br>VN MEMBERSHIP<br>UPDATE RESULTS<br>RESPONSE<br>UPDATE RESULTS<br>RESPONSE |
| ADD SERVICE IN A NEW VIRTUAL NETWORK FOR AN EXISTING MT WITH NO CALL BARRING. NEW VN IS NOT THE DEFAULT | SEND VN MEMBERSHIP<br>SEND MT SERVICE<br>SEND CUSTOMER CONFIG UPDATE<br><br>RECEIVE UPDATE RESPONSE<br>RESPONSE TO CMIS TRANSACTION<br>RESPONSE TO CMIS TRANSACTION | CMIS-DM<br>CMIS-DM<br>DM-NOC<br><br>NOC-DM<br>DM-CMIS<br>DM-CMIS | ADD<br>ADD<br>ADD | VN MEMBERSHIP<br>MT SERVICE<br>VN MEMBERSHIP<br>(MT SERVICE)<br>UPDATE RESULTS<br>RESPONSE<br>RESPONSE |

FIG. 29b

| Scenario | Action | Protocol | Op | Object |
|---|---|---|---|---|
| ADD SERVICE WITH CALL BARRING IN A NEW VIRTUAL NETWORK FOR AN EXISTING MT. NEW VN IS NOT THE DEFAULT. | SEND VN MEMBERSHIP | CMIS-DM | ADD | VN MEMBERSHIP |
| | SEND MT SERVICE | CMIS-DM | ADD | MT SERVICE |
| | SEND CALL BARRING | CMIS-DM | ADD | CALL BARRING |
| | SEND CUSTOMER CONFIG UPDATE | DM-NOC | ADD | VN MEMBERSHIP (MT SERVICE) (CALL BARRING) |
| | RECEIVE UPDATE RESPONSE | NOC-DM | | UPDATE RESULTS |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| ADD SERVICE WITH CALL BARRING IN A NEW VIRTUAL NETWORK FOR AN EXISTING MT NEW VN IS THE DEFAULT. | SEND VN MEMBERSHIP | CMIS-DM | ADD | VN MEMBERSHIP |
| | SEND MT SERVICE | CMIS-DM | ADD | MT SERVICE |
| | SEND CALL BARRING | CMIS-DM | ADD | CALL BARRING |
| | SEND MT INFORMATION | CMIS-DM | MODIFY | MT INFORMATION |
| | SEND CUSTOMER CONFIG UPDATE | DM-NOC | ADD | VN MEMBERSHIP (MT SERVICE) (CALL BARRING) |
| | RECEIVE UPDATE RESPONSE | NOC-DM | | UPDATE RESULTS |
| | SEND CUSTOMER CONFIG UPDATE | DM-NOC | MODIFY | MT INFORMATION |
| | RECEIVE UPDATE RESPONSE | NOC-DM | | |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| REMOVE THE LAST SERVICE IN A VIRTUAL NETWORK FOR AN EXISTING MT WITH CALL BARRING. VN IS THE DEFAULT. (OTHER VN MEMBERSHIPS REMAIN) | SEND VN MEMBERSHIP | CMIS-DM | DELETE | VN MEMBERSHIP |
| | SEND MT SERVICE | CMIS-DM | DELETE | MT SERVICE |
| | SEND CALL BARRING | CMIS-DM | DELETE | CALL BARRING |
| | SEND MT INFORMATION | CMIS-DM | MODIFY | MT INFORMATION |
| | SEND CUSTOMER CONFIG UPDATE | DM-NOC | DELETE | VN MEMBERSHIP (MT SERVICE) (CALL BARRING) |
| | RECEIVE UPDATE RESPONSE | NOC-DM | | UPDATE RESULTS |
| | SEND CUSTOMER CONFIG UPDATE | DM-NOC | MODIFY | MT INFORMATION |
| | RECEIVE UPDATE RESPONSE | NOC-DM | | UPDATE RESULTS |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| REMOVE THE LAST SERVICE IN A VIRTUAL NETWORK FOR AN EXISTING MT WITHOUT CALL BARRING. VN IS THE DEFAULT. (OTHER VN MEMBERSHIPS REMAIN) | SEND VN MEMBERSHIP | CMIS-DM | DELETE | VN MEMBERSHIP |
| | SEND MT INFORMATION | CMIS-DM | DELETE | MT SERVICE |
| | SEND MT INFORMATION | CMIS-DM | MODIFY | MT INFORMATION |
| | SEND CUSTOMER CONFIG UPDATE | DM-NOC | DELETE | VN MEMBERSHIP (MT SERVICE) |
| | RECEIVE UPDATE RESPONSE | NOC-DM | | UPDATE RESULTS |
| | SEND CUSTOMER CONFIG UPDATE | DM-NOC | MODIFY | MT INFORMATION |
| | RECEIVE UPDATE RESPONSE | NOC-DM | | UPDATE RESULTS |
| | RESPONSE TO CMIS TRANSACTION | DM-CMIS | | RESPONSE |
| | RESPONSE TO CMIS TRANSACTION | DM-CMIS | | RESPONSE |
| | RESPONSE TO CMIS TRANSACTION | DM-CMIS | | RESPONSE |
| REMOVE THE LAST SERVICE IN A VIRTUAL NETWORK FOR AN EXISTING MT WITHOUT CALL BARRING. VN IS NOT THE DEFAULT. (OTHER VN MEMBERSHIPS REMAIN) | SEND VN MEMBERSHIP | CMIS-DM | DELETE | VN MEMBERSHIP |
| | SEND MT SERVICE | CMIS-DM | DELETE | MT SERVICE |
| | SEND CUSTOMER CONFIG UPDATE | DM-NOC | DELETE | VN MEMBERSHIP (MT SERVICE) |
| | RECEIVE UPDATE RESPONSE | NOC-DM | | UPDATE RESULTS |
| | RESPONSE TO CMIS TRANSACTION | DM-CMIS | | RESPONSE |
| | RESPONSE TO CMIS TRANSACTION | DM-CMIS | | RESPONSE |

FIG. 29c

| | | | | |
|---|---|---|---|---|
| REMOVE THE LAST SERVICE IN A VIRTUAL NETWORK FOR AN EXISTING MT AND NO OTHER VN MEMBERSHIPS REMAIN. | OPTION 1 : DELETE ENTIRE MT OR OPTION 2 : CHANGE MT STATUS TO DEACTIVE | | | |
| SASK NEEDS TO BE UPDATED FOR AN EXISTING MT | SEND MT ACCESS SEND CUSTOMER CONFIG UPDATE RECEIVE UPDATE RESPONSE RESPONSE TO CMIS TRANSACTION | CMIS-DM DM-NOC NOC-DM DM-NOC | MODIFY MODIFY | MT ACCESS MT ACCESS UPDATE RESULTS RESPONSE |
| CUSTOMER FAILS TO PAY BILL AND IS SUSPENDED FROM SERVICE - MT STATUS IS CHANGED TO DEAUTHORIZED | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - DEAUTH. SEND UNSOLICITED MT STATUS CHANGE RESPONSE - DEAUTH. SEND UPDATE RESPONSE | CMIS-DM DM-NOC NOC-DM DM-CMIS NOC-DM<br><br>DM-CMIS<br><br>CMIS-DM | MODIFY MODIFY | MT INFORMATION MT INFORMATION UPDATE RESULTS RESPONSE EVENT<br><br>MT STATUS CHANGE RESPONSE |
| CUSTOMER BRINGS PAYMENT HISTORY CURRENT AND IS RESTORED TO SERVICE - MT STATUS IS OPERATIONAL | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - OPERATIONAL SEND UNSOLICITED MT STATUS CHANGE RESPONSE - OPERATIONAL SEND UPDATE RESPONSE | CMIS-DM DM-NOC NOC-DM DM-CMIS NOC-DM<br><br>DM-CMIS<br><br>CMIS-DM | MODIFY MODIFY | MT INFORMATION MT INFORMATION UPDATE RESULTS RESPONSE EVENT<br><br>MT STATUS CHANGE RESPONSE |
| CUSTOMER REQUESTS A TEMPORARY SUSPENSION OF SERVICE - MT STATUS IS DEAUTHORIZED | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - DEAUTH. SEND UNSOLICITED MT STATUS CHANGE RESPONSE - DEAUTH. SEND UPDATE RESPONSE | CMIS-DM DM-NOC NOC-DM DM-CMIS NOC-DM<br><br>DM-CMIS<br><br>CMIS-DM | MODIFY MODIFY | MT INFORMATION MT INFORMATION UPDATE RESULTS RESPONSE EVENT<br><br>MT STATUS CHANGE RESPONSE |
| CUSTOMER REQUESTS SERVICE BE RESTORED AFTER A VOLUNTARY SUSPENSION - MT STATUS IS OPERATIONAL | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - OPERATIONAL SEND UNSOLICITED MT STATUS CHANGE RESPONSE - OPERATIONAL SEND UPDATE RESPONSE | CMIS-DM DM-NOC NOC-DM DM-CMIS NOC-DM<br><br>DM-CMIS<br><br>CMIS-DM | MODIFY MODIFY | MT INFORMATION MT INFORMATION UPDATE RESULTS RESPONSE EVENT<br><br>MT STATUS CHANGE RESPONSE |
| CUSTOMER SERVICE DETERMINES THAT FRAUD IS OCCURRING ON A PARTICULAR MT - MT STATUS IS DEAUTHORIZED | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - DEAUTH. SEND UNSOLICITED MT STATUS CHANGE RESPONSE - DEAUTH. SEND UPDATE RESPONSE | CMIS-DM DM-NOC NOC-DM DM-CMIS NOC-DM<br><br>DM-CMIS<br><br>CMIS-DM | MODIFY MODIFY | MT INFORMATION MT INFORMATION UPDATE RESULTS RESPONSE EVENT<br><br>MT STATUS CHANGE RESPONSE |
| GROUND SEGMENT DETECTS THAT A MT IS FRAUDULENTLY ATTEMPTING TO ACCESS THE NETWORK - MT STATUS IS DEAUTHORIZED | RECEIVE UNSOLICITED MT STATUS CHANGE RESPONSE - DEAUTH. SEND UNSOLICITED MT STATUS CHANGE RESPONSE - DEAUTH. SEND UPDATE RESPONSE | NOC-DM<br>DM-CMIS<br><br>CMIS-DM | | EVENT<br><br>MT STATUS CHANGE RESPONSE |

FIG. 29d

| | | | | |
|---|---|---|---|---|
| MT EXCEEDS ESTABLISHED CREDIT LIMIT - MT STATUS IS DEAUTHORIZED | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - DEAUTH. SEND UNSOLICITED MT STATUS CHANGE RESPONSE - DEAUTH. SEND UPDATE RESPONSE | CMIS-DM DM-NOC NOC-DM DM-CMIS NOC-DM DM-CMIS CMIS-DM | MODIFY MODIFY | MT INFORMATION MT INFORMATION UPDATE RESULTS RESPONSE EVENT MT STATUS CHANGE RESPONSE |
| CUSTOMER PAYS BALANCE TO HAVE AVAILABLE CREDIT - MT STATUS IS OPERATIONAL | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - OPERATIONAL SEND UNSOLICITED MT STATUS CHANGE RESPONSE - OPERATIONAL SEND UPDATE RESPONSE | CMIS-DM DM-NOC NOC-DM DM-CMIS NOC-DM DM-CMIS CMIS-DM | MODIFY MODIFY | MT INFORMATION MT INFORMATION UPDATE RESULTS RESPONSE EVENT MT STATUS CHANGE RESPONSE |
| MT HAS BEEN DEACTIVATED FOR A PERIOD OF TIME THAT INDICATES REMOVAL FROM CGS IS APPROPRIATE | SEND MT DELETION SEND MT DELETION RECEIVE DELETION ACKNOWLEDGMENT RESPONSE TO CMIS TRANSACTION | CMIS-DM DM-NOC NOC-DM DM-CMIS | DELETE DELETE | MT MT UPDATE RESULTS RESPONSE |
| GROUND SEGMENT DETECTS MALFUNCTIONING MT - STATUS IS A FAILED REPAIR | SEND UNSOLICITED MT STATUS CHANGE RESPONSE - FAIL/REPAIR SEND UNSOLICITED MT STATUS CHANGE RESPONSE - FAIL/REPAIR SEND UPDATE RESPONSE | NOC-DM DM-CMIS CMIS-DM | | EVENT MT STATUS CHANGE RESPONSE |
| EQUIPMENT FAILURE SUSPECTED BY CUSTOMER - REQUEST PVT AND RECEIVE RESULTS - CGS DETECTS FAILURE WHEN PVT PERFORMED | SEND MT INFORMATION SEND CUSTOMER CONFIG UPDATE RECEIVE UPDATE RESPONSE RESPONSE TO CMIS TRANSACTION RECEIVE PVT CALL RECORD SEND PVT RESULTS SEND UNSOLICITED MT STATUS CHANGE RESPONSE - FAIL/REPAIR SEND UNSOLICITED MT STATUS CHANGE RESPONSE - FAIL/REPAIR SEND UPDATE RESPONSE | CMIS-DM DM-NOC NOC-DM DM-CMIS NOC-DM DM-CMIS NOC-DM DM-CMIS CMIS-DM | MODIFY MODIFY | MT INFORMATION MT INFORMATION UPDATE RESULTS RESPONSE CALL RECORD PVT RESULTS EVENT MT STATUS CHANGE RESPONSE |

FIG. 29e-1

| | | | | |
|---|---|---|---|---|
| EQUIPMENT FAILURE SUSPECTED BY CUSTOMER - REQUEST PVT AND RECEIVE RESULTS - CGS DOES NOT DETECT FAILURE WHEN PVT PERFORMED | SEND MT INFORMATION SEND CUSTOMER CONFIG UPDATE RECEIVE UPDATE RESPONSE RESPONSE TO CMIS TRANSACTION RECEIVE PVT CALL RECORD SEND PVT RESULTS | CMIS-DM DM-NOC NOC-DM DM-CMIS NOC-DM DM-CMIS | MODIFY MODIFY | MT INFORMATION MT INFORMATION UPDATE RESULTS RESPONSE CALL RECORD PVT RESULTS |
| EQUIPMENT FAILURE REPORTED BY CUSTOMER - CHANGE MT STATUS IS FAILED/REPAIR | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - FAIL/REPAIR SEND UNSOLICITED MT STATUS CHANGE RESPONSE - FAIL/REPAIR SEND UPDATE RESPONSE | CMIS-DM DM-NOC NOC-DM DM-CMIS NOC-DM DM-CMIS CMIS-DM | MODIFY MODIFY | MT INFORMATION MT INFORMATION UPDATE RESULTS RESPONSE EVENT MT STATUS CHANGE RESPONSE |
| CUSTOMER REPORTS THAT MT IS REPAIRED - STATUS IS OPERATIONAL | SEND MT INFORMATION SEND CUSTOMER CONFIG UPDATE RECEIVE UPDATE RESPONSE RESPONSE TO CMIS TRANSACTION SEND UNSOLICITED MT STATUS CHANGE RESPONSE - OPERATIONAL SEND UNSOLICITED MT STATUS CHANGE RESPONSE - OPERATIONAL SEND UPDATE RESPONSE RECEIVE PVT CALL RECORD SEND PVT RESULTS | CMIS-DM DM-NOC NOC-DM DM-CMIS NOC-DM DM-CMIS CMIS-DM NOC-DM DM-CMIS | MODIFY MODIFY | MT INFORMATION MT INFORMATION UPDATE RESULTS RESPONSE EVENT MT STATUS CHANGE RESPONSE CALL RECORD PVT RESULTS |

FIG. 29e-2

| EVENT | TRANSACTIONS | DIRECTION | VERB | OBJECT |
|---|---|---|---|---|
| CUSTOMER INQUIRES ON SERVICE AND RECONCILIATION WITH CGS IS REQUIRED FOR A SINGLE MT WHILE CUSTOMER IS ON THE PHONE. CGS IS ABLE TO RETURN CONFIGURATION INFORMATION | REQUEST CUSTOMER CONFIG DATA<br>REQUEST CUSTOMER CONFIG DATA<br>RECEIVE CUSTOMER CONFIG DATA<br>SEND MT INFORMATION<br>SEND MT ASK<br>SEND VN MEMBERSHIP (1-16)<br>SEND MT SERVICE (1-64)<br>SEND CALL BARRING (1-112)<br>RESPONSE TO CMIS TRANSACTION | CMIS-DM<br>DM-NOC<br>NOC-DM<br>DM-CMIS<br>DM-CMIS<br>DM-CMIS<br>DM-CMIS<br>DM-CMIS<br>DM-CMIS | SHOW<br>SHOW | MT KEY<br>MT<br>MT<br>MT INFO<br>MT ACCESS<br>VN MEMBERSHIP<br>MT SERVICE<br>CALL BARRING<br>RESPONSE |
| CUSTOMER INQUIRES ON SERVICE AND RECONCILIATION WITH CGS IS REQUIRED FOR A SINGLE MT WHILE CUSTOMER IS ON THE PHONE. CGS IS UNABLE TO RETURN CONFIGURATION INFORMATION | REQUEST CUSTOMER CONFIG DATA<br>REQUEST CUSTOMER CONFIG DATA<br>RECEIVE UPDATE RESPONSE<br>RESPONSE TO CMIS TRANSACTION | CMIS-DM<br>DM-NOC<br>NOC-DM<br>DM-CMIS | SHOW<br>SHOW | MT KEY<br>MT<br>UPDATE RESULTS<br>RESPONSE |
| INITIATE ROUTINE BATCH RECONCILIATION BETWEEN THE CMIS INTERNAL DATABASE AND THE CGS CGS IS ABLE TO COMMENCE UNLOAD | REQUEST CUSTOMER CONFIG DATA<br>REQUEST CUSTOMER CONFIG DATA<br>RECEIVE RESPONSE<br>RESPONSE TO CMIS TRANSACTION<br>NOTIFY TRANSFER FILE<br>RESPONSE TO CMIS TRANSACTION | CMIS-DM<br>DM-NOC<br>NOC-DM<br>DM-CMIS<br>NOC-DM<br>DM-CMIS | UNLOAD<br>UNLOAD | MT KEY<br>MT<br>UPDATE RESULTS<br>RESPONSE<br><br>RESPONSE |
| INITIATE ROUTINE BATCH RECONCILIATION BETWEEN THE CMIS INTERNAL DATABASE AND THE CGS CGS IS UNABLE TO COMMENCE UNLOAD | REQUEST CUSTOMER CONFIG DATA<br>REQUEST CUSTOMER CONFIG DATA<br>RECEIVE RESPONSE<br>RESPONSE TO CMIS TRANSACTION | CMIS-DM<br>DM-NOC<br>NOC-DM<br>DM-CMIS | UNLOAD<br>UNLOAD | MT KEY<br>MT<br>UPDATE RESULTS<br>RESPONSE |
| RECONCILIATION WITH THE CGS PROVES THAT THE NOC DATABASE REQUIRES UPDATING FOR MTs | REQUEST CUSTOMER UPLOAD<br>SEND LIST OF FILE NAMES<br>RECEIVE UPDATE RESPONSE<br>RESPONSE TO CMIS TRANSACTION | CMIS-DM<br>DM-NOC<br>NOC-DM<br>DM-CMIS | LOAD<br>LOAD | <br><br>UPDATE RESULTS<br>RESPONSE |

FIG. 31

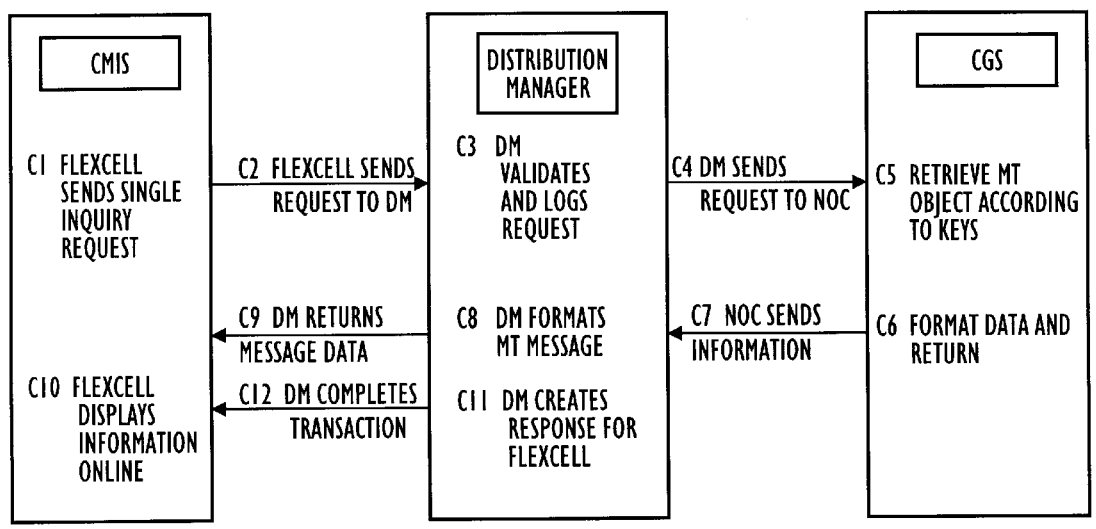

FIG. 32

| EVENT | TRANSACTIONS | DIRECTION | OBJECT |
|---|---|---|---|
| MT TO MT (SAME BEAM) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (SAME BEAM) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (SAME BEAM) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (SAME BEAM) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (SAME BEAM) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (ONE MT IN ALASKA/ HAWAII BEAM) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (ONE MT IN ALASKA/ HAWAII BEAM) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (ONE MT IN ALASKA/ HAWAII BEAM) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (ONE MT IN ALASKA/ HAWAII BEAM) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (ONE MT IN ALASKA/ HAWAII BEAM) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (BOTH MTs IN THE ALASKA/HAWAII BEAM) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (BOTH MTs IN THE ALASKA/HAWAII BEAM) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (BOTH MTs IN THE ALASKA/HAWAII BEAM) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (BOTH MTs IN THE ALASKA/HAWAII BEAM) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO MT (BOTH MTs IN THE ALASKA/HAWAII BEAM) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (48 STATES) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (48 STATES) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |

FIG. 34a

| EVENT | TRANSACTIONS | DIRECTION | OBJECT |
|---|---|---|---|
| MT TO LAND (48 STATES) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (48 STATES) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (48 STATES) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (48 STATES) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (48 STATES) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (48 STATES) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (48 STATES) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (48 STATES) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (ALASKA/HAWAII) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (ALASKA/HAWAII) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (ALASKA/HAWAII) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (ALASKA/HAWAII) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT (ALASKA/HAWAII) TO LAND (ALASKA/HAWAII) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (INTERNATIONAL) MTS VOICE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (INTERNATIONAL) MTS FAX CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (INTERNATIONAL) MTS DATA CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (INTERNATIONAL) MTS VOICE USING ONE FEATURE CALL HAS BEEN COMPLETED. | RECEIVE UNSOLICITED CSRs SEND CALL RECORD BATCH | NOC-DM DM-CMIS | CALL SUMMARY CALL SUMMARY |
| MT TO LAND (INTERNATIONAL) MTS VOICE USING MULTIPLE FEATURES CALL HAS BEEN COMPLETED. | RECEIVE UNSOLICITED CSRs SEND CALL RECORD BATCH | NOC-DM DM-CMIS | CALL SUMMARY CALL SUMMARY |

FIG. 34b

| EVENT | TRANSACTIONS | DIRECTION | OBJECT |
|---|---|---|---|
| MT (ALASKA/HAWAII) TO LAND (INTERNATIONAL) MTS VOICE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| MT (ALASKA/HAWAII) TO LAND (INTERNATIONAL) MTS FAX CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| MT (ALASKA/HAWAII) TO LAND (INTERNATIONAL) MTS DATA CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| MT (ALASKA/HAWAII) TO LAND (INTERNATIONAL) MTS VOICE USING ONE FEATURE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| MT (ALASKA/HAWAII) TO LAND (INTERNATIONAL) MTS VOICE USING MULTIPLE FEATURES CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT MTS VOICE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT MTS FAX CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT MTS DATA CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT MTS VOICE USING ONE FEATURE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT MTS VOICE USING MULTIPLE FEATURES CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT (ALASKA/HAWAII) MTS VOICE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT (ALASKA/HAWAII) MTS FAX CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT (ALASKA/HAWAII) MTS DATA CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT (ALASKA/HAWAII) MTS VOICE USING ONE FEATURE CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| LAND TO MT (ALASKA/HAWAII) MTS VOICE USING MULTIPLE FEATURES CALL HAS BEEN COMPLETED. | RECEIVE UNSOLICITED CSRs<br>SEND CALL RECORD BATCH | NOC-DM<br>DM-CMIS | CALL SUMMARY<br>CALL SUMMARY |
| PRIVATE VOICE NETWORK SERVICE CALL IS COMPLETED. | OUT OF SCOPE | | |

FIG. 34c

CONVERSION SYSTEM USED IN BILLING SYSTEM FOR MOBILE SATELLITE SYSTEM

This application claims the benefit of U.S. Provisional application No. 60/007,803, filed Nov. 30, 1995.

TECHNICAL FIELD

The present invention relates generally to a satellite communication network system, and more particularly, to administration of a satellite communication network system providing access to a mobile earth terminal satellite communication device. The mobile earth terminal (MET) provides voice, data, and facsimile transmission between mobile earth terminals and feederlink earth stations (FESs) that act as gateways to public networks or base stations associated with private networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. Then the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC. The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC. The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES. The FES supports communications links between METs, the PSTN, private networks, and other METs. Once a channel is established with an MET, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET. The MET provides the mobile user access to the communications channels and services provided by the satellite network system. A range of terminal types has been defined for the satellite network system.

RMS. The RMS monitors L-band RF spectrum and transmission performance in specific L-band beams. An RMS is nominally located in each L-band beam. Each RMS interfaces with the NOC via either a satellite or terrestrial link.

STS. The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-converts these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

There is a general need for an integrated mobile telephone that can be used to transmit to, and receive from, a satellite in a satellite communication system in a secure manner. It is also desirable for the satellite communication system to be able to administer and manage the METs that utilize the system for communication. In this connection, we have discovered that to manage the satellite communications network system, it is advantageous to interpose between the satellite communications network system and the administration system an intermediary system that is designed to facilitate communication therebetween. We have further discovered that this intermediary system is able to perform administration processing functions that would normally have been performed by the administration system, thereby removing additional processing requirements from the administration system.

Accordingly, it is desirable to provide a satellite communications network administration system that effectively and efficiently manages the satellite communications network.

It is also desireable to provide a satellite communications network administration system that includes an intermediary system that is designed to facilitate communication between the administration system and the satellite communications network.

It is also desirable to provide a satellite communications network administration system that includes an intermediary system that also administers the satellite communications network as well, thereby eliminating processing responsibility from the administration system.

It is also desirable to provide a satellite communications network administration system that collects and formats data for distribution to other systems in the satellite communications network system.

It is also desirable to provide a satellite communications network administration system that audits the progress of various transactions in the satellite communications network system.

It is further desirable to provide a satellite communications network administration system that logs data for audit and recovery purposes in the satellite communications network system.

It is further desirable to provide a satellite communications network administration system that converts protocols in the satellite communications network system.

SUMMARY OF THE INVENTION

It is a feature and advantage of the satellite communications network administration system to effectively and efficiently manage the satellite communications network.

It is a feature and advantage of the invention to provide a satellite communications network administration system that includes an intermediary system that is designed to facilitate communication between the administration system and the satellite communications network.

It is another feature and advantage of the invention to provide a satellite communications network administration system that includes an intermediary system that also administers the satellite communications network as well, thereby eliminating processing responsibility from the administration system.

It is also a feature and advantage of the invention to provide a satellite communications network administration system that collects and formats data for distribution to other systems in the satellite communications network system.

It is another feature and advantage to provide a satellite communications network administration system that audits the progress of various transactions in the satellite communications network system.

It is another feature and advantage to provide a satellite communications network administration system that logs data for audit and recovery purposes in the satellite communications network system.

It is another feature and advantage to provide a satellite communications network administration system that converts protocols in the satellite communications network system.

The present invention is based, in part, on the identification of the problem or need to effectively and efficiently administer the satellite communication system. We have discovered in relation thereto that an intermediary system provides significant advantages for the administration system while still permitting or maintaining the administration system to appropriately administer the satellite communications system. In accordance with the features of the present invention, controls are introduced to maximize administration functions to appropriately manage and monitor the satellite communications network from the perspective of the administration system. To accomplish the above, we have discovered that the following transactions/features (as well as additional features discussed below) must be considered/incorporated for an effective satellite communication network administration system:

MET Registration Transaction

Customer Configuration Update Transaction

Customer Configuration Inquiry/Reconciliation Transaction

Call Record Processing Transaction

Performance Verification Test Request Transaction

Assignment of Virtual Network Transaction

MET Class Assignment Transaction

SASK Assignment Transaction

To achieve these and other features and advantages of the present invention, an administration system for a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, diplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data.

The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

The administration system manages a mobile satellite system and a mobile communication system responsively connected thereto for registration. The system includes a management system (CMIS) requesting registration of the mobile communication system in the satellite communication system and creating a CMIS record responsive thereto, and transmitting the CMIS record, and a protocol conversion system (DM), responsively connected to the CMIS. The DM performs the functions of receiving and converting the CMIS record to a common record, and transmitting the registration request to the central controller of the CGS, and updating the log status to transmitted to the CGS. The DM also performs the functions of receiving a registration acknowledgement from the central controller indicating that the registration request was completed by the CGS, converting the registration acknowledgement into the common record and logging the registration acknowledgement, transmitting the registration acknowledgement to the CMIS, and receiving a ready indication for a commissioning status message from the central controller. The DM further performs the functions of converting the ready indication into the common record and logging the ready indication, transmitting the status change response to the CMIS indicating that the mobile communication system is ready to be commissioned, and receiving an operational/failed status message indicating whether the mobile communication system was successfully commissioned. The DM also performs the functions of converting the operational/failed status message into the common record and logging the operational/failed status message, and transmitting the status change response to the CMIS indicating that the mobile communication system is the one of operational and failed.

In another embodiment of the invention, a method of managing a mobile satellite system and a mobile communication system responsively connected thereto for registration is provided. The method includes the steps of:

(a) requesting registration of the mobile communication system in the satellite communication system in a management system (CMIS) and creating a CMIS record;

(b) transmitting the CMIS record from the CMIS to a protocol conversion system (DM);

(c) converting, via the DM, the CMIS record to a common record;

(d) transmitting, by the DM, the registration request to the central controller of the CGS, and updating the log status to transmitted to the CGS;

(e) receiving, by the DM, a registration acknowledgement from the central controller indicating that the registration request was completed by the CGS;

(f) converting, by the DM, the registration acknowledgement into the common record and logging the registration acknowledgement;

(g) transmitting, by the DM, the registration acknowledgement to the CMIS;

(h) receiving, by the DM, a ready indication for a commissioning status message from the central controller;

(i) converting, by the DM, the ready indication into the common record and logging the ready indication;

(j) transmitting, by the DM, the status change response to the CMIS indicating that the mobile communication system is ready to be commissioned;

(k) receiving, by the DM, an operational/failed status message indicating whether the mobile communication system was successfully commissioned;

(l) converting, by the DM, the operational/failed status message into the common record and logging the operational/failed status message; and (m) transmitting, by the DM, the status change response to the CMIS indicating that the mobile communication system is the one of operational and failed.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 18 is a diagram of a bulletin board in the satellite communication system;

FIG. 20 is a diagram of the form of the "plain text input" used in the PIN-inclusive ASCF generation process;

FIG. 21 is a diagram of a CHA message;

FIG. 22 is a diagram of a scrambling vector SU that is sent by the MET to initialize the descrambler at the FES and for call security;

FIG. 27 is a table of the basic transactions between the CMIS, DM and CGS systems for MET registration;

FIGS. 29a–29e are tables of update transactions illustrating the effected components;

FIG. 31 is a table of configuration inquiry/reconciliation transactions illustrating the effected components;

FIGS. 32 and 33 are block diagrams for the configuration inquiry and reconciliation transactions illustrating the effected components, respectively;

FIGS. 34a–34c are tables of call record processing transactions illustrating the effected components;

BEST MODE FOR CARRYING OUT THE INVENTION

Figure 1:
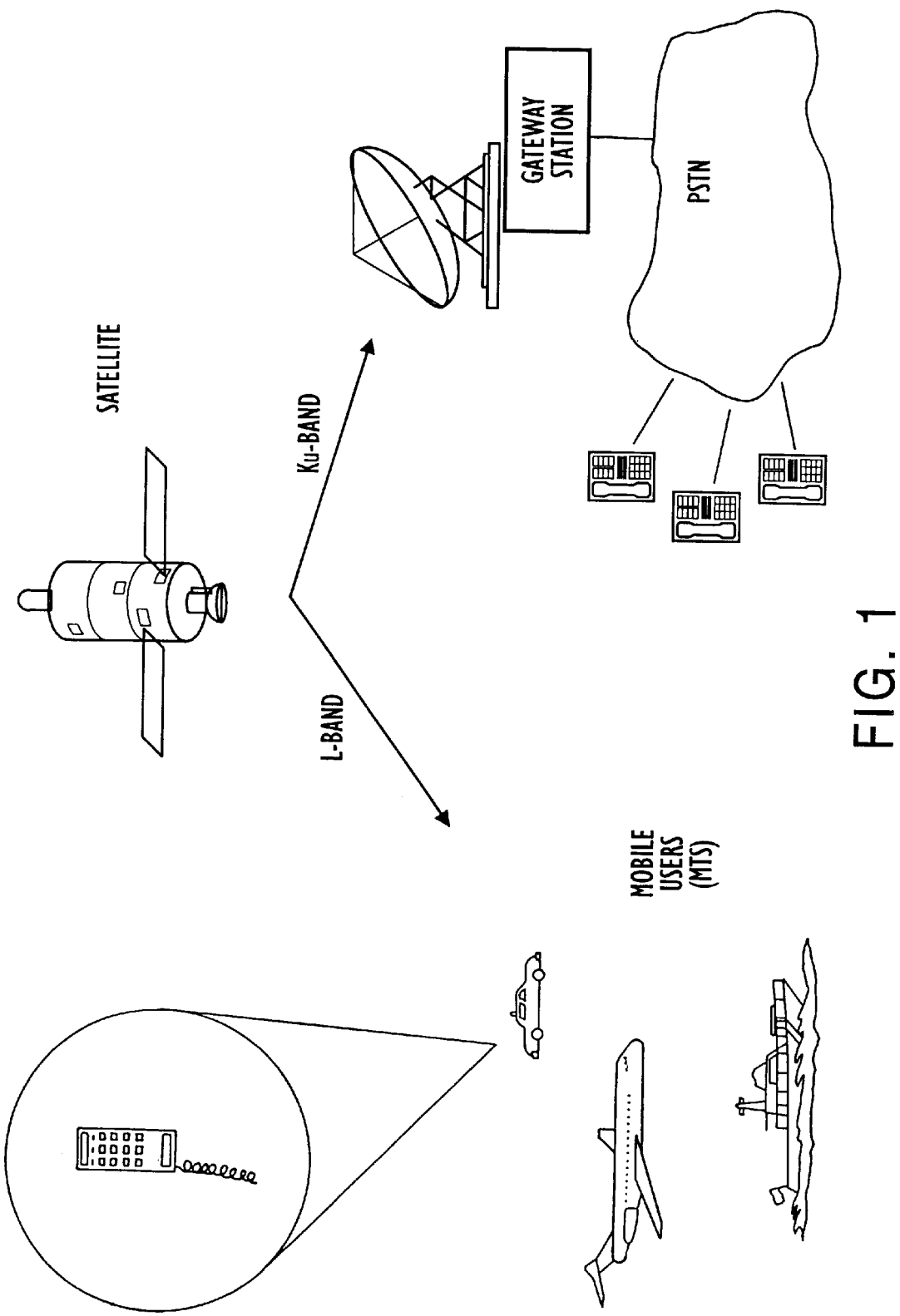
FIG. 1 is a diagram illustrating an overview of the satellite network system.
Figure 3:
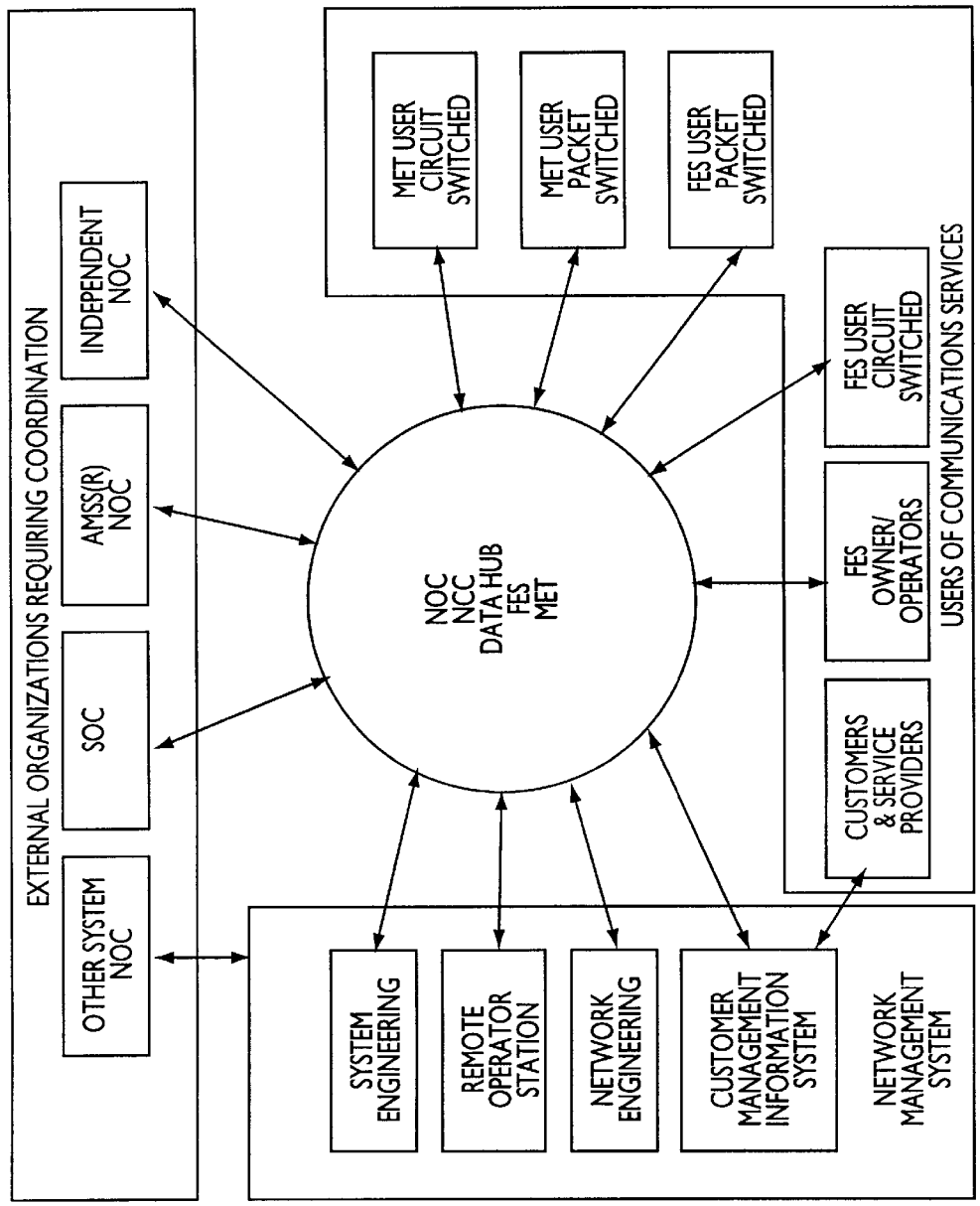
FIG. 3 is a diagram of the satellite network system illustrating components and respective interfaces.
Figure 4:
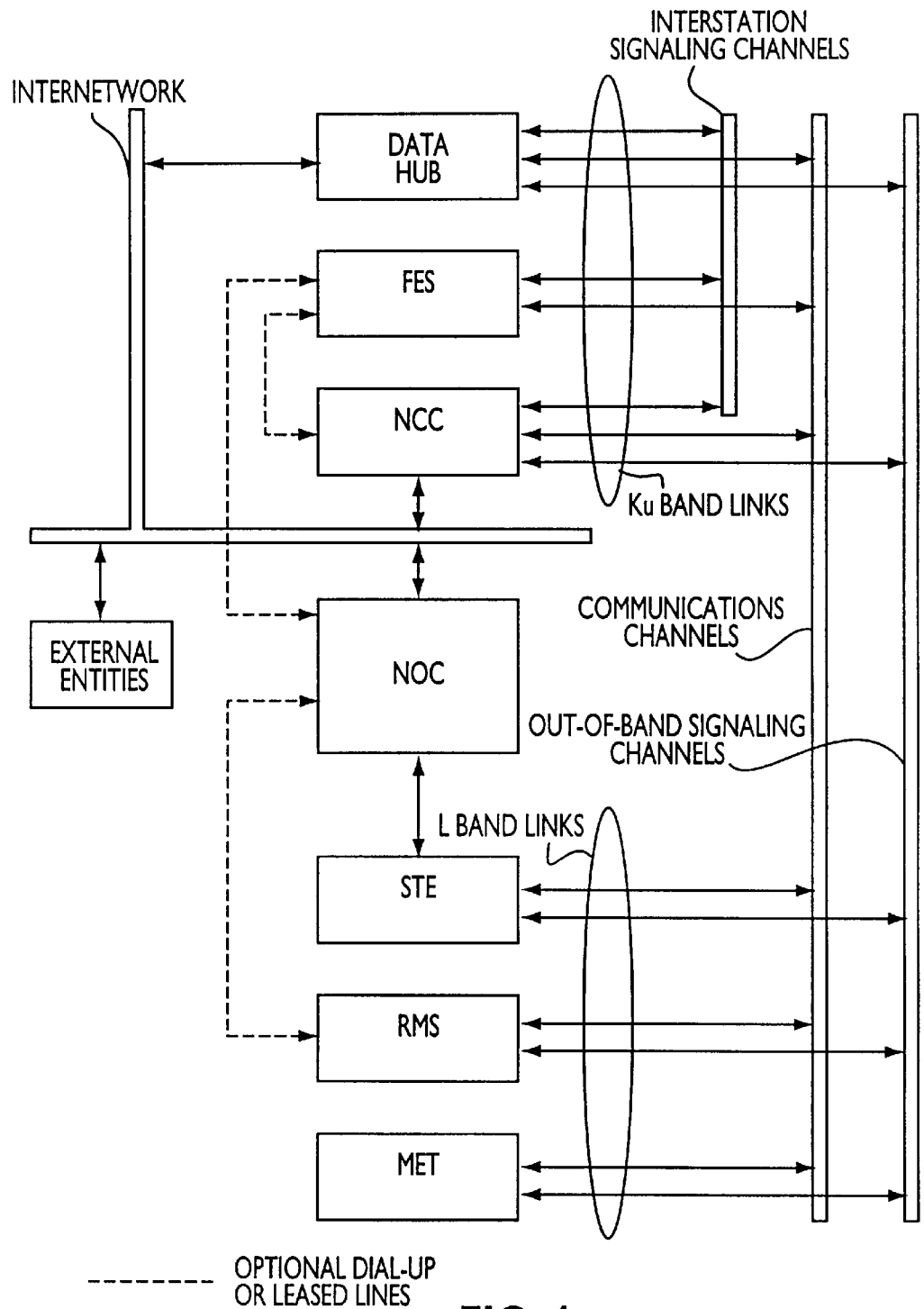
FIG. 4 is a diagram of a satellite network system illustrating a number of system elements and their interconnecting communications links.
Figure 5:
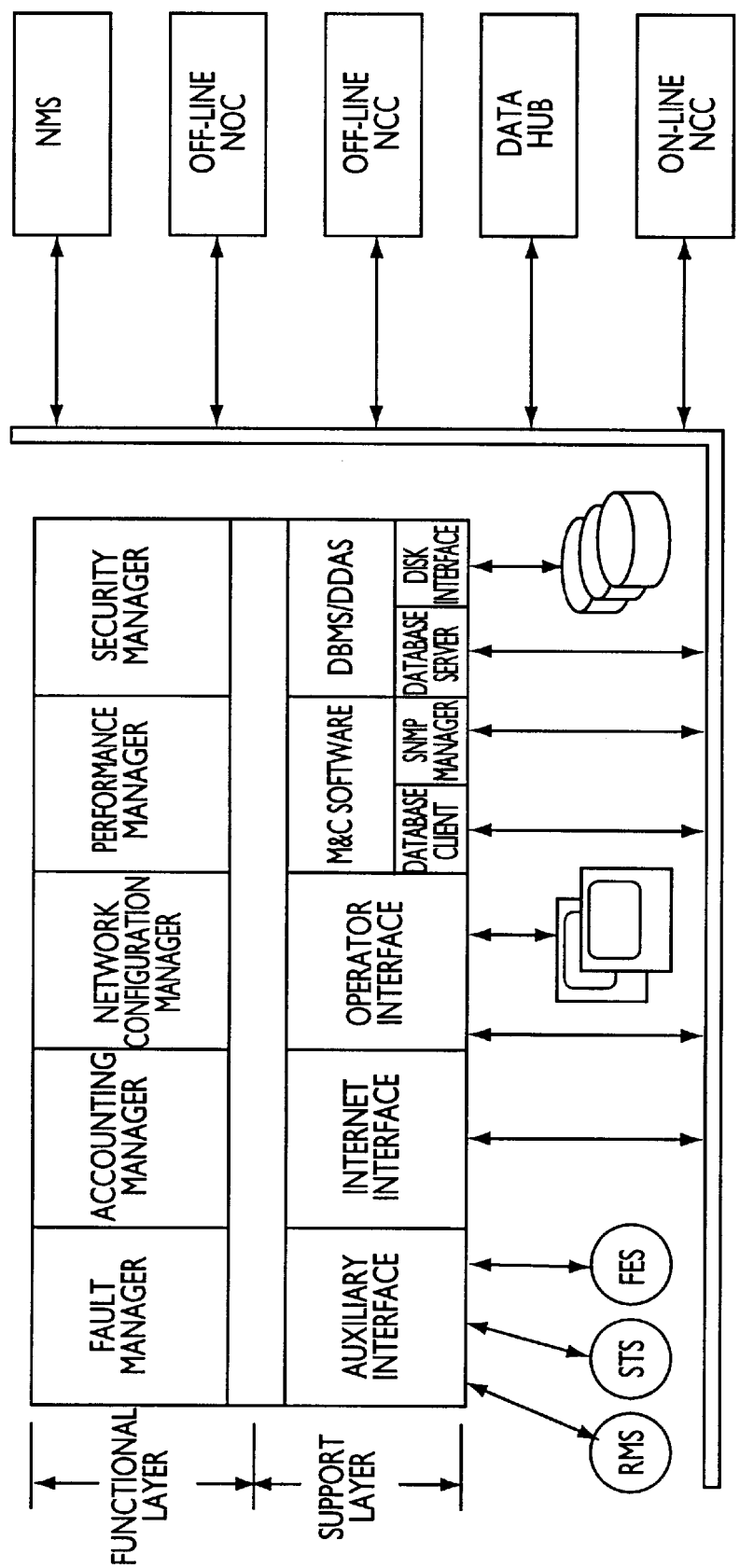
FIG. 5 is a basic block diagram of the NOC and its interfaces.
Figure 6:
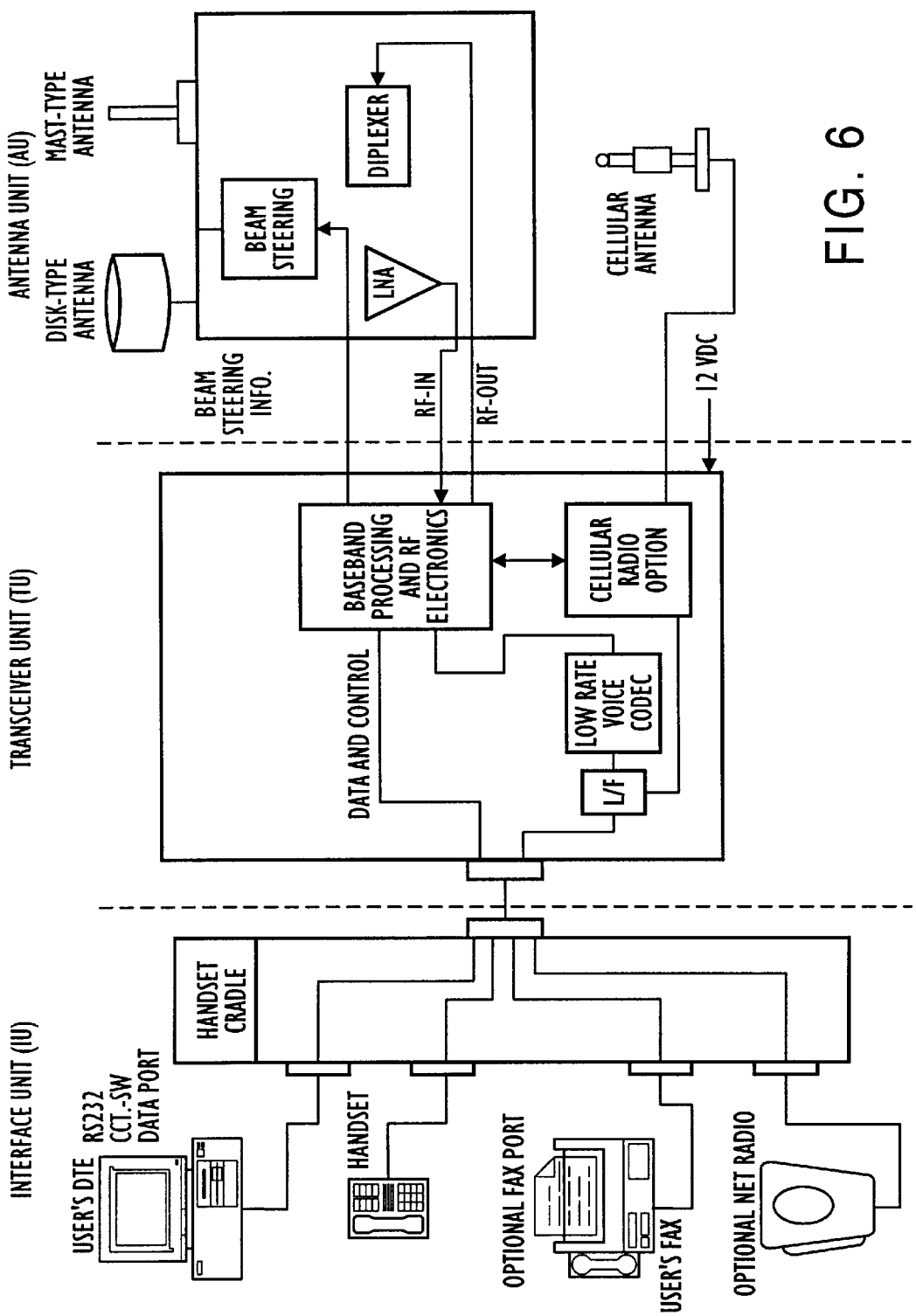
FIG. 6 is a basic block diagram of the physical architecture of the mobile earth terminal.
Figure 7:
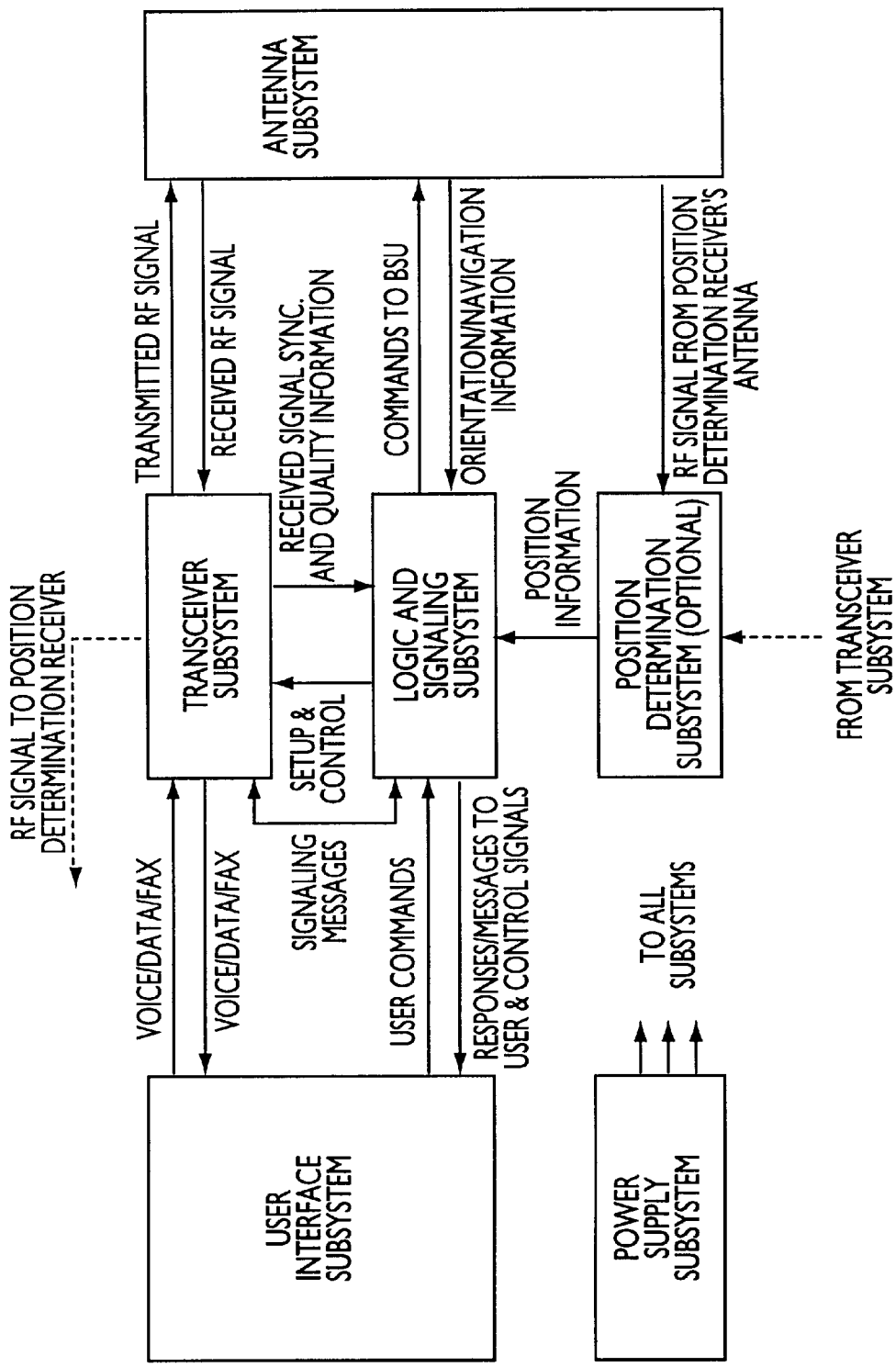
FIG. 7 is a basic block diagram of the functions of the mobile earth terminal.

The MET includes all of the communication and control functions necessary to support communications from a vehicle or fixed remote site using the resources of the satellite network system. FIGS. 6 and 7 are basic block diagrams of the physical architecture and functions of the mobile earth terminal. The basic functional diagram of FIG. 7 is implemented by baseband processing and RF electronics of FIG. 6. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 7 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 8A:
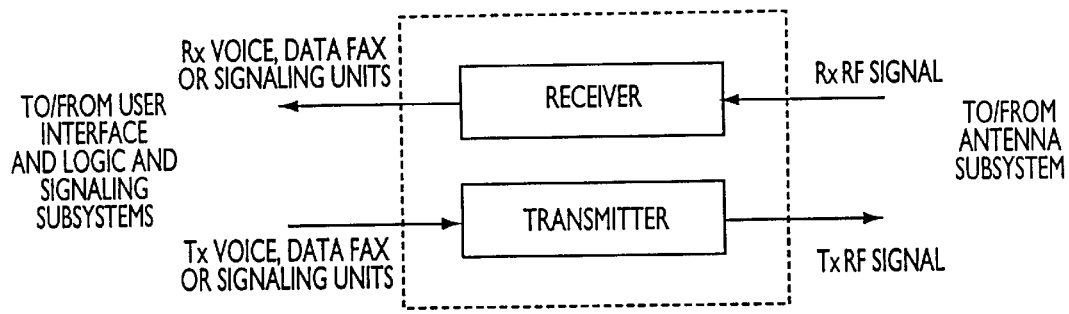
FIGS. 8a–8c are diagrams of different transceiver configurations.
Figure 8B:
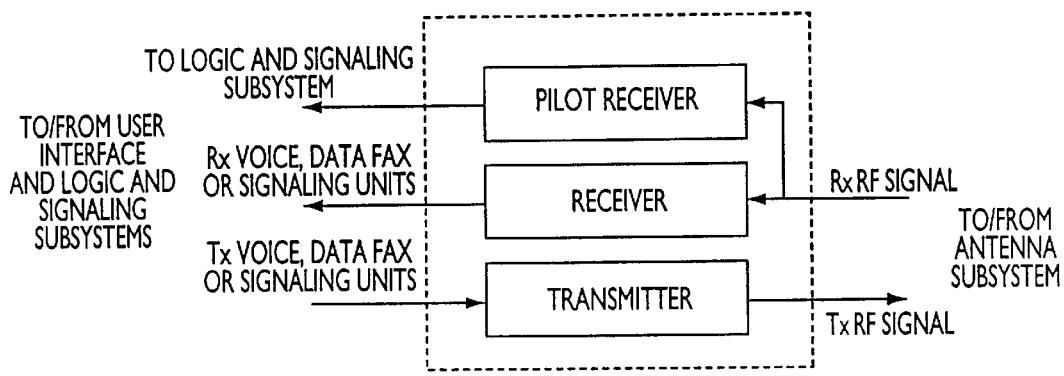
Figure 8C:
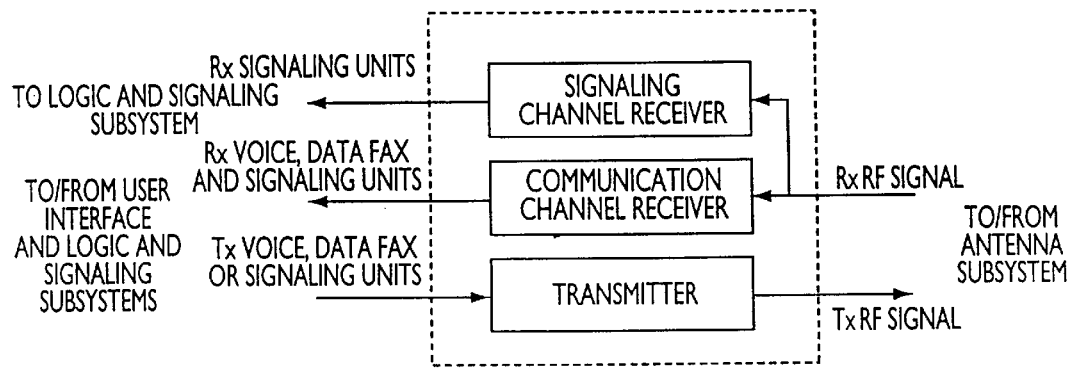

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 8(a)–8(c).

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other system.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553–1989 "Cellular System Mobile Station—Land Station Compatibility Standard"; EIA/TIA-557; EIA/IS-54B.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs. |
| MET-ST | Inbound TDMA signaling channel from the MET to the GC. |
| MET-SR | Inbound random access signaling channel from the MET to the GC. |
| FES-C | Outbound communications and inband signaling channel from an FES to a MET. |
| MET-C | Inbound communications and inband signaling channel from a MET to an FES. |
| GC-I | Interstation signaling channel from the GC to an FES. |
| FES-I | Interstation signaling channel from an FES to the GC. |

Figure 9:
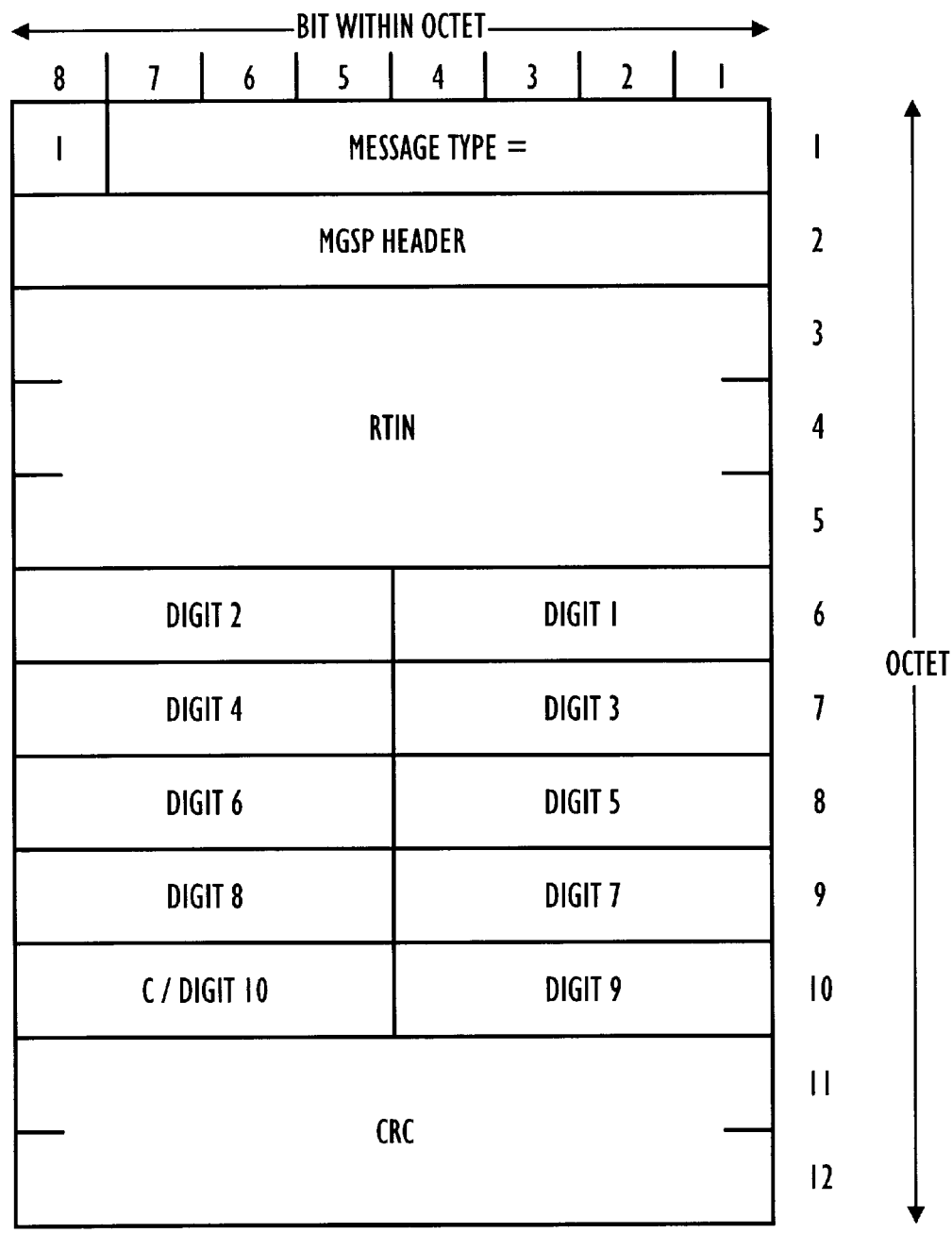
FIG. 9 is a diagram of the format of a typical signalling unit.
Figure 9A:
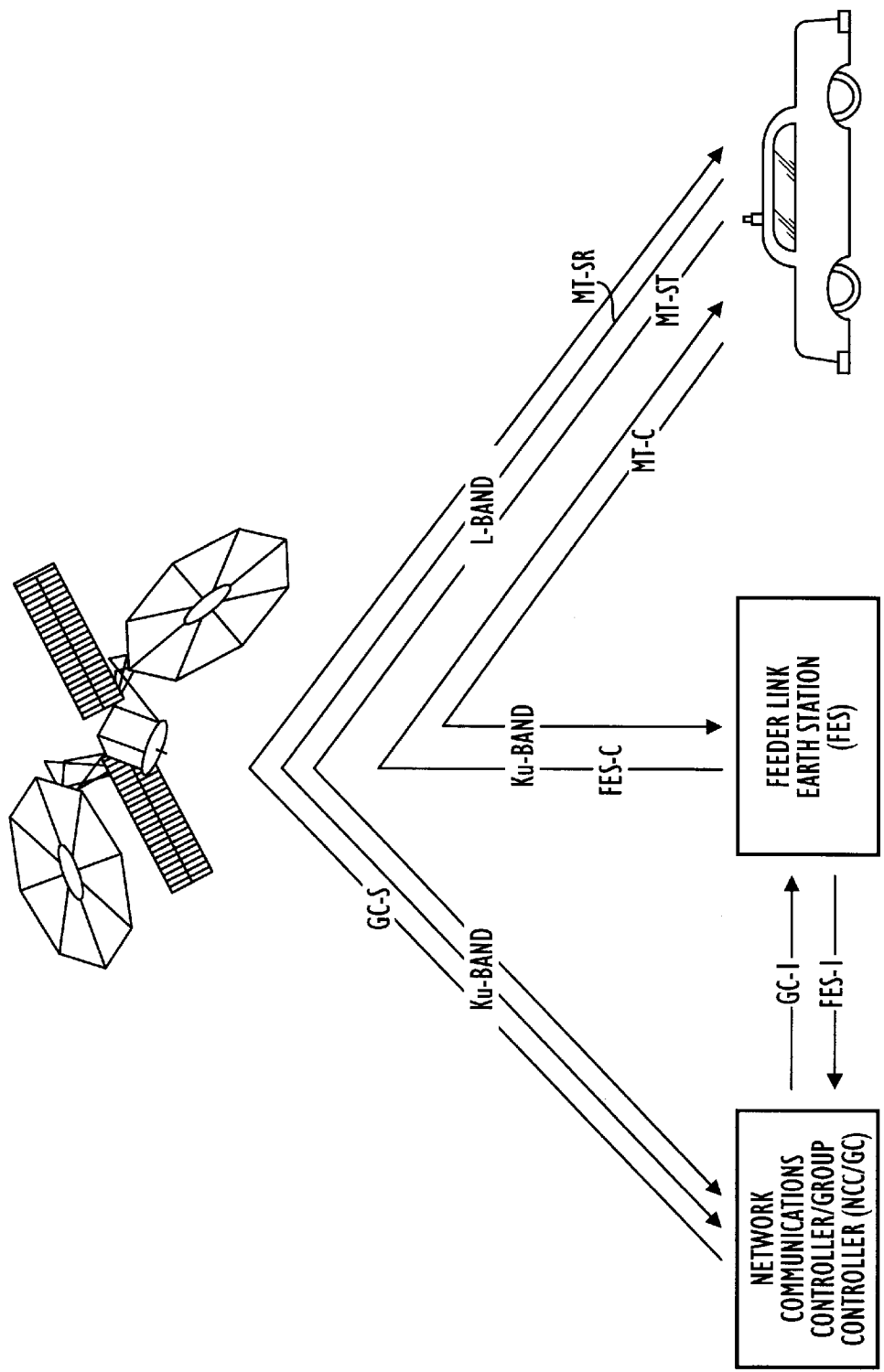
FIG. 9a illustrates the basic signalling architecture in the satellite communication system.

FIG. 9a illustrates the basic signalling architecture in the satellite communication system.

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. The SU itself may take a variety of forms, depending on its use. The format of a typical SU, in this case a MET request for access, is shown in FIG. 9. For transmission, the SU is convolutionally encoded at either rate ¾ or ½, adding an additional 32 or 96 bits respectively.

For the example given in FIG. 9, the meanings of the various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number the MET's Electronic Serial Number, by which it identifies itself in transmissions on the MET-SR channel.

Digits 1–10: The first 10 digits of the addressed telephone number in the PSTN or private network, in hexadecimal. If the loth digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. The frame formats and relationships of the out of band signaling channels are shown in FIG. 10.

Figure 10:
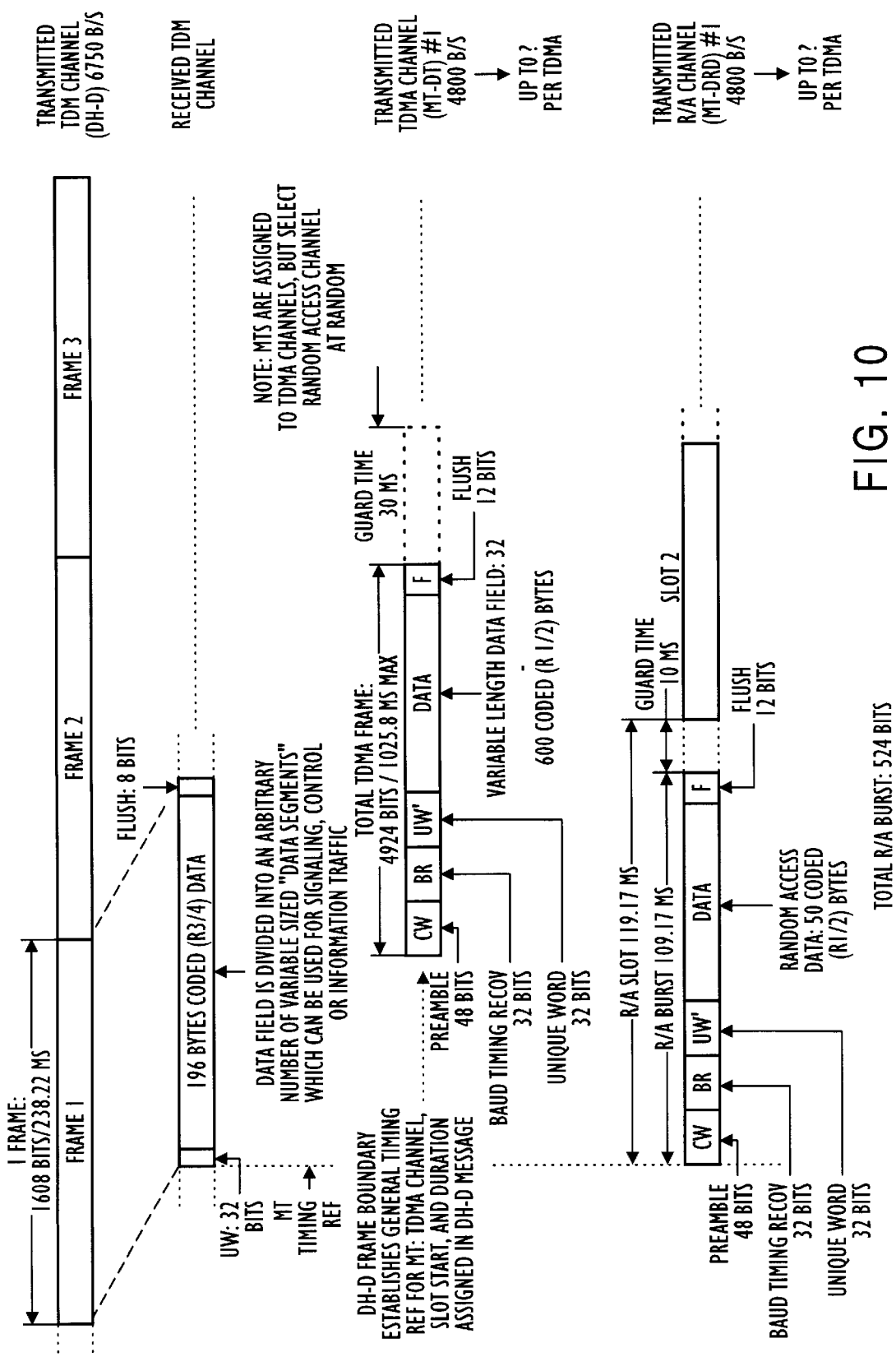
FIG. 10 is a diagram of the frame formats and relationships of the out of band signaling channels.

In FIG. 10, all timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate ¾ coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate ½ coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by is out-of-band signaling on the GC-S, MET-SR and MET-ST channels. This phase culminates in assignment of a pair of communication channels to the MET and FES. When these elements receive and tune to the communication channels, further signaling and control functions are accomplished using in-band signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

Figure 11:
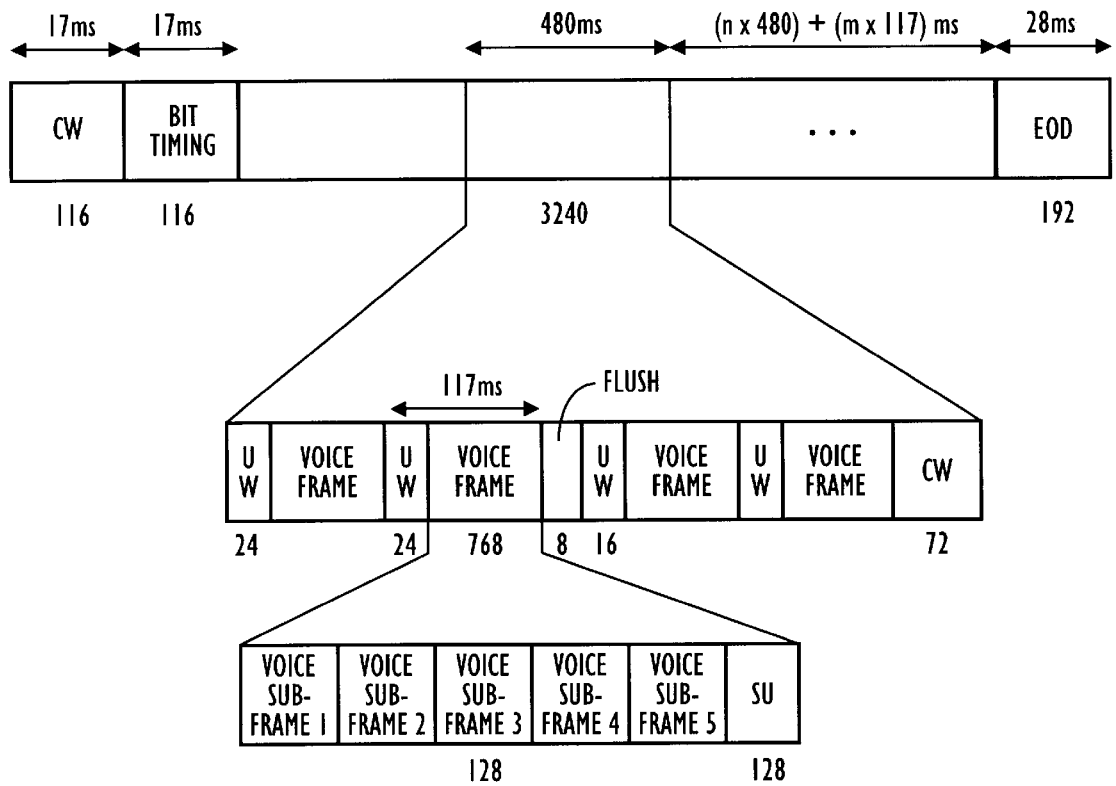
FIG. 11 is a diagram of a typical example of a communication channel format, in this case voice mode in-band signaling.

The same 96-bit SU described above is used to accomplish in-band signaling. A typical example of a communication channel format, in this case voice mode in-band signaling is shown in FIG. 11.

The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to GC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METs. In addition, the Outbound TDM channel carries network status information which is received by all METs in a particular beam and control group. The outbound TDM channel operates at a rate of 6750 bits/s with rate ¾ FEC. QPSK modulation and nominally 7.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate ¾ FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting.

Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. 24 of these channels may be required system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames containing in-band signaling messages employ a unique word different from that used for frames containing only voice subframes.

Interstation signaling channels (GC-1 and FES-1) are used to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-1 and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller is that L-band beam. Assignment of METs to outbound TDM channels is made based on a special identifier assigned to each MET as commissioning. This identifier is called the GC-S selector identifier code (GSI). The MET selects the outbound TDM channel to be used by dividing the GSI by the total number of outbound TDM channels available in the given beam. The remainder of the four bit binary division process will form the number of the channel to be used. Each MET will receive only the outbound TDM channel assigned to it. This method allows METs in the same logical grouping to be assigned to the same outbound TDM channel as is needed for the Net Radio Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate ¾ constraint length K=7 convolutional code.

The outbound TDM superframe has a duration of 360 ms and is made up of three outbound TDM frames. The superframe duration is the basic time interval over which message repetitions are done. Repetitions are used to increase the reliability of outbound TDM signaling units. Messages can be repeated in consecutive superframes. Studies by AUSSAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "filler" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate ¾ convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel Δt sooner than MET B, where Δt corresponds to the difference in propagation times to the satellite for the two terminals. As a result, if both METs synchronize their transmit timing to their reception of the outbound TDM channel, MET B's responses to messages will take 2Δt longer to reach the satellite than MET A's responses. As additional guard time of 1 symbol time also must be included to account for the ±½ symbol synchronization uncertainty in the MET. This results in a total guard time requirement of 2Δt+1 symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low throughput, one of the prime goals in its design is that it be bandwidth efficient.

The frequencies used for the random access channels are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

Figure 12:
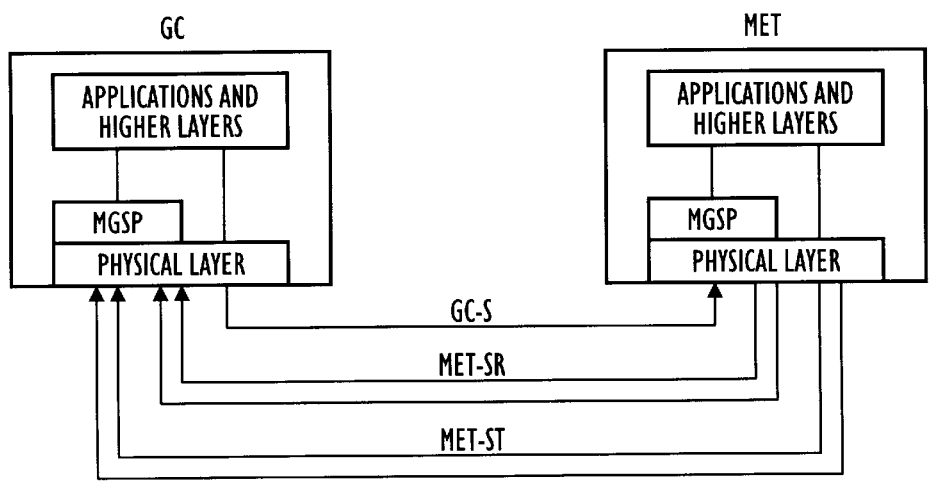
FIG. 12 is a diagram of the relationship of MGSP to other signaling layers in the GC and the MET.

The relationship of MGSP to other signaling layers in the GC and the MET is shown in FIG. 12. A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. Only one outstanding transaction exists between a MET and a GC in a given direction. However, two simultaneous transactions, one in each direction, are supported between a GC and a MET. MGSP also provides a only-way message service, that does not require a response from the receiver.

Figure 13:
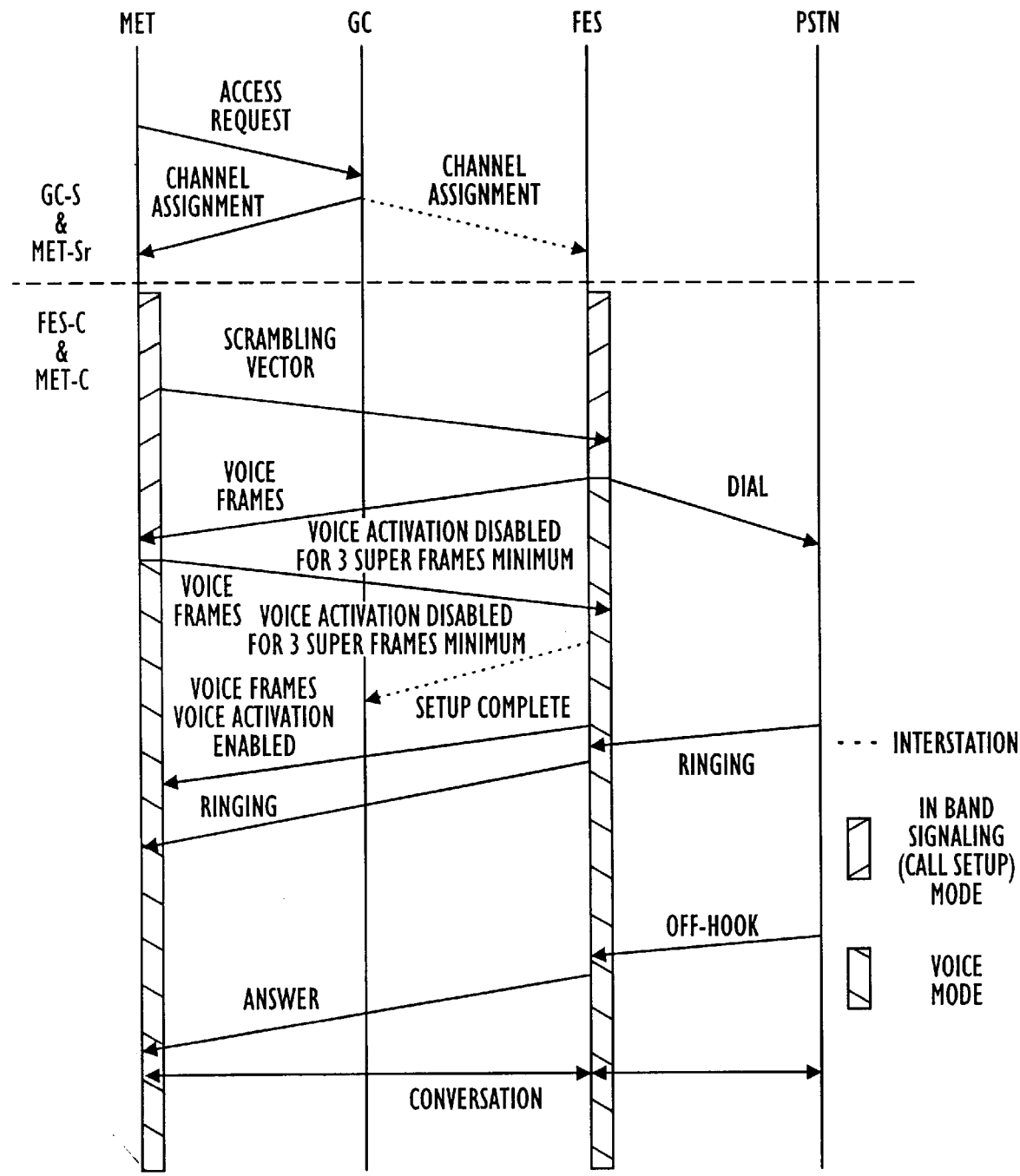
FIG. 13 is a diagram of the improved call setup protocol used to establish a MET originated voice call.

The improved call setup protocol used to establish a MET originated voice call is shown in FIG. 13. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. After receiving the scrambling vector message, the FES and the MET switch from call setup mode to voice frame mode and the FES completes the call to the terrestrial network user.

Figure 14:
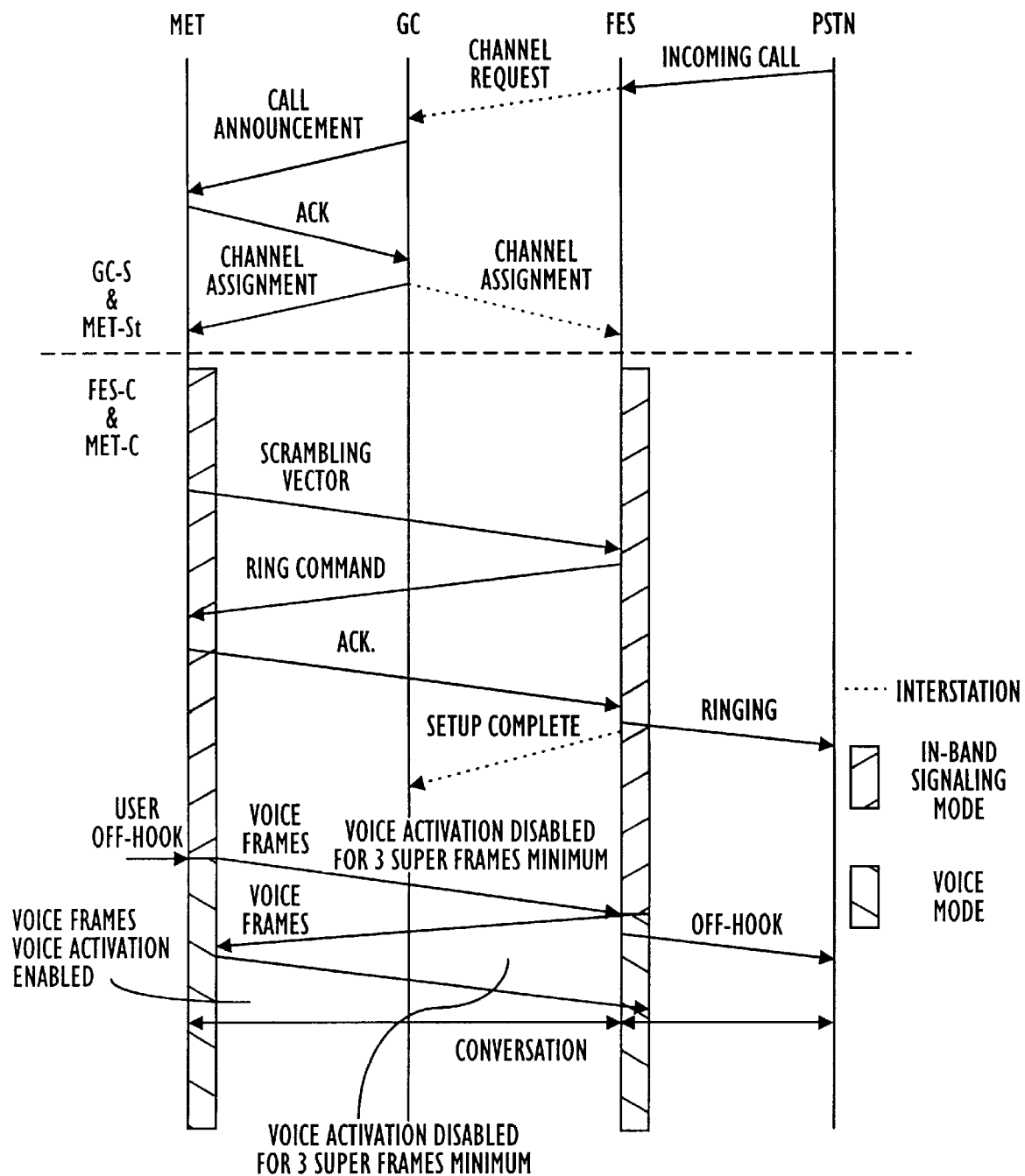
FIG. 14 is a diagram of the improved protocol used for PSTN originated calls.

The improved protocol used for PSTN originated calls is shown in FIG. 14. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET. The call is then completed to the MET user.

MET to MET calls are set up using a double hop connection through an FES. These calls are set up by the group controller and the FES as a MET to PSTN call setup concatenated with a PSTN to MET call setup. As a result the METs require no additional call processing for MET to MET calls. A MET authenticates its identity upon each commissioning event, performance verification event, and call setup event. The authentication process is based upon the use of an encryption function and a MET Access Security Key (ASK) to form an authorization code (the Access Security Check Field) from a random variable (the MET transmit and receive frequency assignments) at the beginning of each event.

Figure 15:
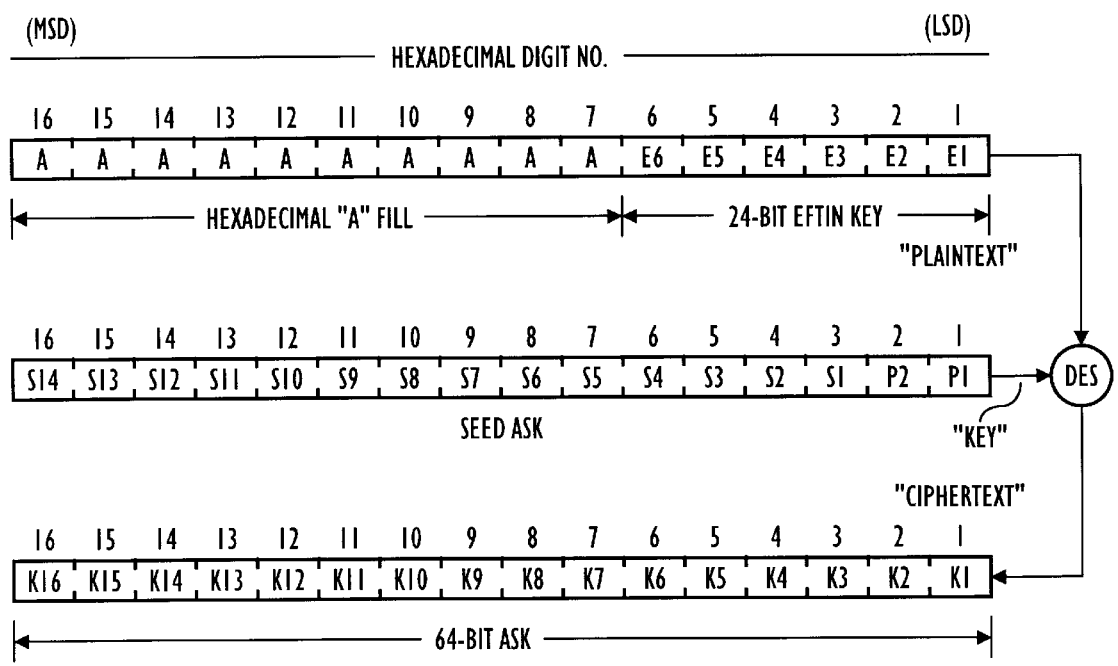
FIG. 15 is a diagram of the Authentication Security Key generation process.

The encryption algorithm is preferably the Data Encryption Standard (DES) defined by ANSI X3.92–1981/R1987, used in the Electronic Codebook Mode (ECB) and is built into both the MET and the NCC. The ASK for each MET is generated by the MSS system operator. FIG. 15 illustrates the ASK generation process using a Seed ASK (SASK) provided by the MSS system operator, and a random number (EFTIN). The CRC-8 parity check algorithm is used to protect the integrity of the ASK. The parity check is generated over all of the hexadecimal digits comprising the ASK, including the fill bits. The NOC provides a logically separate master database for the METID numbers (the MET electronic serial numbers) and the MET ASKs. The NCCs maintain slave ASK databases, and also provide protection from access by NCC processing functions other than the legitimate authorization processes.

The MET ASK is supplied to the MET user prior to commissioning. The MET provides a "user friendly" means, using alphanumeric prompted, audible tones, and key strokes, for the user to enter the ASK into the MET and verify its correctness. The MET verifies the correctness of the ASK. The MET stores the ASK in NVRAM. There is no means provided to read out or display the ASK once it is entered. Any attempted access to the ASK will preferably render the MET inoperable. It is possible, however, to enter or reenter the ASK at will.

Figure 16:
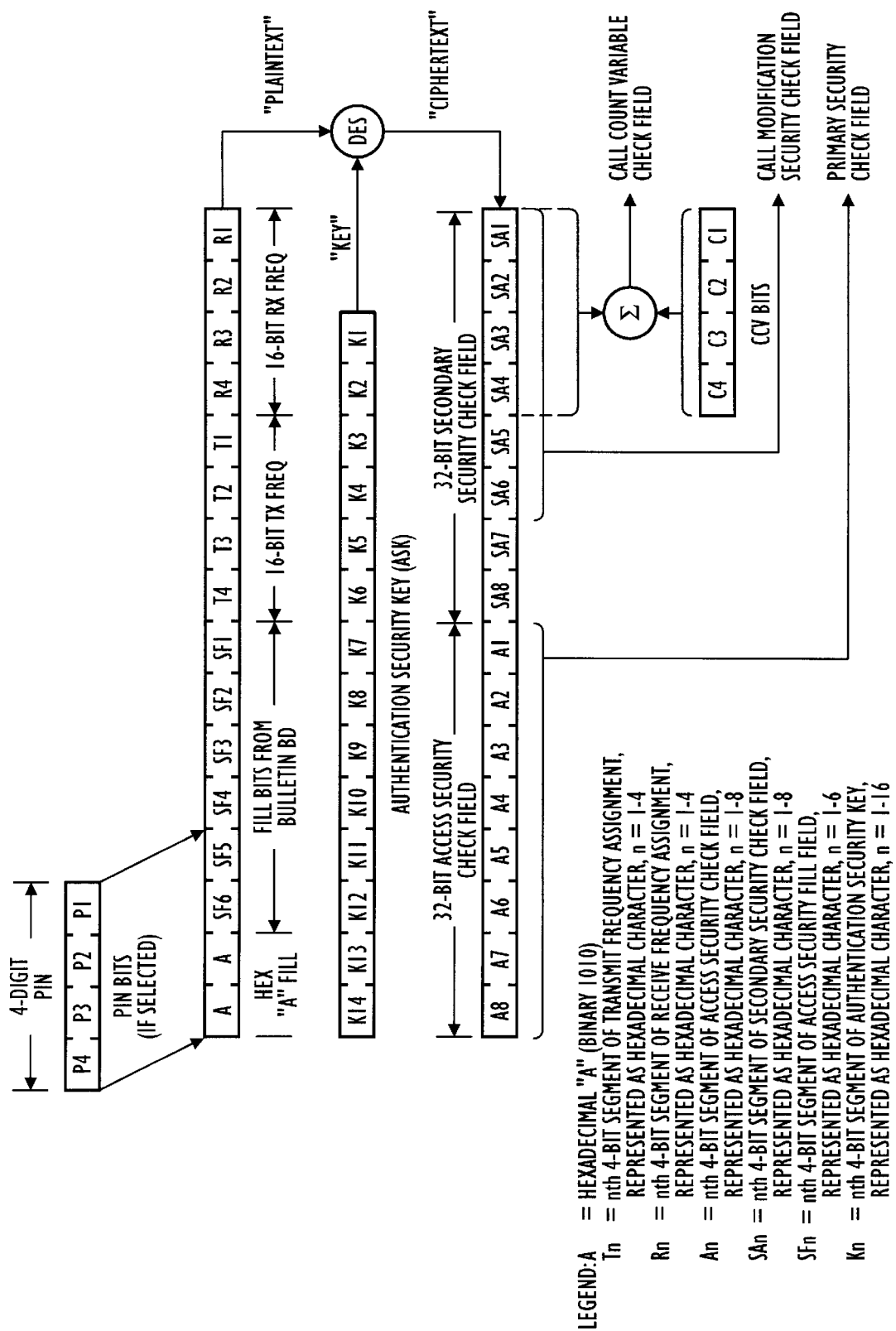
FIG. 16 is a diagram of the Access Security Check Field and Secondary Security Check Field generation process.

For either MET originated or terrestrial network originated calls, the NCC computes a 64-bit cipher text block by using the ASK stored in its secure database and the DES algorithm in the ECB mode to encode a 64-bit input variable comprised of the 16-bit receive frequency assignment in the least significant bit positions, the 16-bit transmit frequency assignment in the next least significant positions, the 24 Access Security Fill Bits, and the 8 most significant positions filled with the hexadecimal "A" (1010) characters. The most significant 32 bits of the resulting cipher text block are designated the Access Security Check Field (ASCF). The least significant 32 bits are designated the Secondary Security Check Field (SSCF). The Access Security Check Field and the Secondary Security Check Field generation process is depicted in FIG. 16. The Access Security Check Field is transmitted to the terminating FES in the Channel Assignment SU.

The MET independently generates the Access Security Check Field using an identical process to encode the transmit and receive frequency assignments received in the MET Channel Assignment SU received from the NCC. Following the establishment of the MET-FES communication link, the MET transmits the Access Security Check Field to the FES in the scrambling Vector SU.

The FES (NAP) compares the MET and NCC generated Access Security Check Fields on a bit-by-bit basis. If the values are identical, the MET is declared authenticated, and the call setup is completed normally. If the values are not identical, the MET identity is declared non-authenticated, and the FES terminates the call process. The FES sends a channel release message to the NCC, as well as the call record, with authentication failure indicated as the call clearing reason.

During commissioning or PVT, the MET generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not compare, the MET identity is declared non-authenticated, and the NCC terminates the process, declare PVT failure, and sends an authentication failure alert message to the NOC.

A "clear mode" is provided to facilitate system troubleshooting on an individual MET basis. This mode is invoked at the NCC (with suitable password control), and causes the authentication system to accept and complete all calls for the specific MET, with or without a valid Access Security Check Field.

An "override mode", is provided that permits system operation without authentication, in case of failure or other problems. This mode is invoked at the NCC through operation of a hardware or software switch, with suitable protection (i.e., physical key, password).

The "Authentication Subsystems" at the NOC (which maintains the master MET ASK database), and at the NCC (which maintains the slave MET ASK database and generates the Access Security Check Field) are preferably both logically and physically separated from other NOC and NCC processors, and provide both physical and password security to prevent unauthorized access to the MET ASK databases. The NCC processors access the NCC Authentication Subsystem with the MET ID and the transmit and receive frequency assignments, and the NCC Authorization Subsystem returns only the MET ID and the Access Security Check Field.

A MET generally authenticates its identity upon each commissioning event, performance verification event, and call setup event. The authentication process is based upon the use of an encryption function and MET Access Security Key (ASK) to form an authorization code (the Access Security Check Field) from a random variable (the MET transmit and receive frequency assignments) at the beginning of each event.

The encryption algorithm is preferably the Data Encryption Standard (DES) defined by ANSI X3.92–1981/R1987, used in the Electronic Codebook Mode (ECB), and is built into both the MET and the NCC. DES is well known, well documented, and is in the public domain. Its performance is also well known, and is generally approved for U.S. Government application. The algorithm is defined in Federal Information processing Standard (FIPS) Publication 46-1, Jan. 15, 1977, Reaffirmed Jan. 22, 1988 (Approved as American National Standard X3.92–1981/R1987), incorporated herein by reference. While a purely software implementation of DES would require significant processing power for a continuous stream encryption, we have discovered that for the MET, only the generation of a single "codeword" is needed. Thus, for the MET system, the software implementation is feasible and not processing intensive. Additional discussion of the DES algorithm can be found in the following references, all of which are incorporated by reference herein: Federal Information Processing Standards Publication 74, Apr. 1, 1981; Federal Information Processing Standards publication 81, Dec. 2, 1981; Robert V. Meushaw, "The Standard Data Encryption Algorithm, Part 1: An Overview", BYTE Magazine, March 1979; and "The Standard Data Encryption Algorithm, Part 2: Implementing the Algorithm", BYTE Magazine, April 1979.

The ASK for each MET is independently generated at both the MET and the NOC/NCC using the DES algorithm. The inputs to the generation process shall be a Seed ASK (SASK) provided by the MSS system operator, and a random number (EFTIN KEY) generated by the MET at the time of commissioning and used to encrypt the FTIN. The SASK for each MET will be generated by the NMS, under the control of the MSS system operator, at the time of MET registration. As indicated above, FIG. 15 illustrates the ASK generation process using the SASK and EFTIN variables. A standard CRC-8 parity check algorithm will be used to protect the integrity of the SASK. The parity check is generated over all of the hexadecimal digits comprising the SASK, including the fill bits. The NMS provides the processing capability necessary to generate the SASK and any needed parity check. Note that inclusion of the parity check bits as part of the SASK yields a hexadecimal digit which is the length of key required by the DES. The SASK parity check sequence is generated by the polynomial $G(X)=X^8+X^7+X^4+X^3+X+1$. The input to the parity checker is preferably the information portion of the SASK, including any fill digits. The SASK is supplied to the MET subscriber prior to commissioning. The key distribution scheme is not a requirement of this specification. The MET provides a "user friendly" means, using alphanumeric prompts, audible tones, and key strokes, for the user to enter the SASK into the MET. The MET verifies the correctness of the SASK as described below. If the SASK is incorrect, the user is prompted to enter the SASK again. The MET does not enter the "Ready for Commissioning" state prior to entry of a valid SASK.

At the time of commissioning, the MET uses the DES algorithm in the ECB mode to generate the "active" ASK. The EFTIN KEY is extended to additional bits by filling the leading positions and is used as the plain text input to the algorithm. The SASK is used as the key. The resulting cipher text block is from the ASK. The forms of the elements used in the key generation process are shown in FIG. 15. It is impossible to recommission the MET either with or without reentry of the SASK. The MET stores the SASK and the ASK in NVRAM. There is no means provided to read out or display either the SASK, or the ASK once it is generated and stored.

Figure 17A:
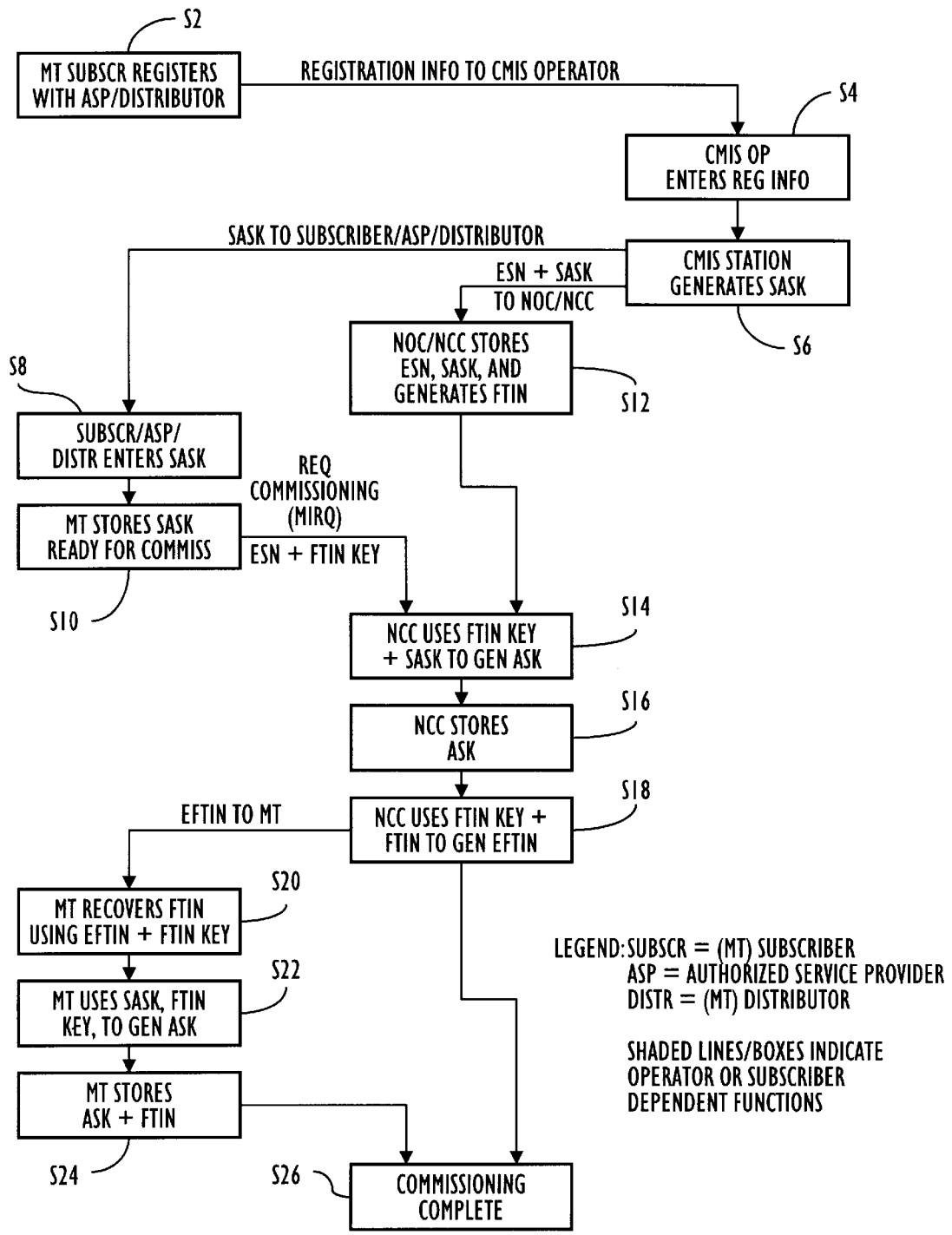
FIG. 17a is a flow chart of the keying process.
Figure 17B:
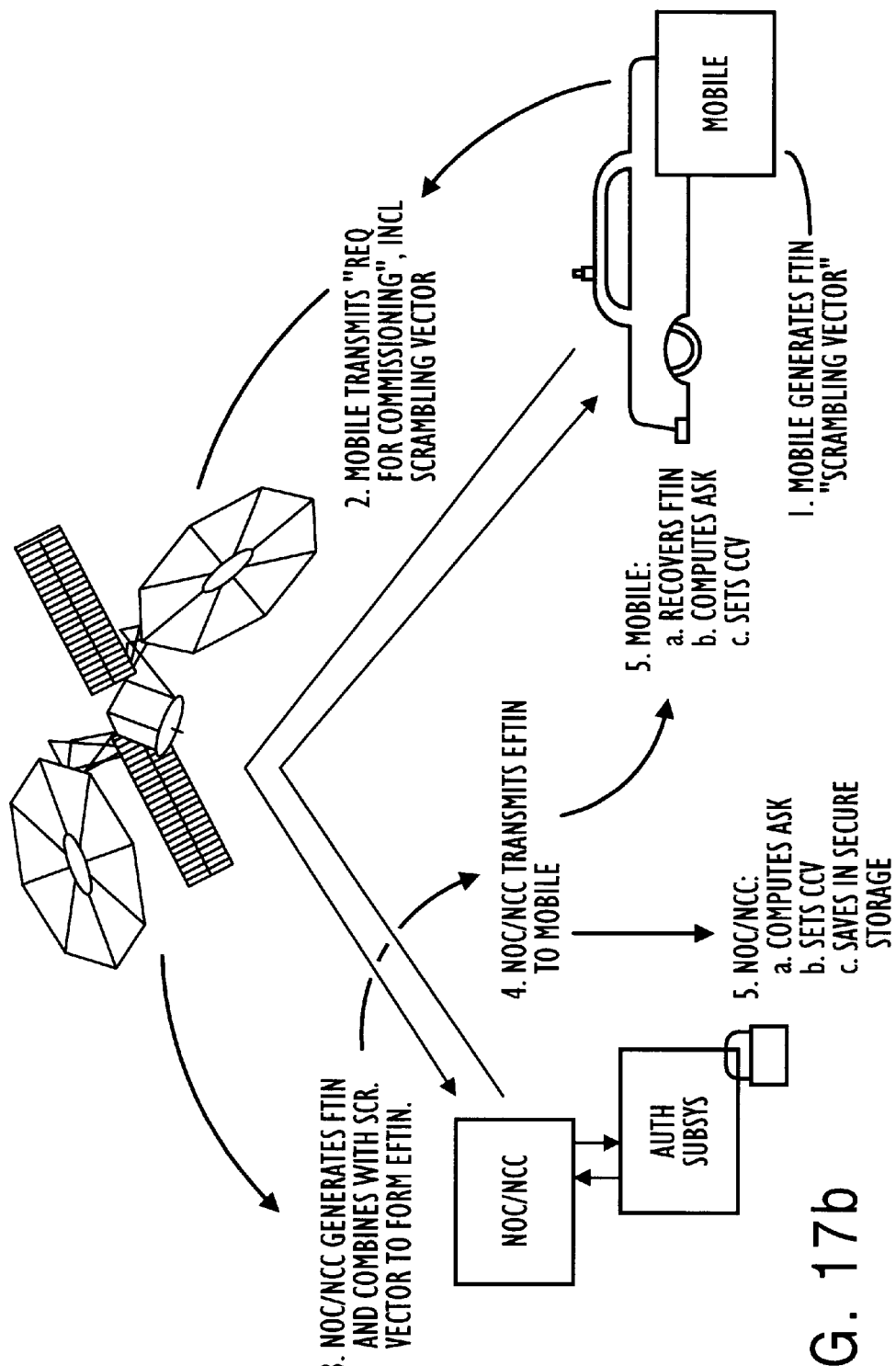
FIG. 17b is an illustration of the keying process in the satellite communication system.
Figure 17C:
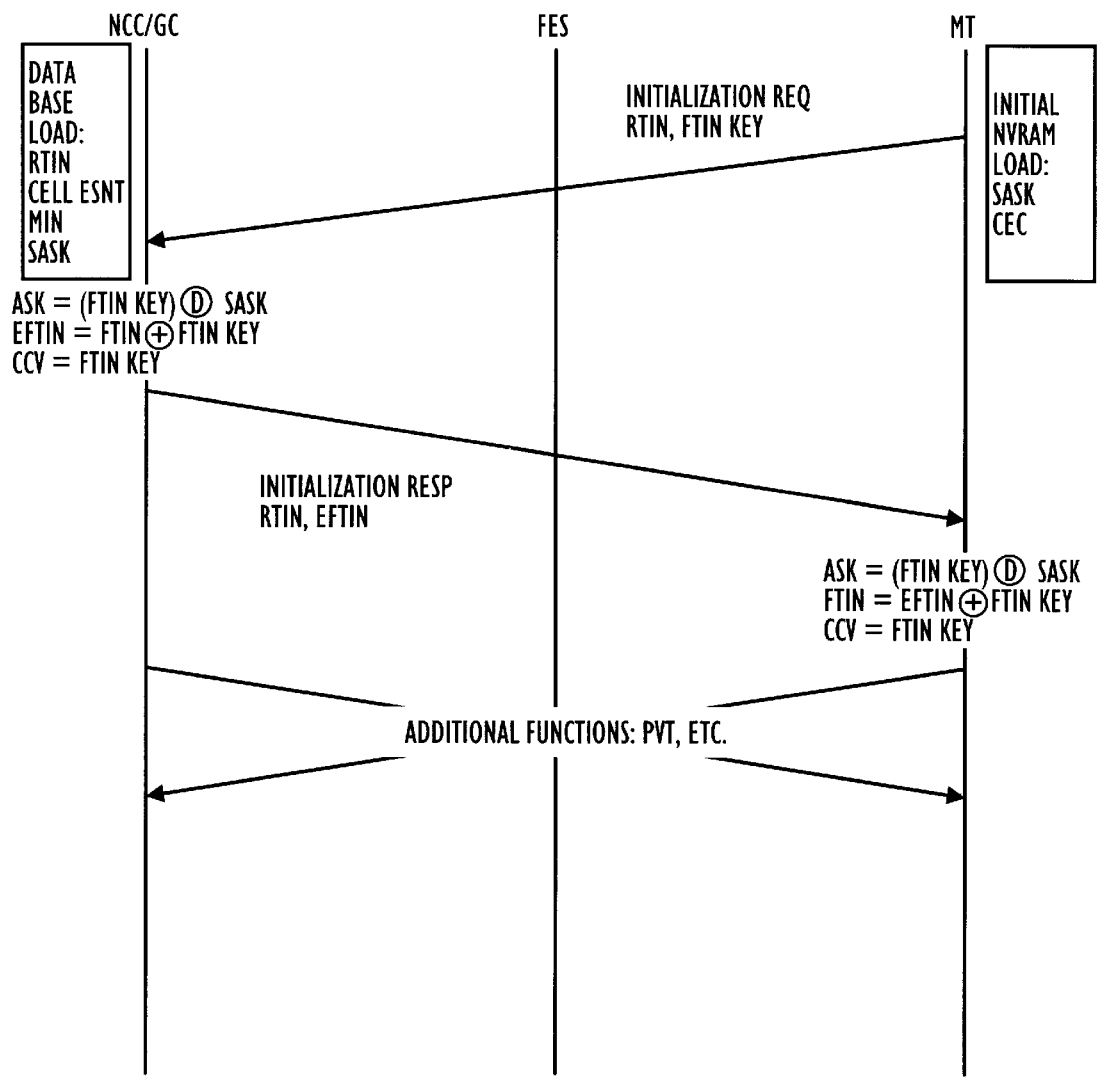
FIG. 17c is a signal/data diagram of the keying process.

The keying process is illustrated in FIGS. 17a–17c. FIG. 17a is a flow chart of the keying process, FIG. 17b is an illustration of the keying process in the satellite communication system, and FIG. 17c is a signal/data diagram of the keying process. In FIG. 17a, the MET subscriber registers or requests to become a subscriber of the satellite communication system in step S2. Registration information is sent to CMIS and a representative enters the registration information in the CMIS system that handles subscriber billing, contact and the like, in step S4. CMIS then generates the Seed ASK which is supplied to the NOC/NCC and the subscriber/distributor of the MET prior to commissioning in step S6. The subscriber/distributor enters the SASK into the MET in step S8, and the MET stores the SASK for commissioning in step S10.

The NOC/NCC stores the ESN and SASK and assigns a Forward Terminal ID (FTIN) for each MET in step S12. The NOC/NCC also receives an FTIN Key which is a random number from the MET when the MET requests to be commissioned, and uses the FTIN key and the SASK to generate the ASK in step S14. The NCC stores the ASK in step S16. The NCC uses the FTIN Key and the FTIN to generate the EFTIN in step S18 and transmits the EFTIN to the MET. The MET uses the EFTIN and the FTIN key to recover the FTIN in step S20. The MET also uses the SASK and the FTIN Key to generate the ASK in step S20. The MET then stores the ASK and FTIN in step S24 to be used later during the registration or call connect process. The commissioning process is then completed in step S26, providing the necessary security codes in the MET associated with a specific ESN and in the NCC/NOC.

Thus, at the time of MET commissioning, the NCC duplicates the process of MET ASK generation. The NCC process is entirely automatic, and is protected from access by, the MSS system operators. For either MET originated or terrestrial network originated calls, the NCC computes a cipher text block (see FIG. 16) by using the ASK stored in its secure database and the DES algorithm to encode an input variable comprised of the receive frequency assignment in the least significant positions, the transmit frequency assignment in the next least significant positions, the Access Security Fill Bits (transmitted in the Bulletin Board, see, for example, FIG. 18), and the most significant positions filled with predesignated characters. The 32 most significant bits of the resulting cipher text block are designated the Access Security Check Field, and the least significant is designated the Secondary Security Check Field. The Access Security Check Field and the Secondary Security Check Field are transmitted to the terminating FES in the Channel Assignment SU. The MET also generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not coincide, the MET identity is declared non-authenticated, and the NCC terminates the process, declares PVT failure, and sends an authentication failure alert message to the NOC.

Access Security Fill Bits are transmitted in the MET bulletin board. The NOC operator can manually change this field to any desired pattern. It is recognized that when the Access Security Fill Bits are changed there will be a short period during which METs will attempt to access the system with Authentication Codes generated using the "old" fill bits, which may result in those METs being denied service. As one option to prevent this problem, the NOC operator will have the option to disable the access security check for a short time when the fill bits are changed.

The MET independently generates the Access Security Check Field and the Secondary Security Check Field using an identical process to encode the transmit and receive frequency assignments received in the MET Channel Assignment SU received from the NCC. Following the establishment of the MET-FES communication link, the MET transmits the Access Security Check Field to the Scrambling Vector SU.

The FES compares the MET and NCC generated Access Security Check Fields on a bit-by-bit basis. If the values are identical, the MET identity is declared authenticated, and the call setup shall be completed normally. If the values are not identical, the MET identity is declared non-authenticated. If nonauthenticated, the FES terminates the call process, and sends a channel release message to the NCC with authentication failure indicated as the call clearing reason. Upon receiving the channel release message with authentication failure as the call clearing reason, the GC generate an authentication failure event. The NCC treats this as an alarm condition. The NCC provides a real time display to the MSS operator console indicating that the call was failed due to authentication failure.

A "clear mode" is provided to facilitate system troubleshooting on an individual basis. This mode is invoked at the NCC (with suitable password control), and causes the authentication system to accept and complete all calls for the specific MET with or without a valid Secondary Security Check Field.

An "override mode" is also provided which permits system operation without authentication, in case of failure or other problems. This mode is invoked at the NCC through operation of a hardware or software, with suitable protection (i.e., physical key, password).

An option is provided in which the "Authentication Subsystem" at the NOCINCC (which maintains the MET ASK database) is both logically and physically separated from mother NOC and NCC processors, and which provides both physical and password security to prevent unauthorized access to the MET ASK databases. The NCC processors access the NCC Authentication Subsystem with the MET ESN (RTIN) and the transmit and receive frequency assignments. The NCC Authorization Subsystem returns only the MET ESN, the Access Security Check Field and the Secondary Security Check Field.

A MET is required to authenticate its identity upon each request to invoke an advanced calling feature which redirects the source or destination of a call or adds participants. To effectuate authentication, the MET includes the least significant ("right most") bits of the Secondary Security Check Field in the AFR SU ("Hook Flash") transmitted in an Advanced Features Request Sequence. The serving FES compares the these least significant bits of the Secondary Security Check Field received from the NCC in the Channel Assignment SU. If the values are identical, the MET identity is declared reauthenticated, and the advanced features request is processed normally. If the values are not identical, the MET identity is declared non-reauthenticated, and the FES denies the advanced features request, and provides a suitable indication, such as a tone or recorded voice announcement, to the MET subscriber. The FES sends a reauthentication failure alert message to the NCC.

The MSS system provides for a Call Count Variable (CCV) in the authentication process. The CCV is a count of calls made by each MET, and is separately and independently maintained by the individual METs and the NCC. The CCV is a 16 bit binary number, and is set equal to the value of the least significant 16 bits of random EFTIN KEY when the MET is commissioned or recommissioned. The CCV is incremented at the completion of each call setup. The CCV is also incremented at the MET when the change from transmission of the Scrambling Vector SU to voice/data frames is made. The CCV is also incremented at the NCC when the call Setup Complete SU is received from the serving FES.

At the time of call initiation, the NCC adds the CCV to the lease significant bits of the Secondary Security Check Field. The resulting CCV Check Field is included in the Channel Assignment SU sent to the servings FES. The MET independently generates a CCV Check Field using an identical process, and includes the result in the Scrambling Vector SU sent to the serving FES during call setup.

Figure 19A:
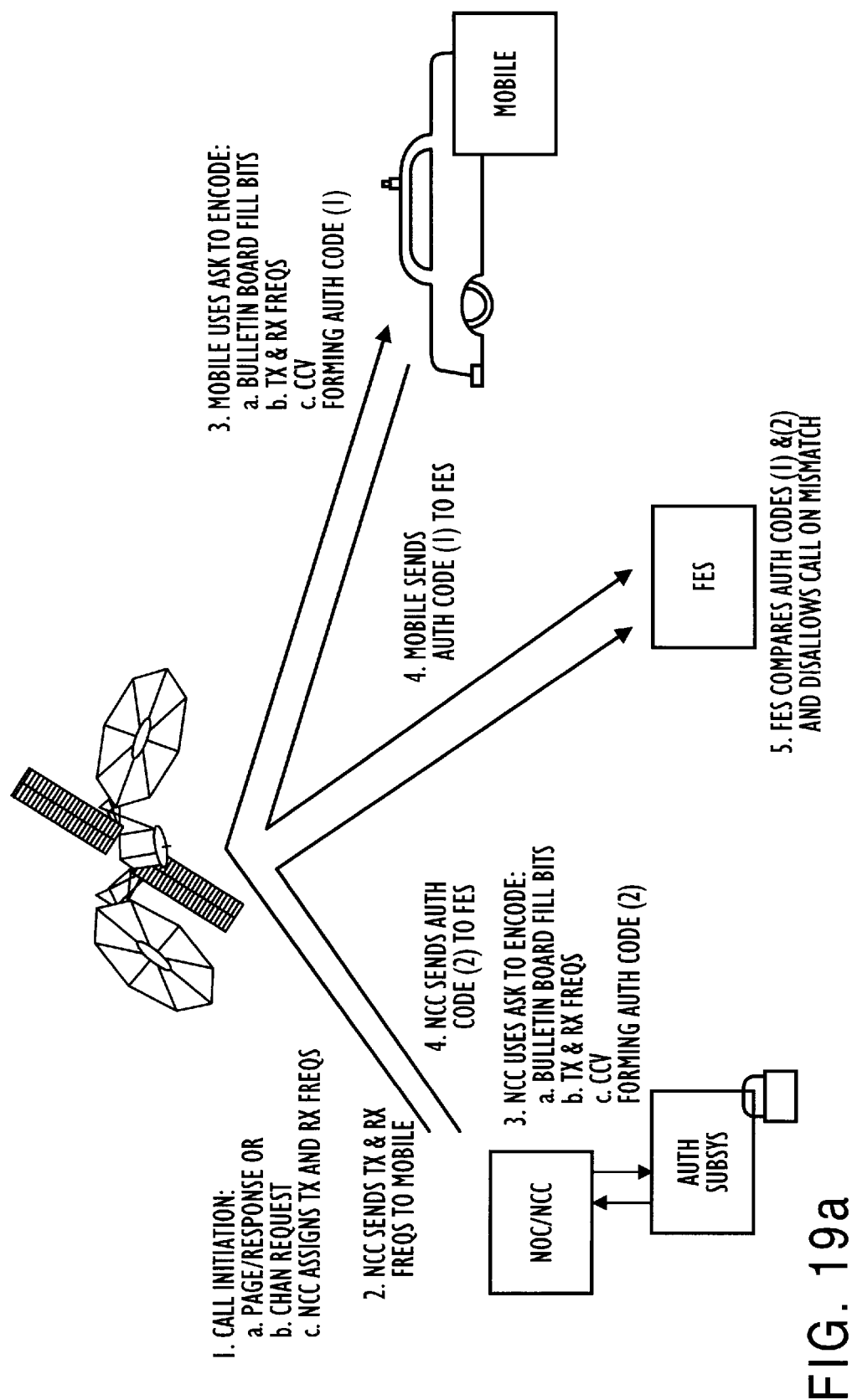
FIGS. 19a and 19b are diagrams of the authentication process using the authentication security key generated by the process described in FIGS. 17a–17c.
Figure 19B:
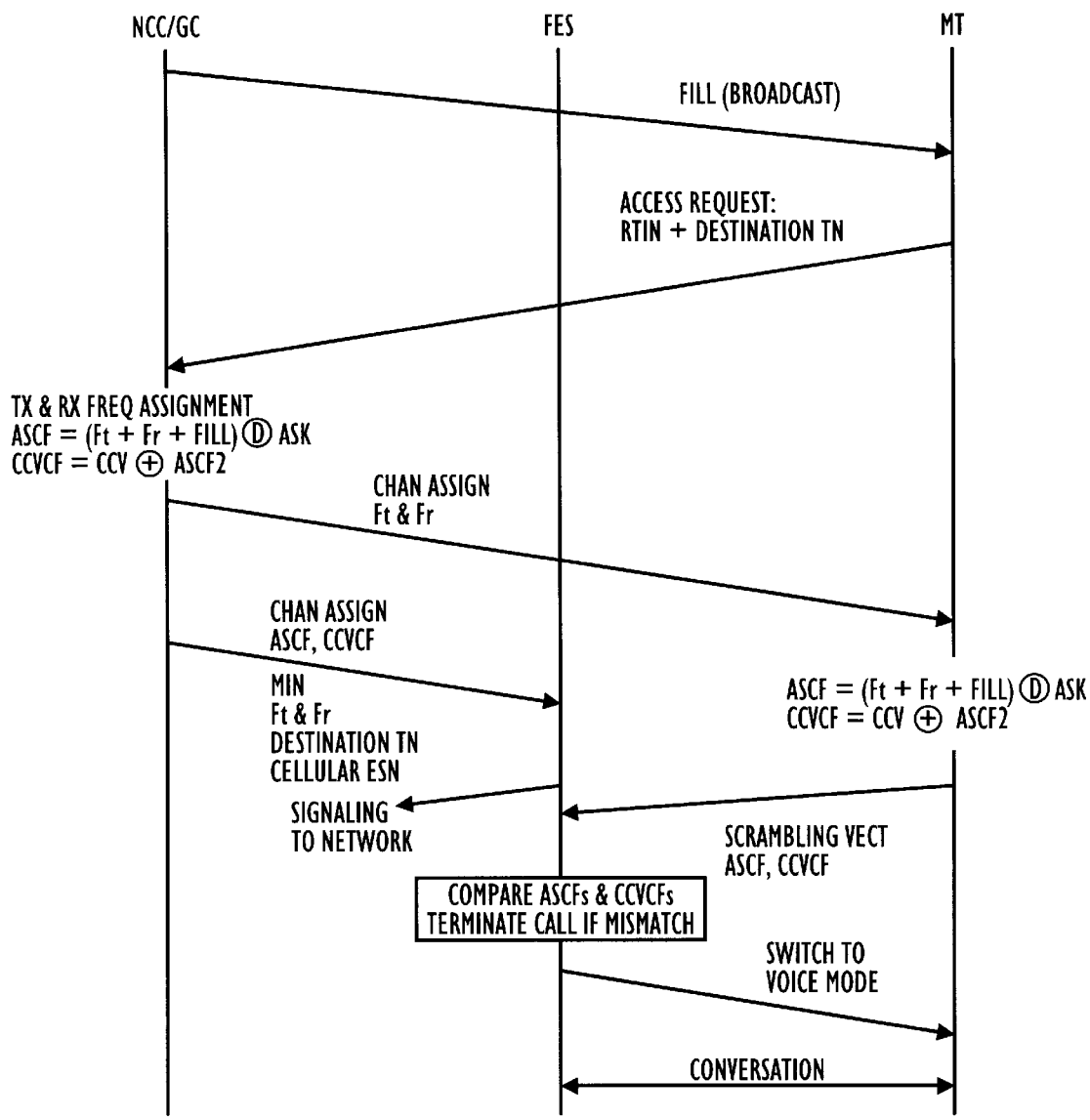

The FES verifies the MET CCV. The FES declares the CCV to be authenticated if the absolute value of the error is equal to or less than a configurable threshold. Provision is made for selection of the error threshold by the NOC/NCC operators. The nominal value of the threshold is zero, and the range is at least zero to 15 (decimal). If the absolute value of the error is greater than the threshold, the FES declares the CCV non-authenticated. The FES terminates the call process, and sends a channel release message to the NCC, with CCV authentication failure indicated as the call clearing reason. Upon receiving the channel release message with authentication failure as the call clearing reason, the GC generates an authentication failure event. The NCC treats this as an alarm condition. The NCC provides a real time display on the MSS operator console indicating that the call was failed due to authentication failure. FIGS. 19a and 19b are diagrams of this described authentication process using the authentication security key generated by the process described in FIGS. 17a–17c.

A Personal Identification Number (PIN) may also be entered by the MET subscriber at the initiation of each call. The PIN is not be used for MET terminated calls. The PIN is provided to the MET subscriber by the MSS operator. The NOC/NCC makes provision to enter and store the PIN in the MET ASK secure database.

The NOCINCC software architecture makes provision for a "PIN REQUIRED" Flag to be included in the data base for each MET, and in the calling sequence and software used to invoke generation of the Access Security Check Field by the Authentication Subsystem. The PIN Required flag can be set by CMIS or the NOC operator. If the use of the PIN is required, the NCC authentication subsystem replaces the most significant Access Security Fill Bits with the PIN characters. Generation of the cipher text block comprising the Access Security Check Field and the Secondary Security Check Field and subsequent actions is then proceeded as described above.

Generation of the cipher text block comprising the Access Security Check Field and the Secondary Security Check Field and subsequent actions is then performed as described above. The form of the "plain text input" used in the PIN-inclusive ASCF generation process is shown in FIG. 20. Transmission and verification of the various Security Check Fields, and subsequent actions, is implemented as described above.

A channel assignment message (CHA) is also used to inform FESs of frequency assignments for both MET and fixed originated calls. The CHA message conveys information relating to the transmit power, transmission equipment, and interface equipment required to support the call. For MET originated calls the CHA message also conveys the dialed digits. The CHA message generally comprises the data illustrated in FIG. 21. A scrambling vector SU is also provided that is sent by the MET to initialize the descrambler at the FES and for call security. The Scrambling Vector SU generally comprises the data illustrated in FIG. 22.

Figure 23A:
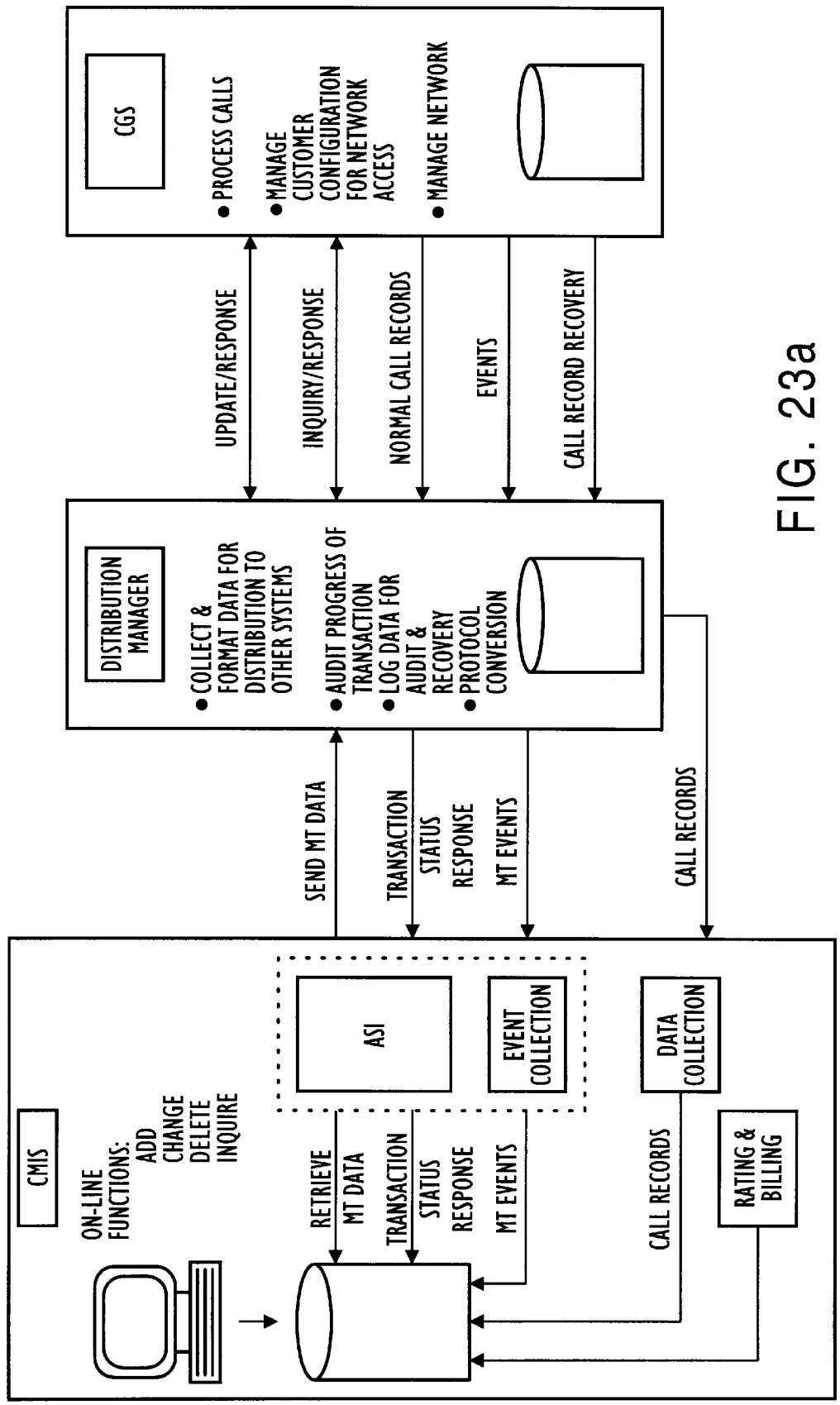
FIG. 23a is an illustration of the basic components of the satellite communications network management system.
Figure 23B:
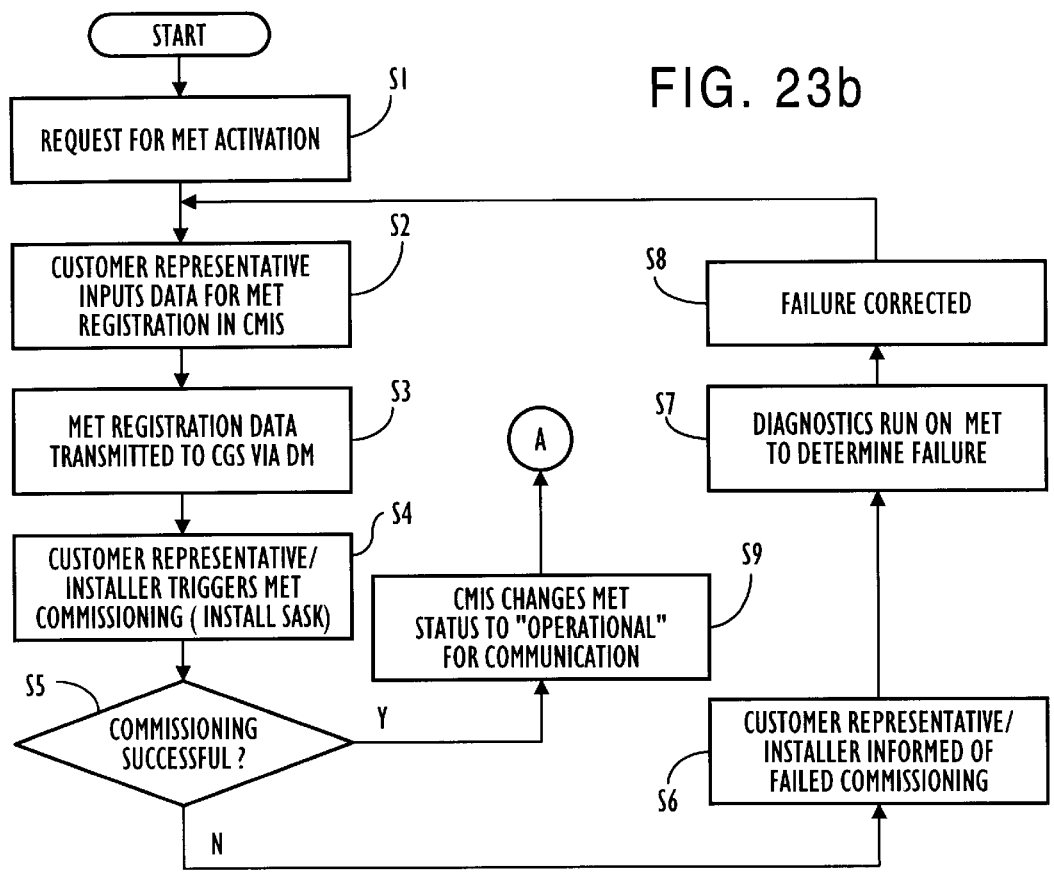
FIGS. 23b–23c are flow charts of the basic process of registering in the CGS system, completing a call and obtaining the call event data related thereto.
Figure 23C:
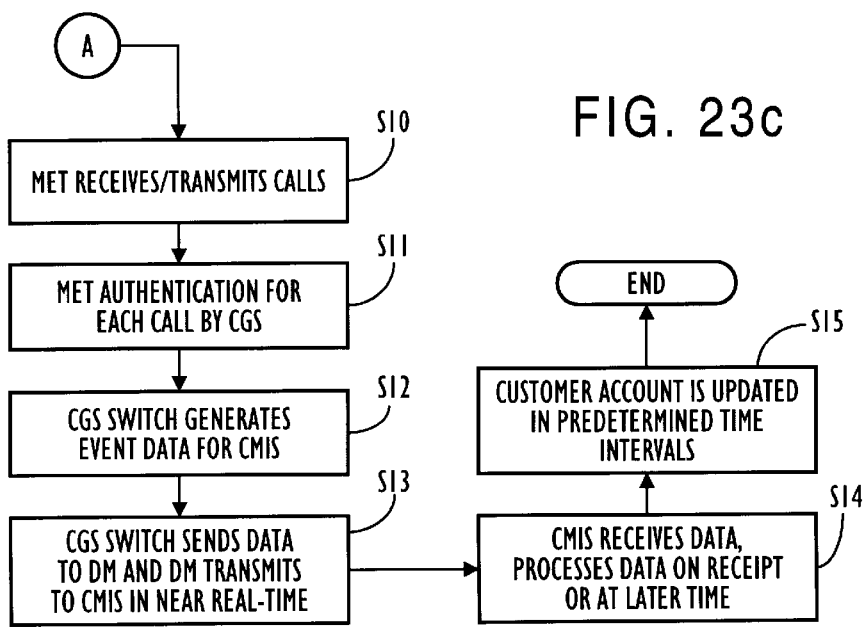

FIG. 23a is an illustration of the basic components of the satellite communications network management system. In FIG. 23a, the satellite communications network management system is composed of three major components: CMIS, the Distribution Manager, and the CGS. The three components must interact cooperatively for events to be completed. FIGS. 23b–23c are flow charts of the basic process of registering in the CGS system, completing a call and obtaining the call event data related thereto. As illustrated therein, a request for MET activation is made in step SI. Responsive thereto, a customer representative inputs data in CMIS related to and permitting MET registration in CGS in step S2. MET registration data are then transmitted to CGS via DM in step S3. A customer representative/installation person triggers MET commissioning by, for example, installation of the SASK which is used for security key generation for MET authentication in commissioning and call connection in step S4.

The customer representative/installer then determines whether commissioning was successful in step 5, and if not, is informed of the failed commissioning in step S6. Diagnostics are then run on the MET to determine the failure in step S7. The failure is corrected in step S8, and the MET commissioning process is reattempted.

Once commissioning is completed, CMIS changes the MET status to "operational" in step S9, indicating that the MET is ready to receive/transmit in the CGS system. Once ready to receive/transmit, the MET establishes initial communication with CGS to obtain the appropriate frequency for same in step S10, and then undergoes MET authentication for communication in step S11. The CGS switch then generates call event data to be transmitted to CMIS, as well as other systems in CGS including NE/SE in step S12. The CGS sends data to Dm, and the DM transmits the call event data in near real-time in step S13. CMIS receives the data and then processes the data on receipt or at a later time in step S14. The customer account is then updated at predetermined time intervals in step S15 to reflect the call events.

Figure 24:
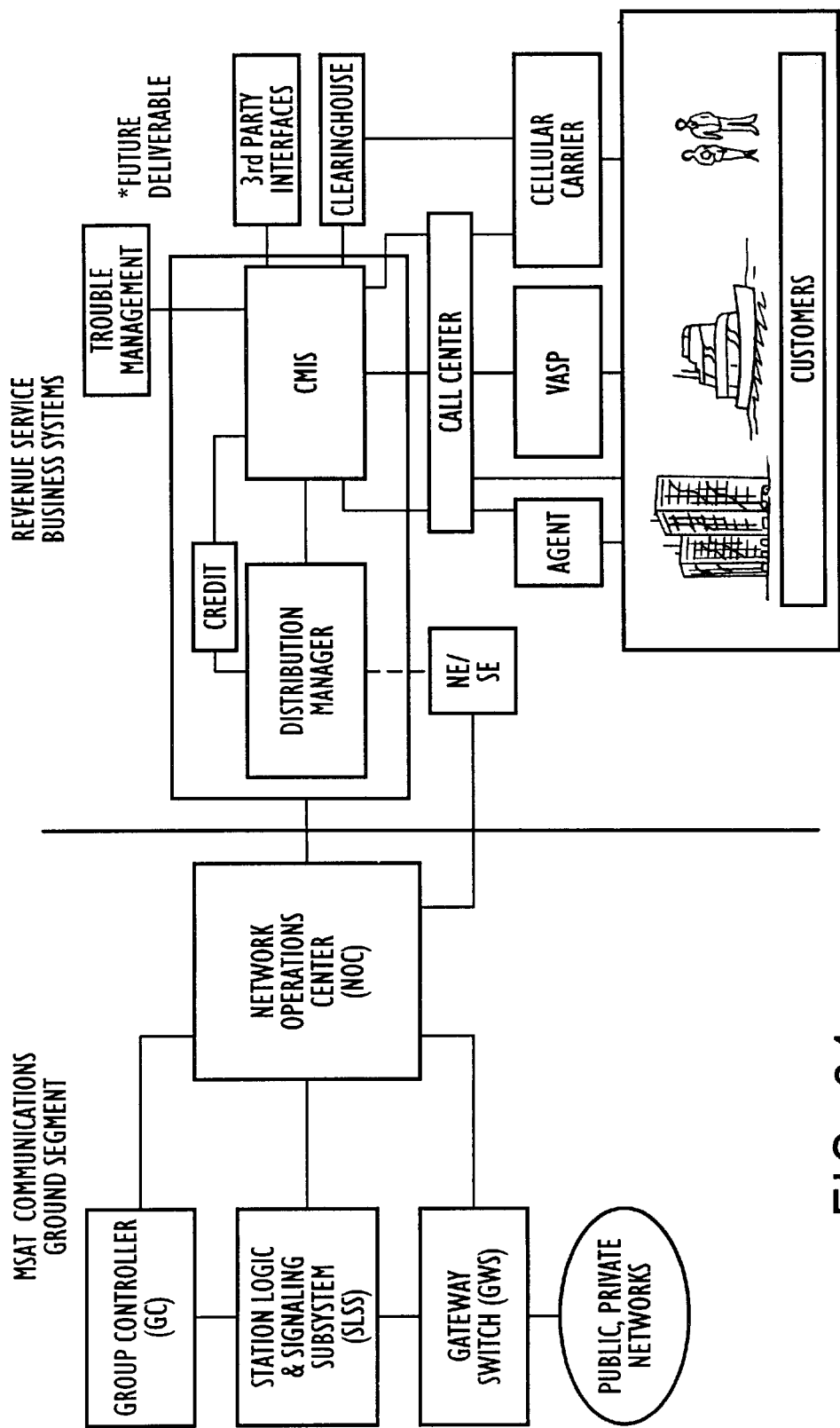
FIG. 24 is a more detailed block diagram of the basic components comprising the CGS and CMIS systems.

FIG. 24 is a more detailed block diagram of the basic components comprising the CGS and CMIS systems. As illustrated in FIG. 24, the relevant components of the CGS system that interface with CMIS include the NOC, GC, SLSS and GWS. The CMIS system includes a distribution manager (DM) component and an administration system component.

Figure 25:
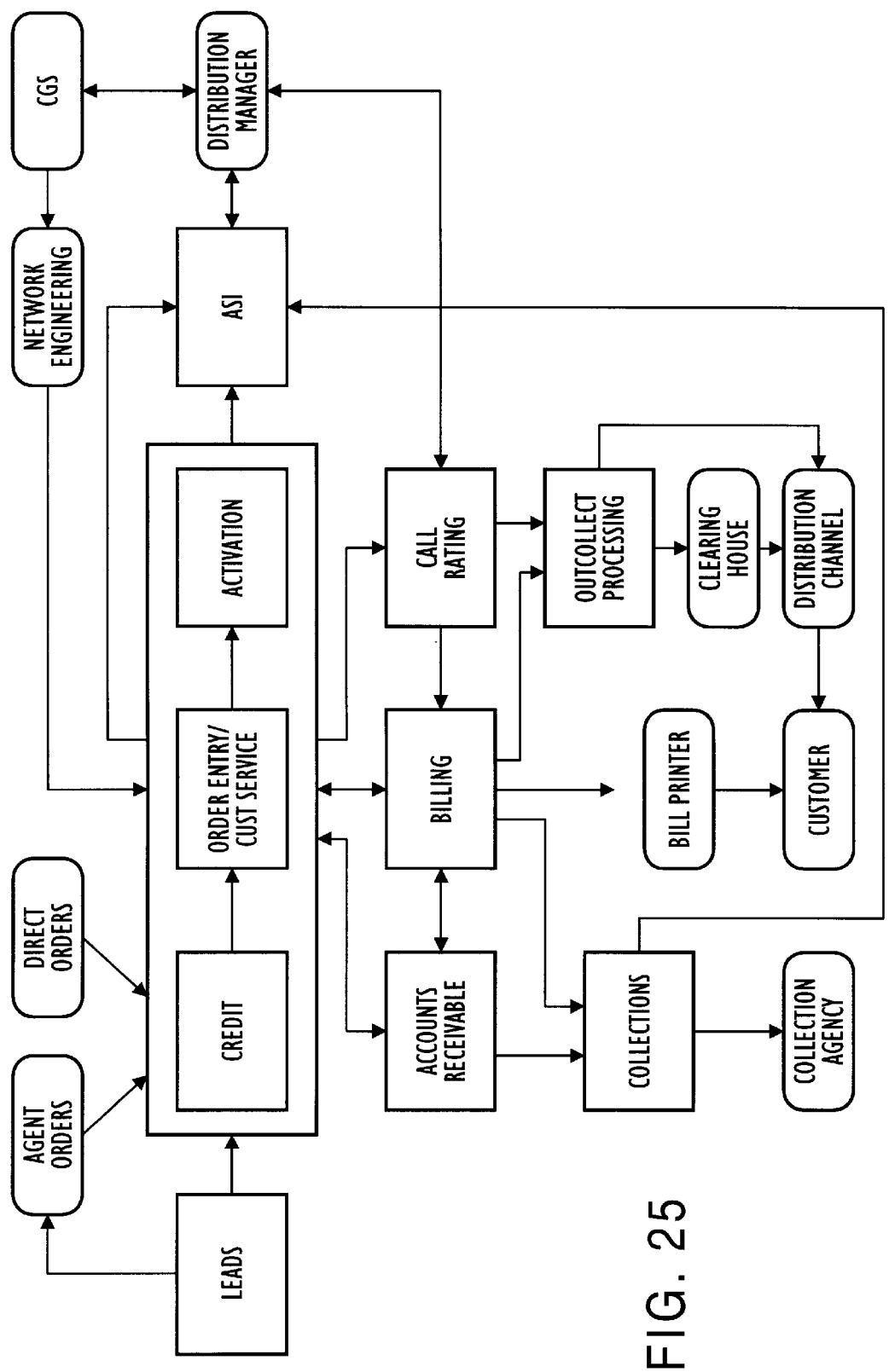
FIG. 25 is a block diagram of the components/functions in the administration system.

FIG. 25 is a block diagram of the components/functions in the administration system. As illustrated in FIG. 25, the components of the administration system are well known. One such system that performs the functions illustrated therein is the FLEXCELL system manufactured by Teleflex Information Systems, Inc. CMIS supports on-line customer service functions such as adding, modifying or inquiring on a customer profile. Customer service representatives use the system to perform daily functions for MET customers. CMIS is also responsible for collecting, rating and billing call records that are supplied from the CGS through the Distribution Manager interface. CMIS uses an Asynchronous Switch Interface (ASI) to send MET transactions that must be performed on the CGS. The ASI product also captures transaction responses for inquiry or update requests from the DM to display to users. Call records and event messages are received from the DM through separate processes to minimize contention along the communication channel.

Figure 26:
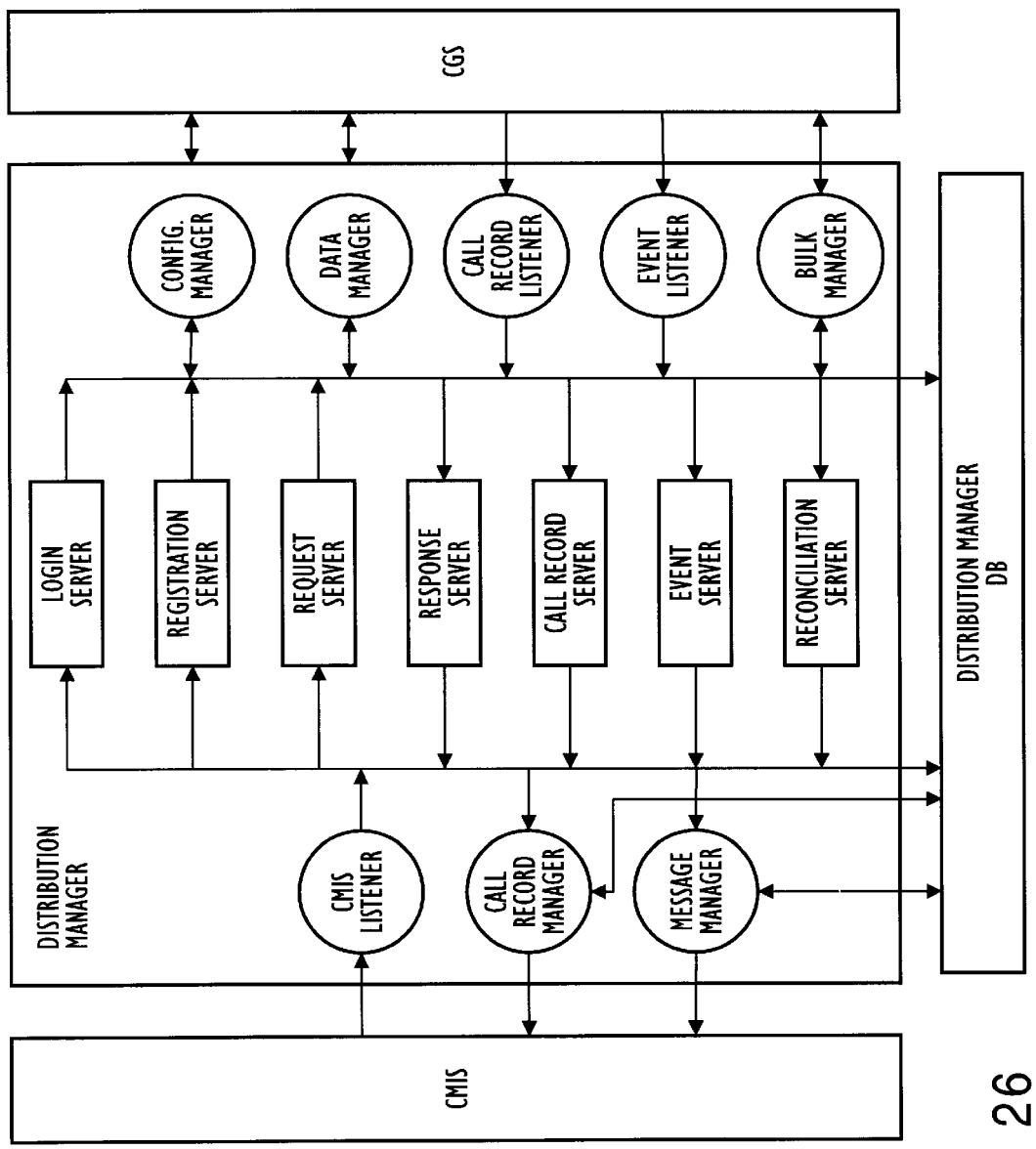
FIG. 26 is a block diagram of components comprising the DM system in a client server architecture.

FIG. 26 is a block diagram of components comprising the DM system in a client server architecture. As shown in FIG. 26, a login server logs in users of the DM. A request server requests call detail records (e.g., MET inquiry transaction on current MET status) that are transmitted from CGS and captured or detected by the call record listener. An event listener waits for a detects evens in CGS that are to be transmitted to CMIS (e.g., successful MET registration event). A bulk manager is also provided that is able to receive multiple call detail records from CGS to be transmitted to CMIS. The bulk manager provides the function of receiving sequential or multiple call detail records to assist CMIS in determining whether all call detail records have been successfully transmitted from CGS to CMIS via DM. The configuration manager is used to manage data between CMIS and CGS via DM relating to MET registration events. The data manager manages data between CMIS and CGS via DM relating to other MET events. Request, response, call record and event servers are provided in accordance with the client server architecture. The details of the DM processing are discussed below in greater detail. The DM also includes a DM database that stores information necessary for the DM processing as well as to effectuate communication between CMIS and CGS.

The Distribution Manager's main action or function is to act as an intermediary between CMIS and CGS. It collects and formats data from CMIS to distribute to the CGS and other systems. It seamlessly connects CMIS transactions to the CGS while auditing and logging the messages that are passed across its domain. The DM receives asynchronous messages (MET status event messages, call records, responses, or network events) from the CGS in near real-time, processes them and sends them to the CMIS or to other downstream systems in an understandable format. The processing performed in the Distribution Manager includes reformatting messages, cloning messages, bundling multiple messages etc. Five predefined logical links are available to communicate between CMIS and CGS: a link for inquiry messages and their response; a link for update messages and their response; a link for inbound call records; a link for inbound events; and a link for bulk data inquiry/transfer.

The Communication Ground Segment's main function is to maintain the satellite communications network and process mobile telephone calls. It interfaces to CMIS via the DM to allow customer management of mobile services. CMIS manages customer configuration in its own database and communicates the configuration changes to the CGS for the actual change in service. The CGS provides CMIS with near real-time call summary records and status events and inquiry capability for customer configuration data.

The following characteristics of a MET are supplied by the CGS and never generally required of CMIS to add or update:

FTIN

Actual GSI

L Band Beam

Satellite Id

Date Last Tested

Pending NVRAM init flag

FMR

The NOC operator has authority to update the following Customer Configuration fields on the NOC database:

MET Commanded State

Pending PVT Flag

Pending NVRAM Init Flag

Call Trap Flag

The communications configuration provides a controlled approach by always defining the DM as the server and the ASI as the client. This approach ensures that no transmissions are attempted to cross before it is ready to receive messages. The mechanism to control communications and transmission rates between the DM and other systems is dependent on the type of interface and mode of communication as driven by the downstream system. The DM provides a parameter driven process to control communications and transmission rates.

Communications between CMIS and the Distribution Manager is established through dedicated logical TCP/IP links. These links are determined through a table-driven approach such that tuning and configuration changes can be easily made. The table stores shared information about the specific link (i.e., internet address, network ports, etc.) which is read by both CMIS and the DM upon startup.

Communications between CMIS and the Distribution Manager uses the TLI application programming interface over TCP/IP. TCP/IP is a standard UNIX networking package that guarantees the delivery and integrity of data between communication endpoints. Because of the TCP/IP delivery guarantee, no application-level protocol error detection is needed to ensure message delivery.

CMIS sends and receives all transactions in "packets," which are fixed-length frames of data (the length of the data is dependent on the type of data being sent). Each packet is preceded by a binary 254 (hex FE) byte and followed by a binary 255 (hex FF) byte. These bytes are referred to as frame delimiters and are used to verify that data streams are synchronous at each transmission endpoint. They are also provided for data recovery. A packet is considered received successfully if both frame delimiters were received.

| Packet: | FE<data>FF | |
|---|---|---|
| | FE | Frame delimiter (begin frame) |
| | FF | Frame delimiter (end frame) |
| | <data> | Transaction data |

During startup, both CMIS and the DM will refer to a shared Oracle database table, CMIS_CONFIG that will allow them to construct the appropriate communication links. The table will list a variable number of network addresses. This table will reside in the CMIS database.

Table CMIS_CONFIG

| Column | Description |
| --- | --- |
| client | DM or ASI (Asynchronous Switch Interface) |
| server | DM or ASI |
| Instance | Instance of the server for which this row is intended (parent, child, etc.) |
| Channel | Assigned channel number for address-unique-used in Transaction Header records. |
| Status | "A" Available "U" Unavailable |
| Protocol | "I" (DM <-> CMIS) |
| hostname | Host system name |
| port | Network port number at given address where communication will take place (should also be noted as "in use" in/etc/services) |
| Request_out | Request transactions only (Outbound) ("I" = allow, "O" = deny) |
| response | Response transactions only (Outbound) ("I" = allow, "O" = deny) |
| event_in | Event transaction (Outbound) ("I" = allow, "O" = deny) |
| batch | Batch transactions only (Outbound) ("I" = allow, "O" = deny) |
| username | User name for DM login to ASI |
| password | Password for DM login to ASI |

As each application starts, it reads this table for all address configuration information relevant to it. For instance, the DM reads all rows with server="DM", status="A", and hostname=the name of the DM host system. These rows determine the ports that the DM must listen on for connection requests from CMIS. The specific functionality expected for a particular address is specified in the request_out, response, event_in, and hatch/fields. Listed below are sample rows for the CMIS_CONFIG table:

```
ROW1                          ROW2
client       ASI              client       ASI
server       DM               server       DM
instance          0           instance          0
channel      1                channel      2
status       A                status       A
protocol          1           protocol          1
hostname     dm_host          hostname
dm_host
port              100         port              101
request_out  1                request_out  0
response          0           response          1
event_in          0           event_in          1
batch             0           batch             0
username     ssssssss         username
yyyyyy
password     tttttttttt       password
xxxxxxx
```

ROW1 identifies the port that the DM server on the dm_host system opens and listens on for a connection from CMIS (ASI). CMIS only sends request-type transactions through this channel (channel and port are synonymous in this context). The DM also opens and listens for a connection from CMIS on the port identified in ROW2. This channel, however, will be used by the DM to send only Response and Event Transactions. As soon as a process opens a connection, the status column for those rows should be updated to "U" to indicate that no other applications (or instances) may use the port. Also, as each port is released (closed) the status column is updated to "A".

This design allows load-balancing in the processing of messages. Multiple rows may exist with one or more of the same transaction allow flags (request_out, response, event_in, batch) set, the application would "load-balance" transactions of the type in question between the multiple channels. For example, if there are 2 rows that both allow Request Transactions, CMIS divides all outbound Request Transactions up as evenly as possible between two channels.

Now that an application can identify the channels where it will communicate, it must open the communication endpoints. For the server, a transport endpoint must be created based on the given port. Then it will be listened-on for a connection from a client. For example, the DM will create and listen on a specified port for a connection from CMIS.

Communication between CMIS and the DM using TCP/IP is point-to-point and not broadcast-based. The DM is considered the server process for all communication parts (channels). Therefore, the DM listens for connection requests from CMIS. Also, the initial configuration of the communications will have the following ports defined: one port for request messages, one port for response messages, one port for event messages and one port for batch transactions (call records).

Login

To initiate handshaking between the DM and CMIS a Login transaction is sent. This transaction provides space for a user name and password. If a user name and password are enforced they will be passed via this record, otherwise they will be blank (space-filled). The DM sends back a Response message indicating success or failure of the login. The DM does not send anything to CMIS until a login has been confirmed and the Response has been sent to CMIS.

Valid Response Diagnostic Codes:

Login OK

Invalid User

Invalid Password

Password Expired

Login Attempts Exceeded

Login Not Accepted

Sending

Before sending any data, the CMIS application must identify the origination and termination channel for the specific transaction being sent. These channels are numbers that, for practical purposes, are logical equivalents to the port numbers used to open a communications connection between processes. In other words, port numbers are the physical communications port address that applications use to talk on and channel numbers are just logical references to the same port.

The CMIS application sends the message along the correct link as defined by the network configuration table. The application makes sure that the transaction being sent is of the correct transaction class for that channel. It also ensures that it sends the transaction according to the Return Transaction Channel if this field was specified in the Transaction Header record. If this field is left blank, the receiving application uses the criteria in the table to locate the channel to use to deliver the Response record back to the sender.

Receiving

Detection of an incoming data frame is denoted by the reception of the frame delimiter start byte. Following the frame delimiter is the Transaction Header record. The Transaction Size field of this record determines how many more bytes are expected from the sender before the transaction record has been received. After reception of the Transaction Header and the transaction record indicated in the header, the receiver receives the frame delimiter end byte.

Logout

A Logout transaction is sent to indicate that either the DM or CMIS is temporarily closing the connection. This provides an orderly way of halting all transactions. The DM or CMIS does not attempt to send any more information to each other until a successful login has been processed.

Distribution Manager to NOC

Communication from the Distribution Manager to the NOC is accomplished similarly to the CMIS to Distribution Manager communication. Task-to-task communications and a file transfer protocol are used to link the two systems. This communication, however, will differ due to the heterogeneous platforms in which the communication will occur.

Tasks-to-task communication and file transfers must be supported between a DEC VAX model 810FT and a Sun UNIX platform. The DEC machine is the chosen platform responsible for running the NOC component of the CGS. DECnet/OSI phase V communications have also been chosen to be the interface communications between the CGS and the Distribution Manager. Thus, a network solution must provide two-way communications from the DEC VAX to the Sun using DECnet/OSI phase V networking medium. Also, the NOC will be sending two types of messages: ASN.1 messages for network event and customer configuration information, and normal ASCII messages for call records and other data requests.

Communications between the two machines are performed in several ways. The protocol used on the DEC VAX machine can be loaded on the UNIX machine or the protocol used on the UNIX machine can be loaded on the DEC VAX. Most UNIX machines come standard with TCP/IP as their communications protocol. Thus, several third-party TCP/IP products can be loaded on the VAX machine. This option is less desirable because access to this machine is restricted. For a UNIX machine to communicate with a VAX on a DECnet/OSI network, a communications package that allows the UNIX machine to emulate a DECnet end node can be used. Several companies offer such a package and offer a 4.3 BSD socket level interface for inter-process communications and file transfer routines for Sun to DECnet. This package assists the Distribution Manager in communicating to the NOC. Another way of communicating to the DEC machine is if an OSI protocol stack is loaded onto the Sun machine. The OSI messages is transferred by providing session control API between the NOC and the DM. For messages that are encoded in an ASN.1 format, ASN.1 compilers are repaired on both the Sun and the DEC VAX to properly encode and decode messages.

The task-to-task communication that occurs in order for the Distribution Manager to communicate with the NOC begins by the Distribution Manager allocating an endpoint for communication. This is accomplished by issuing a socket or TLI function. Once an endpoint has been allocated, processed messages from CMIS are placed into a C structure, compiled to ASN.1 format (if necessary), and sent to the VAX machine via the send ( ) function. The VAX machine receives the messages in ASN.1 format, and decompiles them into C structures that utilize binary formatting. The C structures are then used by the NOC to update CGS components.

Task-to-task communication and file transfer will be accomplished through five logical DECnet/OSI links that are maintained by the NOC. For each logical link, there are one or more processes executing at the Distribution Manager and one or more processes executing at the NOC to provide message transfer services between these two entities. The first link is used strictly to send configuration updates and receive configuration data and responses. The second link is used to read configuration or call summary data and return results from a read. The third link is used to send and receive bulk data requests.

The fourth link is used to receive unsolicited call summary records. Finally, the fifth link is used to receive network event messages from the NOC.

CMIS and the Distribution Manager Transactions

Transactions between CMIS and the Distribution Manager are standardized for safe and reliable data transfer. All transactions between CMIS and the DM are preceded by a standard Transaction Header. The header contains fields that uniquely identify the transaction that has been submitted by CMIS. For example, the header contains the transaction id, type, size, class, chaining transaction id, and the date and time of the transaction.

The transaction header allows messages that are functionally dependent to be executed in the correct order by submitting them as part of a larger "chained" transaction. Chaining allows an operation that consists of multiple transactions to be tied together. Chaining is provided by CMIS to ensure that discrete transactions that are related to other transactions are all received by the DM before the DM executes corresponding transactions with the NOC. Note: The order of the chain from CMIS may not always be the correct order to the NOC. For MET registration and some MET updates, the DM ensures that messages are recorded and sent to the NOC in the correct order. If a single transaction within the chain fails, the transactions that follow that transaction are returned to CMIS as unprocessed due to "cascade failures".

Chaining the transaction header provides a Group Id, Sequence field, and Group Count field. The Group Id field is a unique number that will identify all transaction records that belong to a group. The Sequence number identifies the order in which a transaction is submitted from CMIS. The Group Count identifies the total number of transactions within a chained transaction.

Chaining is important for customer configuration update. For example, if a customer wanted to change a VN membership to include a new service and barring within that VN, and delete an associates service and barring, chaining is required. The following individual NOC transactions would have to be chained: delete old MET Service, delete old MET Barring record, add new Service, and add new MET Barring record. If these transactions are not performed sequentially, errors will occur in the NOC.

Transactions between CMIS and the DM will also use a standard transaction response/notification message. This message will provide an acknowledgment of whether the transaction was successful or in error along with a diagnostic code to help communicate to the receiver the nature of a failed request. Standard error code ranges will be reserved for each function in the interface between CMIS and the DM. Samples are as follows:

Errors
    Registration Failed
    Commissioning Failed
    CMIS Transaction in NOC timed out
    CMIS Messages incomplete/timed out
    CMIS VN—Service Relationship Error
    CMIS VN—Call Barring Relationship Error CMIS MT—VN Relationship Error
MT ID or RTIN invalid or non-existent
MT Currently In Use
MT Update Validation Error
Inquiry not successful
Not enough free space on host machine for dump
Not enough free space on target machine for dump
Invalid User
Invalid Password
Password Expired
Login Attempts Exceeded
Login Not Accepted
All messages not received in sequence
Transaction failed due to chain error
Oracle database down

Distribution Manager and NOC Transactions

The CGS provides five logical communication links for data to be exchanged during transactions. The DM sends specific pre-defined header records to the NOC along with a specific verb and with certain fields formatted. The NOC offers several header (.h) files for message communication:

Customer configuration message
NOC update response message
Configuration inquiry response message
Failed unload response message
Load configuration data message
Bulk unload data response message
Call summary request message
Call summary record message
Network event message Within customer configuration messages, object messages (ASN.1 objects) are attached. The objects map directly to the NOC data model and are used to specifically request or modify portions of the NOC customer configuration information. The DM formats the specific objects according to the CMIS operation, supplies the specific NOC action verb in the header, and passes this information to the NOC. The following is a list of valid objects:

Objects
  MET
  VN Membership
  MET Service
  Call Barring
  NR Membership
  MET Access
  MET Class
  MET Information
  Events An example of how the objects relate to a business transaction is as follows: To add a new service to an existing customer with an existing virtual network (VN), the DM sends the NOC a formatted MET Service object within the customer configuration data message with an add action. This action is performed after CMIS informs the DM of the customer service action. Updates to key information require a NOC delete and a NOC add of the information being changed. The NOC requires that objects being changed have values in all fields.

Valid NOC verbs are add, modify, delete, load, unload, show, retransmit and set. The load verb is used when loading in bulk configuration information. The unload verb is used for unloading information to be reconciled. The show verb is used for inquiry purposes. Finally, the retransmit verb is used for retransmission of call summary records.

MET Registration Transaction

Figure 28:
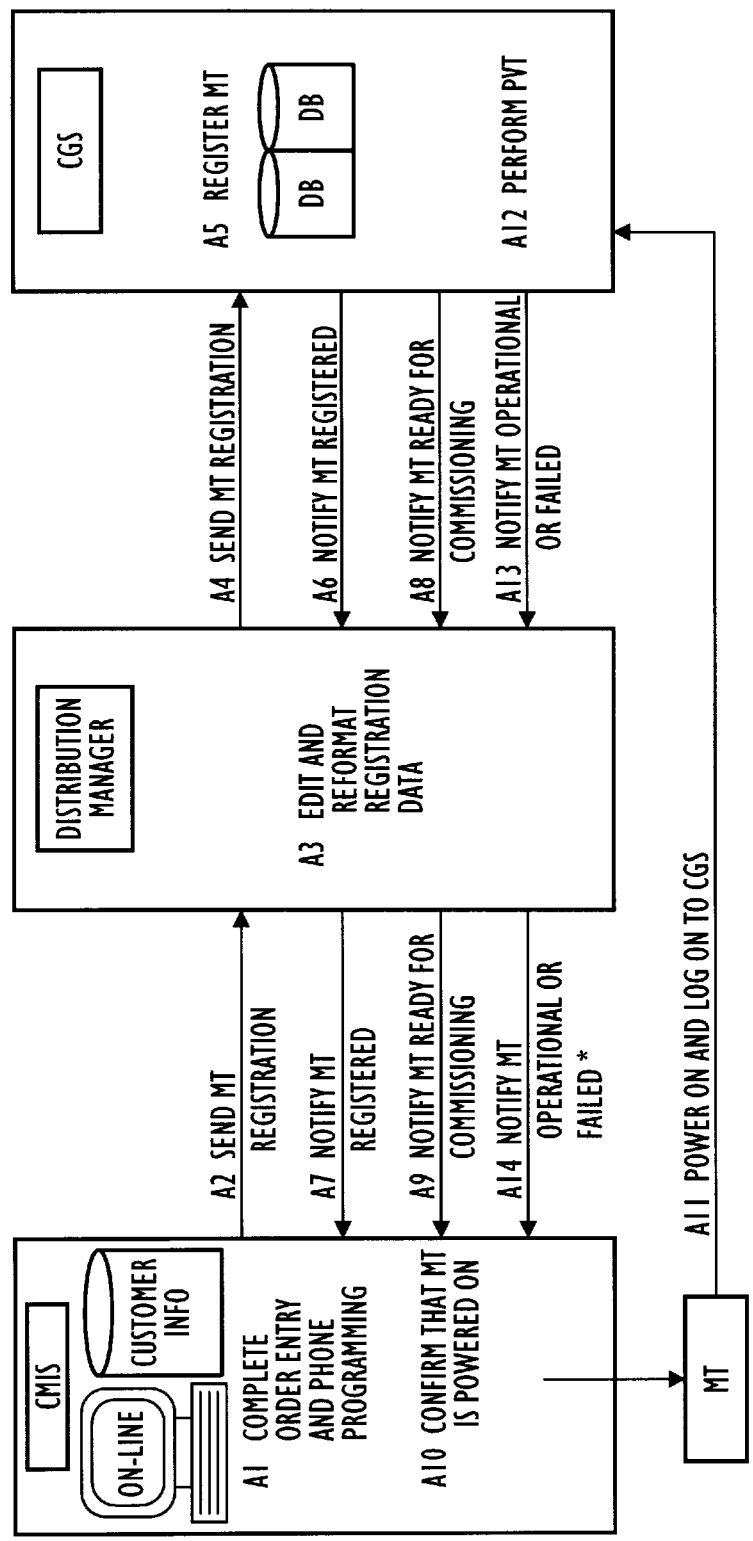
FIG. 28 is a functional block diagram of the process steps implemented by each of the CMIS, DM and CGS systems for MET registration.

Registration data is sent to the NOC from the CMIS when a service order is completed for a MET that has not previously had service or had service that was deleted from the CGS. Service can be for voice, data, fax, alternate voice data (avd) or any combination of these four services. This transaction is only used for an initial request for service: adding features or service types to a MET that has already been registered and not removed from the CGS is performed through a Customer Configuration Update. FIG. 27 is a table of the basic transactions between the CMIS, DM and CGS systems for MET registration. FIG. 28 is a functional block diagram of the process steps implemented by each of the CMIS, DM and CGS systems for MET registration. The MET registration process is described in detail hereinafter.

CMIS MET Registration Actions

CMIS performs order entry activities to support a MET registration. These activities include gathering all pertinent information from the customer and obtaining any data required for registration from external systems such as network engineering/systems engineering. All phone programming activities are completed as part of the order entry process as well.

Order entry verifies that all required registration information has been supplied before committing the new MET information. After a successful commit, Order Entry requests the CMIS ASI product to register the new MET. ASI collects all MET registration data from the tables populated by Order Entry, and formats this information using the various objects that make up a MET registration: MET Information, VN Membership, MET Access, MET Service and Call Barring. The number of transactions created by ASI varies depending on how many services the customer has requested (one MET Service transaction for each service), the number of virtual networks those services are members of (one VN Membership transaction for each VN selected), and the number of call barring lists that apply to each VN membership (one list for each npa or phone number being restricted). For a registration to be valid, only one MET Information record, only one MET Access record, at least one MET VN membership record and at least one MET service record must be received by the DM. No more than 16 VN memberships, 64 MET Service, and 112 Call Barring records can generally be submitted to the DM for a single MET. To indicate that these discrete transactions comprise a registration and are related to one another, they are "chained" together by CMIS. The data is sent to the DM in near real time.

CMIS considers the Registration request complete only after the DM has returned a Response message indicating success or failure for each transaction in the chain. The Response message indicates, in as much detail as possible, the cause of any failure to register/commission. This is not to be confused with receiving the MET Status Change messages. As described below, the CGS updates the status of the MET throughout its process of registering and commissioning the MET on CGS. Each of these status changes are sent through the DM back to CMIS where ASI will populate the database with the interim status changes and the on-line system will have access to that data. This status change update process will allow customer service to stay apprised of the progress the registration is making on the CGS.

Distribution Manager MET Registration Actions

The Distribution Manager receives the registration messages and logs them in its incoming message log. Next, the Distribution Manager translates the multiple messages received from CMIS in the manner expected by the CGS. The CGS has a single object for MET registration that encompasses the MET Information, VN Memberships (with linked service and call barring), and MET Access objects. A VN membership can have the four services and seven call barring elements associated with it linked into one object. As many as 16 VN memberships can be sent in a registration for a single MET.

To create the NOC structure, the DM uses the data supplied by CMIS, and adds fields that CMIS does not require but the NOC expects. Most data in the CMIS supplied objects maps to a CGS object. For each registration, the DM generates the Commanded GSI on the MET Information object by using a last used value that is incremented. Once all the formatting has occurred, the DM sends that registration message to the NOC. The NOC acknowledges receipt of the message through the protocol. An additional application level acknowledgment is sent by the NOC once all data distribution has occurred on the CGS. This response indicates to the DM whether the transaction was successful or whether it failed.

Once the Distribution Manager receives the acknowledgement from the CGS, the status of the message in the log is updated. The DM sends back response messages to CMIS for each transaction that CMIS sent to the DM. Therefore, for one registration event, the DM sends CMIS as few as four but as many as 194 response messages. At this point the transaction is complete.

As described below, the MET registration process internal to the CGS results in several changes in MET status. Each status change results in an event message to the Distribution Manager. The Distribution Manager collects these messages, updates the state of the transaction, and notifies CMIS of each change to the customer status.

The following is a detailed list of Distribution Manager actions for a normal MET registration.

1. The DM receives CMIS MET Registration messages
2. Reformat CMIS record to a common record layout
3. Log message in message log with the status of captured ("C") from CMIS
4. Send to appropriate DM functional server
5. Functional server receives message and updates the status to started ("S)
6. The server will store the object on a DM object table (e.g., VN Membership table)
7. The server will check to see if all messages have been received.
8. Repeat steps 5–7 (message capture) until all messages are received. Perform steps 9–12 if all messages were received.
9. Functional server retrieves data records from database, validates data and reformats the request.
10. Update an outbound CGS queue for this CMIS MET registration
11. Check the status of the NOC link before sending
12. Send message to NOC and update the message status to sent to the CGS ("G")
13. Receive NOC acknowledgment
14. Convert acknowledgment into a common record layout
15. Log the message as captured
16. Update the functional status of the MET registration message to being acknowledged
17. Receive registration status message—event message
18. Convert ASN.1 status message into common record layout and log it as captured
19. Update the functional status of the registration to being registered
20. Format a MET Status Change response
21. Check the CMIS link before sending
22. Send the MET Status Change response to CMIS
23. Receive readily for commissioning status message—event message
24. Convert ASN.1 status message into common record layout and log it as captured
25. Update the functional status of the registration to being ready for commissioning
26. Format a MET Status Change response
27. Check the CMIS link before sending
28. Send the MET Status Change response to CMIS
29. Receive operational/failed status message—event message
30. Convert ASN.1 status message into common record layout and log it as captured
31. Update the functional status of the registration to being operational/failed
32. Format a MET Status Change response
33. Check the CMIS link before sending
34. Send the MET Status Change response to CMIS
35. Update the functional status of the registration as being complete
36. Send a CMIS Response message to CMIS for each discrete transaction in the chain CMIS originated indicating that the transaction is complete.

CGS MET Registration Actions

The process on the CGS for completing a MET registration has several steps. Once registration data is received, the NOC logs the data in its database and distributes pertinent information to the Group Controller, SLSS, and Switch. At this point the success or failure of the transaction is determined by the NOC. If data distribution was successful at all CGS elements, the transaction status is successful and the commissioning process continues. If any problems result, the NOC rolls back the entire transaction and considers the transaction a failure. Either success or failure is communicated back to the DM through an update response message.

After data distribution, the NOC updates the MET status to Registered. An event will be sent to the Distribution Manager with the change in MET status. When all databases are synchronized, the MET is Ready for Commissioning and the status is changed. An event will be sent to the Distribution Manager with the change in MET status. The MET will then be Performance Verification Tested (PVT). If the test is successful, the status of the MET is set to Operational, and normal call processing is allowed. If the PVT detects a problem, the MET status is set to Fail/Repair.

Whichever MET status results from the PVT, an event will be sent to the Distribution Manager. At this point registration is complete. The MET requires repair and a status change would be required to have the MET status updated to Operational (see Customer Configuration Update Transaction).

MET Registration Errors in CMIS DM and CGS

The following errors pertain specifically to the MET Registration process. The following application error conditions may occur during a MET registration.

The DM does not receive all request messages from CMIS

In this situation, the DM waits to collect all messages for a registration. Every time a message is collected, this check is performed. The transaction is not submitted to the NOC until all messages are collected. The DM uses the Group Count and Sequence fields in a header to determine how many transactions are expected. At a specified interval, a DM process recognizes that the transactions have been waiting and will time out the transactions. At this point, the DM returns a diagnostic message for all CMIS objects that it has captured and logged the error within the DM. The transaction is either resubmitted or manually fixed. The timed out transactions may be reported on daily by a DM process.

DM discovers relational validation errors in CMIS messages

In this situation, the DM determines that a required field or object in the CMIS request messages is missing or that data within the message is invalid. At this point, the DM has received all the messages sent from CMIS. The DM logs this error and returns CMIS MET response messages for each of the objects within this group transaction. The group transaction from CMIS is declared in error. Customer service representatives submit the information again with the correct information.

The NOC discovers field and relational validation errors.

In this situation, the NOC determines that a required field in the message is missing or that data within the message is invalid. The NOC sends a CGS Response with the error message attached. The Distribution Manager logs this error and returns proper diagnostic codes for each of the objects associated to the CMIS grouping of transactions to CMIS. If additional NOC actions are chained to the error, the objects associated with the grouping of transactions are returned with chain failure errors.

MET already exists or already operational.

In this situation, the NOC determines that a MET already exists and/or is operational. The NOC sends a CGS Response with the error message attached. The Distribution Manager logs this error and return a proper diagnostic code for each CMIS request object back to CMIS.

CMIS never receives a registration response or receives a response that does not match a request If CMIS never receives a registration response from the NOC, the Distribution Manager detects that this transaction has remained open and declares it defunct after a specified time-out period. At that point, the Distribution Manager logs this error and returns a proper diagnostic code for each object to CMIS. Operations personnel will subsequently react to this situation.

MET registration failed

In this situation, the Distribution Manager passes the failed diagnostic to CMIS. It will treat this transaction as ending normally.

The following error codes are applicable for MET registration:
Registration OK
Registration Failed
Commissioning Failed
CMIS Transaction in NOC timed out
CMIS Messages incomplete/timed out
CMIS VN—Service relationship error
CMIS VN—Call Barring relationship error
CMIS MT—VN relationship error
Invalid Data

Configuration UPdate Transaction

Figure 30:
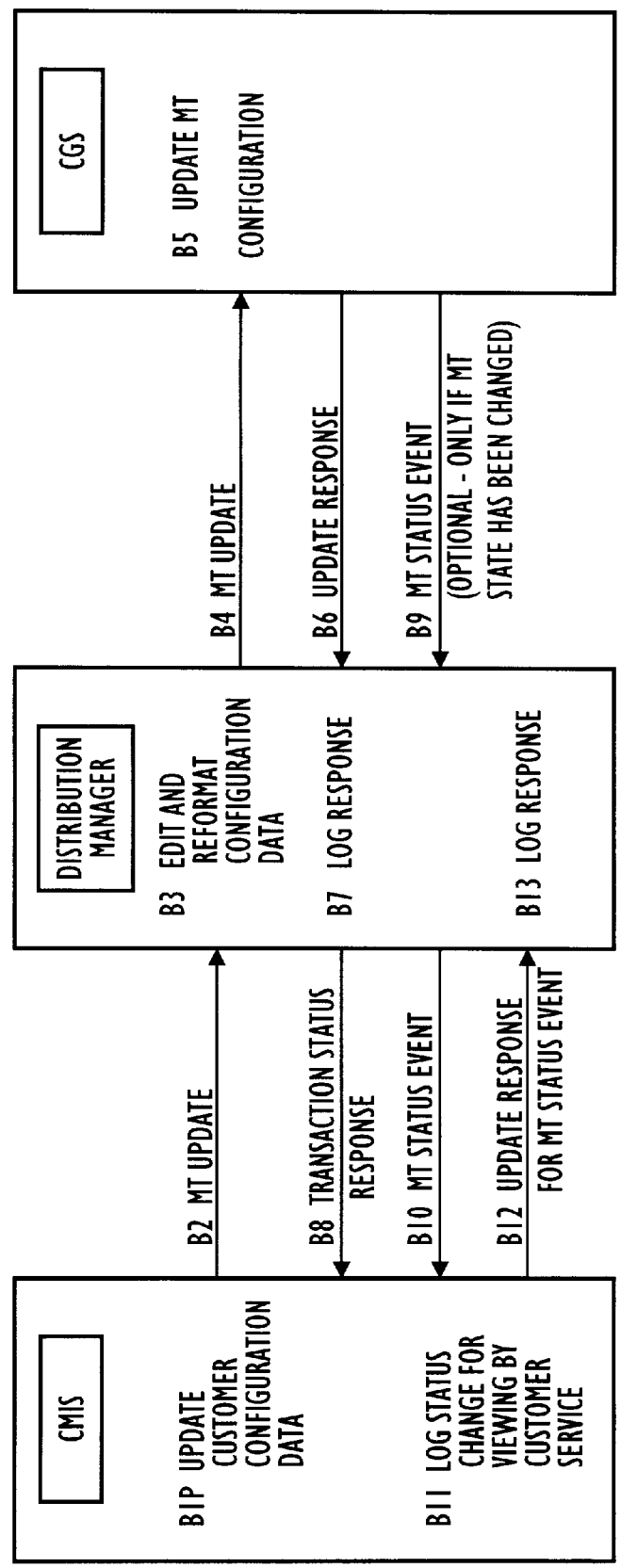
FIG. 30 is a block diagram for the configuration update transaction illustrating the sequential steps for same.

Any change in a configuration of service or equipment that impacts usage of the network must result in a Configuration Update transaction. Changes to the status of the MET are also accomplished through a configuration update transaction. These types of changes result not only in an acknowledgment from the CGS of the success or failure of the transaction but also in an event message indicating that the MET's status has been changed on the CGS. FIGS. 29a–29e are tables of update transactions illustrating the effected components. FIG. 30 is a block diagram for the configuration update transaction illustrating the sequential steps for same.

CMIS Update Transaction Actions

Actions in the on-line system such as adding or removing services and features, upgrading equipment, deauthorizing or re-authorizing an MET are completed and the changes to the database committed. At this point CMIS notifies the ASI that a customer configuration update to the CGS is required and the ASI gathers the required data and formats the appropriate objects with all pertinent data for that MET.

Updates encompass data that has been added, modified or deleted from the CMIS database. ASI sends the messages to the DM. Certain functional scenarios impact several data objects. In these cases where the data is sent on various objects but the actions must be performed on CGS in a certain order, CMIS sends the data objects in a chain. In some cases, CMIS uses discrete data objects for VN Membership, Service and Call Barring that can be linked into a single message to the CGS. Chaining is used in this scenario and the DM makes the proper translation.

Any notification of a transaction's success or failure is matched to the original CMIS transaction and made available for viewing by the customer service personnel. Any change in MET status is also posted to a database where a customer service representative may access it to help diagnose customer problems.

Distribution Manager Update Transaction Actions

The Distribution Manager receives one or more customer configuration messages from CMIS in the appropriate object with a corresponding verb. Many messages from CMIS may be combined by the DM into various linked objects that are recognized by the NOC when the same verb applies to all sub-objects. Because some of the configuration update events require two or more messages to the NOC, the DM receives each component of the transaction as a separate message and maintain status on all inter-dependent messages. The DM utilizes the previously described chaining mechanism to define inter-dependency between objects.

Once the Distribution Manager receives an update message, it logs the update message in its incoming message log. The Distribution Manager validates the message and waits for all components of the chained messages before providing with any actions. The DM formats a message by adding any fields that the CMIS does not require but the NOC expects and by eliminating any data the CMIS provides by the NOC does not require for the particular action being carried out. At this point, the DM converts the message to an ASN.1 format. Before DM sends the message to the NOC, it checks to make sure the message is in proper sequence. This sequence check is an important step to make sure multi-component transactions are executed in the right order. If the sequence is out of order, the DM holds the message until the sequence is correct or until the transaction becomes defunct. If the sequence is correct, the DM sends that message to the NOC.

The NOC then returns an update results message for each NOC message that is sent from the DM. The Distribution Manager receives the update results message, logs it and updates the status of the message. In cases of chained objects where the success of one dictates whether the next object in the sequence would be successful, the DM waits for a response to the first message to the NOC before attempting to send the next. If the first message fails, all subsequent objects/messages fail by default and the DM returns multiple response messages to CMIS indicating cascade failures.

As described below, the NOC may send an unsolicited MET Status change message that deauthorizes the MET. In this situation, the DM logs the incoming event message and returns a MET status change response to CMIS. CMIS uses this information to notify the users of an impending change.

The following is a detailed list of Distribution Manager actions for each MET configuration update (i.e., 1 message out of the chain):

Perform steps 1–20 for any CMIS initiated configuration update.

Perform steps 21–29 for any CGS initiated events.

1. The DM receives CMIS MET Configuration object.
2. Reformat CMIS record to a common record layout.
3. Log message in message log with the status of captured ("C") from CMIS.
4. Send to appropriate DM functional server.
5. Functional server receives message and updates the status to started ("ST").
6. The server will store the object on a DM object table (e.g., VN Membership table).
7. The server will check to see if all messages in a chain have been received.
8. Repeat steps 5–7 (message capture) until all messages are received. Perform steps 9–20 for each message to be sent to the NOC when all messages were received from ASI.
9. Functional server processes, fills data fields, and reformats the request to CGS_MET_Config message.
10. Check the status of the NOC link before sending.
11. Send message to NOC and update the message status to send to the CGS ("G").
12. Receive NOC update response.
13. Convert CGS_Response message into a common record layout.
14. Log the message as captured.
15. Update the functional status of the MET configuration update message to be updated by the NOC.
16. Format a CMIS response message.
17. Check the CMIS link before sending.
18. Send the response to CMIS
19. Update the functional status of the transaction as being complete.
20. Send a CMIS Response message to CMIS indicating that the transaction is complete.
21. Receive unsolicited MET status change response event message NOC_Event.
22. Convert ASN.1 message into common record layout and log it as captured.
23. Format a MET Status Change response.
24. Check the CMIS link before sending.
25. Send the MET Status Change response to CMIS
26. Receive update response from CMIS.
27. Log the message as captured.
28. Update the functional status of the unsolicited message.
29. Update the transaction as being closed.

CGS Configuration Update Transaction

The NOC posts any changes in the customer configuration to its database and distributes needed data to the GC, SLSS, and switch. Once distribution of the data is completed, the NOC sends a response transaction for the update that indicates success or failure. In cases where the configuration update included a change to MET commanded state, the NOC also sends an event message indicating the change in MET status. Configuration update is controlled by the CMIS—the only circumstances under which the CGS should change the configuration of a MET without a direct request from the CMIS is when fraud or equipment failure is detected by the CGS and the system changes the MET's commanded state to indicate deauthorized for fraud or failed/repair.

In the event that the NOC cannot update a sub-object that is linked to other sub-objects, a rollback of the entire NOC transaction occurs. All update attempts within the transaction fail and error diagnostics are returned in the NOC response message.

Configuration Update Errors

The following errors pertain specifically to the MET configuration update process.

The NOC discovers field and/or relational validation errors

In this situation, the NOC may determine that a required field in the message is missing or that data within the message is invalid. The NOC sends a CGS_Response with the error message attached. The Distribution Manager logs this error and return a proper diagnostic code to CMIS.

CMIS never receives an update response or receives a response that does not match a request If an update request never receives a response from the NOC, the Distribution Manager realizes that this transaction has remained open and will declare it defunct after a period of time. At that point, the Distribution Manager logs this error and return a proper diagnostic code to CMIS. Operations personnel will have to react to this situation.

MET Configuration update failed because of functional reasons

The reason for failure may be the following: VN Membership does not exist for modifying, MET record does not exist for modify, call barring record already exists, call barring record not found for the VN membership, call barring record was not found for deletion, MET service already exists, MET service record not found, MET information record not found, MET VN membership record already exists, etc. In this situation the Distribution Manager passes the failed diagnostic to CMIS. It treats this transaction as ending normally.

MET Configuration update becomes defunct because of sequencing problems

In this situation, the Distribution Manager may hold on to certain transactions that will not be sent to the NOC because it is waiting for a prior message to be captured or return from the NOC. The status of this message is updated to defunct and the DM will pass the failed diagnostic to CMIS.

Valid CMIS Diagnostic Codes

Update or Delete OK
MET ID or RTIN invalid or non-existent
MET Currently In Use
MET Update Validation error

Configuration Incuiry/Reconciliation Transaction

Figure 33:
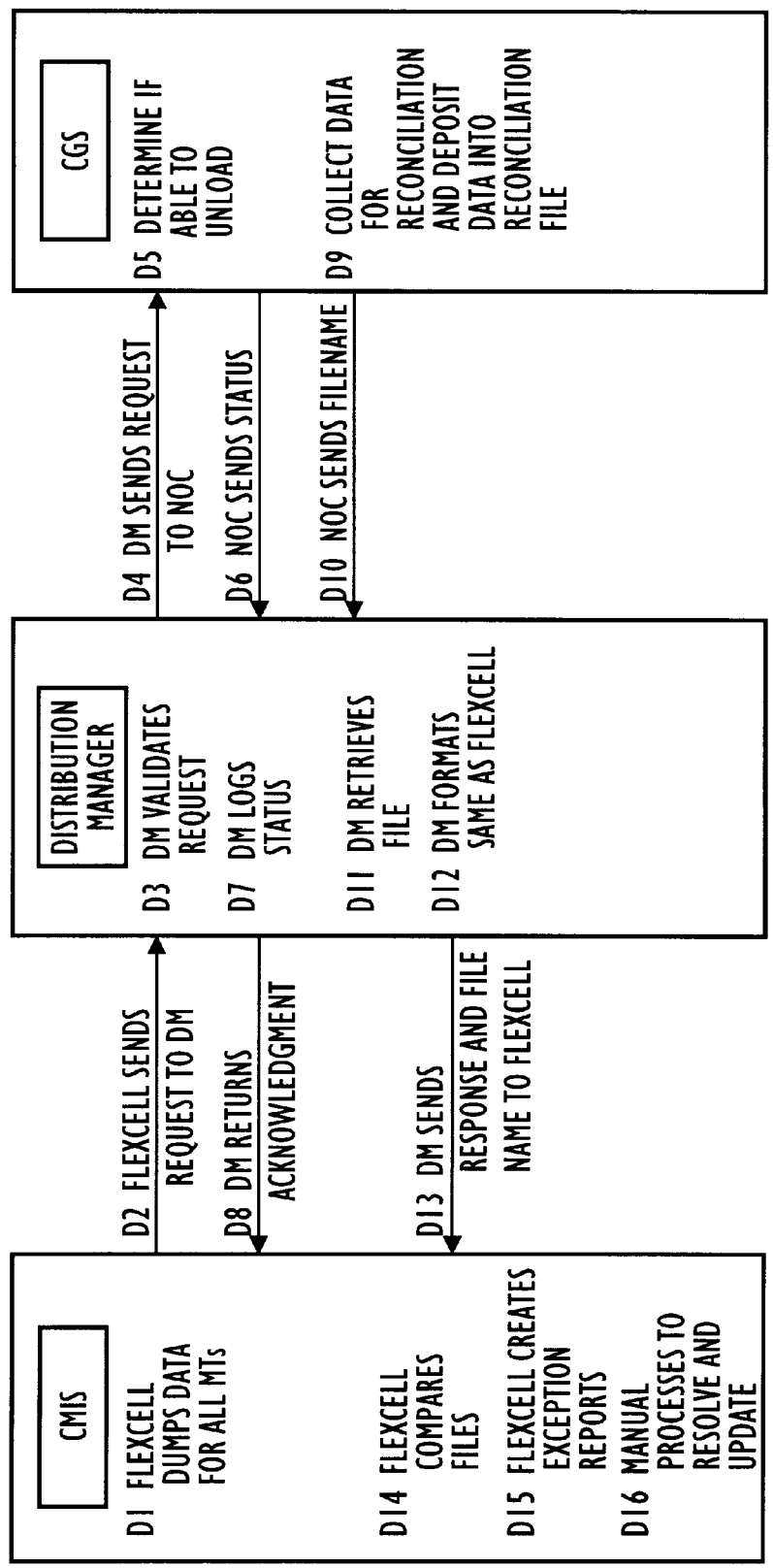

Configuration data is requested by the CMIS under two circumstances. The first is through an on-line process used to inquire on a single MET. The second is through a bulk data transfer of MET Registration data for all METs on the CGS. The results of the bulk inquiry are used to reconcile the data between CMIS and the NOC. FIG. 31 is a table of configuration inquiry/reconciliation transactions illustrating the effected components. FIGS. 32 and 33 are block diagrams for the configuration inquiry and reconciliation transactions illustrating the effected components, respectively.

CMIS configuration inquiry/reconciliation transaction

While attempting to provide service to a customer, a Customer Service Representative (CSR) may need to confirm how the CGS has the MET registered. While on the phone with the customer, the CSR can invoke the inquiry transaction and receive back the NOC's data for the MET. If the CSR finds that there are differences in the MET's configuration data, he/she checks with the customer as to the appropriate configuration and updates and corresponding database. If the CMIS is correct, the changes must be passed to the CGS for updating through the Customer Configuration Update transaction. To perform an update when CMIS data is not changed may require operator involvement. If the CGS data is correct, the CMIS customer database is updated. In this case, it is not necessary to transfer the update data to the CGS since the change was made to be synchronized with the CGS. However, by updating the database it may not be possible to distinguish that it does not need to be sent to the CGS and an update will be performed anyway. From this point in the process, the updating is the same as that under Customer Configuration Update.

For single MET inquiries, CMIS initiates the request for MET data and sends this request to the DM using the MET Key object and the "Show" verb. CMIS only inquires on the entire MET, not any sub-objects of the MET. CMIS receives an acknowledgment from the DM indicating the success or failure of the inquiry. In addition to the acknowledgment, CMIS receives the inquiry information in the various object messages that CMIS uses for MET registration (MET Information, MET Access, VN Membership, MET Service, Call Barring). In this situation, the DM only returns one response transaction and many data objects since CMIS sent only one request.

For bulk MET inquiries, an operator commits a MET Data Dump request to CMIS. CMIS will use the MET Key object and the "Unload" verb in its request for bulk data to the DM. CMIS then passes this message onto the DM, and receives an acknowledgment from the DM of the impending dump once the DM has been notified by the NOC. CMIS receives the transaction file dump in the directory specified as part of the response notification received from the DM.

An off-line file compare is done between the data the NOC supplies and the corresponding data from the CMIS database. Any discrepancies are written to error reports. At this point human intervention is required to investigate the discrepancies. Audit trails within CMIS and possible calls to customers will aid in determining which system's data is correct. Updates are accomplished by changes to the customer database when CMIS is found to be in error. These changes are automatically sent to the NOC in the process defined for Customer Configuration Update. When it is found that the CMIS database is correct, a CSR is instructed to populate the database with update requests for the ASI. This update process requires operator intervention since no changes are made to CMIS, but the ASI must send update transactions to the DM. In cases of large numbers of updates for the NOC, a file may be created through ad hoc processing. Operator intervention to initiate the job to send the file to the NOC is required as part of the DM.

Distribution Manager configuration inquiry/reconciliation transaction actions For single MET inquiries, the Distribution Manager receives a customer configuration message from CMIS with the proper CGS action verb and the correct selection keys. After the DM receives the single inquiry request, the DM logs the message, records its status, and then forwards the request to the NOC. The DM only receives a response message from the NOC when the inquiry attempt cannot be initiated. Successful inquiry is interpreted by the DM when the NOC returns the configuration data for the initial inquiry request. In either case, the DM creates an acknowledgment to CMIS.

Once the DM receives a successful single MET Inquiry response from the NOC, the DM decomposes the NOC MET message into a CMIS MET Information message, a CMIS MET ASK message, CMIS VN Membership message(s), CMIS MET service Message(s), and CMIS Call Barring messages. The DM returns these messages as well as the acknowledgment in a chained format to CMIS. For bulk inquiries, the Distribution Manager receives a customer configuration message from CMIS with the proper CGS action verb to unload all data in the customer configuration database. Once the DM receives the bulk data request, it logs the message, records its status, and then forwards the request to the NOC. Once the NOC notifies the DM that it is initiating the unload or that it cannot perform the unload, the DM returns an acknowledgment to CMIS reflecting this status of the transaction.

When the NOC is able to perform the unload, it returns a file transfer message indicating the directory and file name of the unloaded data file(s). The DM captures the message, updates the DM's request status, and performs a file transfer (FTP) operation to copy the reconciliation file from the NOC machine to the CMIS machine in a directory that was specified by the initial CMIS request. After the file transfer is complete, the transaction status is updated and the DM sends a response message to CMIS signifying the end of the inquiry transaction.

The following is a detailed list of Distribution Manager actions for a single MET inquiry:

1. The DM receives CMIS MET Key object with the show action.
2. DM reformats CMIS record to a common record layout.
3. Log message in message log with the status of captured ("C") from CMIS.
4. Send to appropriate DM functional server. Server to handle MET inquiry
5. Functional server receives message and updates the status to started ("S").
6. Functional server processes and reformats the request to CGS_MET_Config message.
7. Check the status of the NOC link before sending.
8. Send message to NOC and update the message status to send to CGS ("G").
9. Receive NOC inquiry response.
10. Convert CGS_MET_Config or CGS_Response from ANS.1 into a common record layout.
11. Log the message as captured.
12. Update the functional status of the MET inquiry message.
13a. If the inquiry failed, format a CMIS response message indicating the error OR
13b. Format CMIS MET message (MET Information, MET Access, VN Membership, Call Barring, MET Service) to be written to CMIS in a chain.
14. Check the CMIS link before sending.
15. Send the response message or multiple MET data messages to CMIS.
16. Send a CMIS completion transaction message to CMIS only if NOC inquiry was successful.
17. Update the functional status of the inquiry as being complete.

The following is a detailed list of Distribution Manager actions for MET bulk data unload:

1. The DM receives CMIS MET Key object with an unload action.
2. Reformat CMIS record to a common record layout.
3. Log message in message log with the status of captured ("C") from CMIS.
4. Send to appropriate DM functional server.
5. Functional server validates and reformats the request to CGS_Unload_Command.ASN message.
7. Check the status of the NOC link before sending.
8. Send message to NOC and update the message status to send to the CGS ("G").
9. Receive NOC response of a bulk inquiry receipt.
10. Convert CGS—Response from ASN.1 into a common record layout.
11. Log the message as captured.
12. Update the functional status of the MET unload message.
13. Format CMIS acknowledgment message.
14. Check status of CMIS link.
15. Send acknowledgment to CMIS.
16. Transaction ends if NOC response is in error.
17. Receive NOC response of a transfer file.
18. Convert CGS_Xfer-File from ASN.1 into a common record layout.
19. Log the message as captured.
20. Update the functional status of the MET unload message.
21. Perform a VAX—Sun file transfer operation (synchronously) if the unload was successful.
22. Format a CMIS Response message.
23. Check the CMIS link before sending.
24. Send a CMIS completion transaction message to CMIS
25. Update the functional status of the registration as being complete.

CGS configuration incuiry/reconciliation transaction action

The NOC queues transactions requesting an inquiry and service them when its workload permits. Once the NOC is able to respond to the request for data, it creates a transfer file with the data it has for a MET in the format of the registration transaction using the MET object that encompasses sub-objects of the MET. The NOC sends a message to the DM indicating the name of the unload file(s) and the location of those files. At this point the transaction is complete at the NOC.

When the reconciliation process results in changes to customer configuration that are not sent through the Customer Configuration Update process but through a bulk file transfer, the NOC accepts a message from the DM indicating the name and location of the upload files, retrieves those files and performs a batch upload process for the update configuration data. The NOC also sends a response to the DM indicating that the load command has been received and the status of the pending NOC action.

Configuration inquiry/reconciliation transaction errors

The following errors pertain specifically to the request customer configuration data/bulk unload process.

The NOC discovers field and/or relational validation errors

In this situation, the NOC determines that a required field in the message is missing or that data within the message is invalid. The NOC sends a Y_CGS_Response with the error message attached. The Distribution Manager logs this error and return a proper diagnostic code to CMIS.

CMIS never receives an inquiry response from the NOC

If an inquiry/reconciliation request never receives a response from the NOC, the Distribution Manager realizes that this transaction has remained open and declares it defunct for a period. At that point, the Distribution Manager logs this error and returns a proper diagnostic code to CMIS. Operations personnel will have to react to this situation.

Inquiry record does not exist for given key

The NOC returns an error that information does not exist for the request key. This error may also be manifested by declaring a key to be invalid. In any case, the DM logs the error and pass a diagnostic along to CMIS indicating the problem.

DM receives file creation problem from NOC bulk data unload

This situation, the Distribution Manager receives an error response from the NOC indicating a file creation problem. This problem may range from an out of space error or too many records in file, etc. The DM receives the message, logs the record, updates the status on the transaction and notifies CMIS.

DM receives a file transfer error from a NOC bulk data unload

In this situation, the Distribution Manager encounters an error with transferring the NOC data file to the CMIS machine. This error may be caused by an invalid directory name or communications problems between the NOC and CMIS. The DM properly traps this error, updates the status on the transaction and notifies CMIS.

Valid CMIS Diagnostic Codes

Inquiry OK

Inquiry Not Successful

Not enough free space on host machine for dump

Not enough free space on target machine for dump

Normal Call Record Processing Transaction

CMIS accepts the call records from the DM that have been edited and formatted by the DM and logs them unrated into a file. Call records specifically containing PVT results are separated from the billable call records and processed as PVT results. The billable call records are then further reformatted to an internal billing format. These billing call records are sent through the rating process, which includes matching the call billing record with the pre-selected rate plan and assessing all applicable call-specific charges (i.e., airtime, beam surcharges, long distance charges, feature charges, taxes). The rated billing call records are then stored and available for on-line inquiry through CMIS. Depending on the type of customer (i.e., direct distribution or external distribution channel), the record would then be passed on to the billing process for customer billing, and/or reformatted to an external call record standard (such as CIBER) and passed on to another carrier or clearinghouse. Regardless of customer type, all call records are eventually passed to the billing process for accounting purposes.

Figure 35:
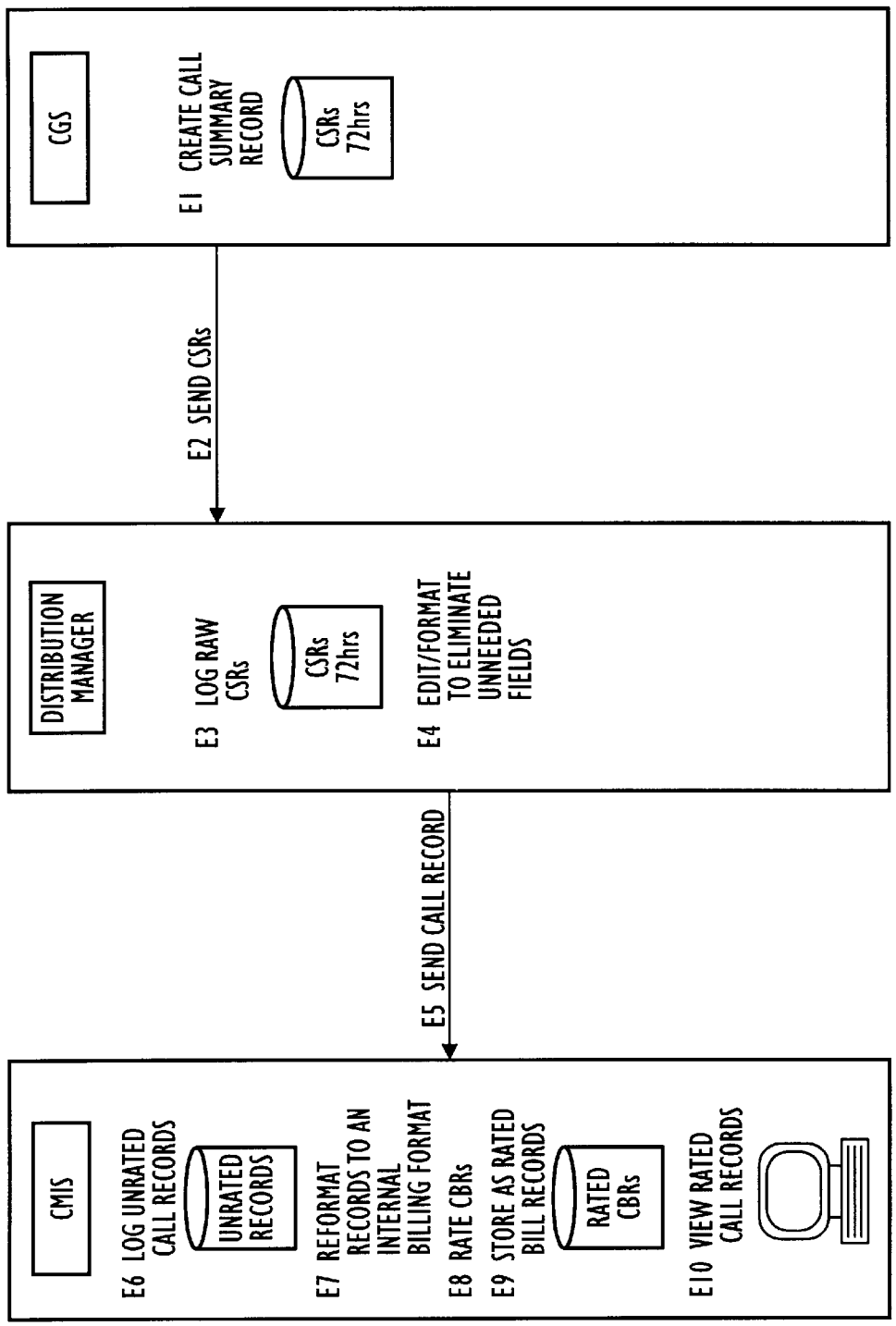
FIG. 35 is a block diagram for the call record processing illustrating the effected components.

The ASI tracks and logs in a database table all discontinuities in the batch number assigned by the DM for call records. If the number of rows in the table exceeds an assigned table-driven threshold, the ASI shuts down. Before the ASI is restarted, the table will be examined and cleared manually. When the ASI is restarted through manual intervention, the missing records are requested as a range of batches or individual batches if the missing batches are not sequential. After all missing batches have been recovered, the normal flow of call records are reinitiated by DC through an open-ended request to download call records. FIGS. 34a–34c are tables of call record processing transactions illustrating the effected components. FIG. 35 is a block diagram for the call record processing illustrating the effected components. The details of the call record processing are discussed below.

Distribution Manager Call Processing Transaction Actions

The Distribution Manager accepts the Call Summary Records from the NOC and logs them as captured into the DM message log as soon as connections are established to the NOC. A dedicated DM listening process establishes connections with the NOC call summary link during startup. This link is used only to send call summary records. The DM accepts the incoming messages from the dedicated link. No application level response message is required back to the NOC over this link. A verification process is performed to ensure call summary record completion and to identify what type of call record is represented by the CSR.

To identify call record type, the DM uses information contained in the call record header. Several types are:

Mobile Telephone Service (MTS) call (voice, fax, 2400 data, 4800 data or avd)

Performance Verification Test (PVT) call

Net Radio (NR) call

MET Operations call

The MTS call type is a billable call record on which the DM performs a first edit, and reformats to eliminate redundant or unneeded fields. These call records are then stored in DM's database to be sent to CMIS for further processing and rating and billing. The process of sending billable call records to CMIS is described below.

PVT call records are not billable call records but do need to be passed on to the CMIS for customer service review and problem diagnostics. PVT records are logged and edited by the DM and sent to CMIS in the same manner as a billable call record. CMIS recognizes the different call record types and process them accordingly.

The DM uses Batch Ids along with a julian date and time to properly sequence the call records to CMIS. Batch Ids ranging between 000001 and 999999 are sent from CMIS to retrieve and return valid CSRs from the DM. A Batch Id of 1 with the current date and time will indicate initial system startup. The Batch Id number will continue to be incremented as new CSR batches are sent by the DM to CMIS in order. If the Batch Id reaches 999999, the DM reinitializes it to 000001. The date and time fields will ensure that a batch is uniquely identified in case the batch number is reincremented during the day or if CMIS is down for a prolonged period.

The Start Call Download record contains two fields that are critical or important in the processing of these call batches. The first, Maximum Batch Delay, contains the maximum number of seconds that should elapse before the DM must send a batch of call records. In the event that none are available, an empty batch with a Batch Id of 000000 should be sent. This indicates to CMIS that the DM is still ready to process but no call records are available. CMIS will allow between 25 to 50 percent more time than given in the Maximum Batch Delay before logging the problem.

The other critical field, Maximum recs per Batch, indicates the maximum number of call records that should be put in a single batch before it is sent to CMIS. If the number of call records available is less than this value and the Maximum Batch Delay is reached, the batch must be sent anyhow.

For CMIS to request retransmits from the DM, after a shutdown, CMIS sends a Start Call Download request to the DM which indicates the range of CSRs to be sent by populating a Starting Batch ID, the Number of Batches filed, and the date and time of when CMIS went down in the Start Call Download record. The DM uses these fields to return the correct number of batches to CMIS for the download request. The DM waits for another Start Call Record Download request, either open-ended for normal call record flow or pre-defined range, before sending any batches.

The following is a detailed list of Distribution Manager actions for normal call summary processing:

NOC CSR Receipt

1. A listener wakes up and establish a communications endpoint for NOC call summary messages.
2. The DM receives NOC Call Summary Record.
3. Reformats NOC record to a common record layout.
4. Logs message in message log with the status of captured ("C") from NOC.
5. Sends to appropriate DM functional server.
6. Functional server receives message and updates the status to started ("S").
7. The functional server determines what call type is represented by the CSR.
8. The server makes sure that the call records are complete (no half call records).
9. The functional server strips any unnecessary fields.
10. If the call record is complete, the functional server stores the message in its database.
11. If the call record is not complete, the DM stores the message but log an error condition noting the discrepancy.

CMIS Requests for Downloads

1. A DM process interfacing to the CMIS starts and establishes a communications endpoint for call summary record transmission.
2. The DM receives CMIS Start Call Download message.
3. Reformats CMIS record to a common record layout.
4. Logs message in message log with the status of captured ("C") from CMIS.
5. Sends to appropriate DM functional server.
6. Functional server receives message and updates the status to started ("S").
7. The DM uses the starting Batch Id, the date and time to retrieve the call records form its database.
8. The server makes sure that the call records are complete (no half call records) and that none are missing.
9. If the check is OK, the functional server properly combines call records into a batch, sequence the batch message and write it to a CMIS outbound queue. The server writes as many call records as it can based on the Max Records per Batch.
10. The server creates as many batches as it can from CSRs in its database.
11. The DM process receives a return from the functional server.
12. The DM process reads the CMIS inbound queue for CSRs to be returned to CMIS.
13. The DM process checks the CMIS link.
14. The DM process sends CMIS a batch at a time in sequence until there are no more batches to be sent.
15. The DM process updates the status of the CSRs to be sent.

CGS Call processing Transaction Actions

The Group Controller (GC) sets up the call after determining a MET's ability to make or receive the requested call type. The GC then begins a call record with the pertinent information on satellite usage and hands off the call to the switch. The switch creates an AMA record. At call completion, the GC tears down the call and sends the performance record to the NOC. The switch record is also forwarded to the NOC at call completion. The NOC applies an algorithm to merge the records, resulting in a Call Summary Record. The NOC adds header information to the call detail in creating a CSR. The NOC bundles one or more CSRs into a block before sending it to the DM. Call record transfer is an unsolicited event occurring on a one-way logical link from the NOC to the DM.

Errors for Call Processing Transaction

The following errors pertain specifically to Call Record processing. The following application error conditions may occur during call record processing:

NOC discovers field and relational validation errors for a retransmission

In this situation, the NOC determines that a required field in the message is missing or that data within the message is invalid. The NOC sends a CGS_Response with the error message attached. The Distribution Manager logs this error and return a proper diagnostic code to CMIS. Operations have to be alerted to retransmit this summary record since the call record recovery process will receive this same error if it tries to recover this call record.

DM may not receive all the components of a call summary record

If the DM does not receive all the components of a CSR, the DM does not send it through to the CMIS since it will not be able to bill it properly. Thus, the DM logs the error in its error log and continues to log it through the Call Recovery Process until the situation is corrected by operations.

The DM detects gaps in cal summary records

The Call Record Recovery process reconciles any call records that may be missing from the DM's database. The recovery process notes the discrepancy either in the error log or in a separate call recovery log before performing a request against the NOC. Note, the DM does not hold up any CSRs due to a gap. The CSRs that are missing will be transmitted to the CMIS at a later time.

The DM-CMIS link for call records may be unavailable or down

In this case, the DM still receives CSRs from the NOC but does not send any requests to CMIS until the CMIS recovers. The DM recognizes the situation and log the error. Operations may have to restart the DM process that interfaces to the CMIS. The CMIS recovers and sends the last batch transaction that it received to reinitiate the download process of CSRs.

Invalid Call Summary ID for call record Request

In this situation, the CSR ID specified by the DM, within the CGS_Call_Command transaction does not exist in the NOC database. The NOC sends an appropriate error message response, the DM logs this error and sends a diagnostic code to CMIS. Apparently, the two databases may be out of synch and will need to be reconciled.

The CMIS may be missing call summary batches

CMIS shuts down after a threshold has been reached for missing CSR batches. Each occurrence is logged by CMIS. If the threshold has been reached, operations must manually determine the source of the errors. Operations can retrieve batches of CSRs from the DM by starting a call record download using batch id ranges. This process is performed off-line (i.e., outside peak processing hours).

The DM receives garbled data

If the DM receives garbled data, chances are that the DM can not establish the correct communications link with the NOC. Thus, a large majority of the messages will not be received or will be accepted and logged and acted on inappropriately. There should be indications of this failure to operators who will be monitoring the activity of the DM and CMIS. However, there may be a threshold value that the DM will use to shut down after a number of attempts to receive data from the NOC.

DM never receives response from NOC for a Call Summary Request

In this case, the DM never receives a response from a CGS_Call_Command transaction. To recover from the error, the Distribution Manager realizes that this transaction has remained open and declares it defunct for a period. At this point the DM logs this error in its error log.

PVT Request

Figures 36, 37:
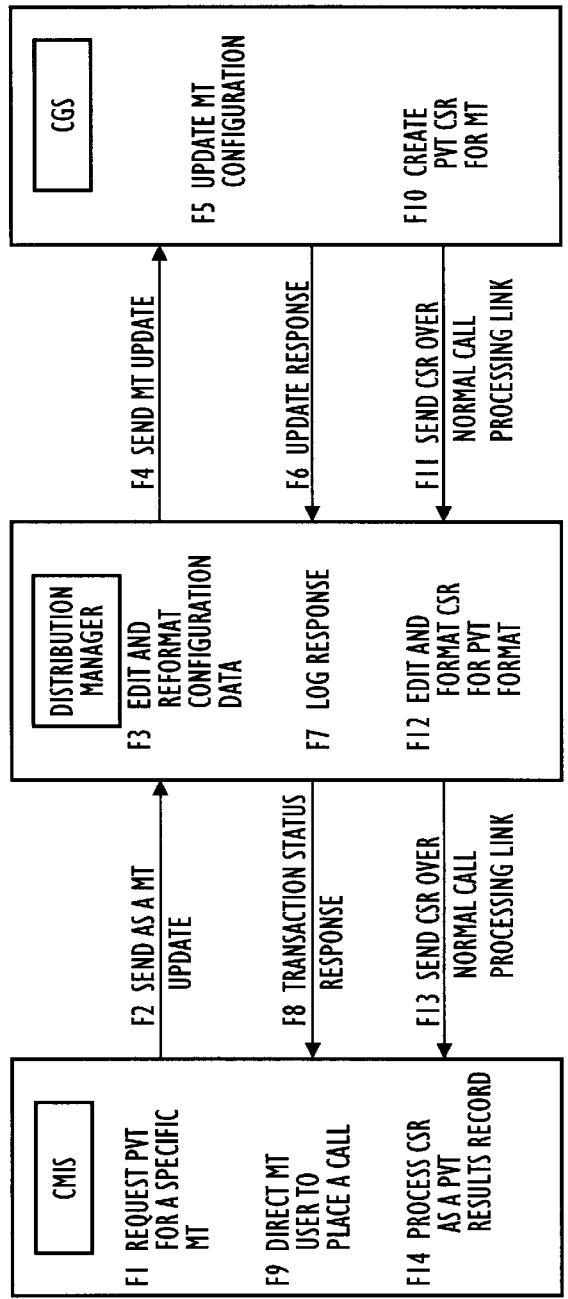
FIG. 36 is a table of PVT transactions illustrating the effected components.
FIG. 37 is a block diagram for the PVT transactions illustrating the effected components.

A customer service representative requests a Performance Verification Test (PVT) for a specific MET when it is suspected that the MET is malfunctioning. This request is accomplished by updating the MET Information object to indicate that a PVT should be performed on the next MET access to the network. The results for a PVT are returned from the CGS in the form of a special call record. PVT requests and results are a unique event, but the two actions performed by the interface to update the object and receive call record results are the same as those discussed previously for Customer Configuration Update and Call Record Processing. FIG. 36 is a table of PVT transactions illustrating the effected components. FIG. 37 is a block diagram for the PVT transactions illustrating the effected components.

CMIS PVT Transaction Actions

When a customer calls in to customer service with network quality problems, a PVT may be initiated for the MET. Through an on-line function the customer service representative initiates a PVT for the selected MET. To accomplish this transaction through the interface, the ASI formats the MET Information object with all corresponding data for that MET found in the object with the Pending PVT flag set to a value of "1" for initiate PVT on the next call attempt. Once a response for the PVT request has been received by CMIS, the agent instructs the customer to place a call with the MET since the MET is through attempting to access the network once the PVT is initiated.

Once the PVT has been performed and the results are sent back to CMIS from the DM, the pertinent information on the PVT record is available for the customer service agent on-line. Since PVT results are sent from the CGS as a call record and not a customer configuration message, CMIS recognizes the PVT call record in the normal record stream, extracts it, edits it and displays it on-line for the user.

Distribution Manager PVT Transaction Actions

The DM receives the request for PVT from the CMIS as a customer configuration update. It is transparent to the DM that this update to MET Information is for a PVT request. The DM follows the procedures for MET Update discussed below. The update request is forwarded to the NOC after being logged on the DM. A response to that request is received from the NOC indicating success or failure of the PVT. The DM logs the status of the request and creates a response to CMIS. If at this point the NOC update to MET Information is unsuccessful, the transaction is complete.

The PVT results are returned to the DM in a call summary record that indicates in the header that PVT results are contained in the record. The DM sends this special call record to the appropriate functional server, edits and formats it in the manner expected by CMIS and sends the PVT call record to CMIS in the same manner as a regular call record.

CGS PVT Transaction Actions

Upon receiving the MET Information update request from the DM in which an initiate PVT is flagged, the NOC alerts the GC to PVT the MET on its next access to the network. Once the GC has accepted this request from the NOC, the NOC notifies the DM that the PVT request was successful by acknowledging the customer configuration update request with an update response. If the NOC does not successfully update MET Information either on its own database or at the GC, the entire update is rolled back and the NOC sends a response to the DM indicating transaction failure.

If the Update was successful, when the MET places its next call, the CGS automatically performs a PVT and captures the results in a special call record which is sent to the DM over the normal call record link. The following fields in the CMIS records are candidates for population by the DM:

Field

FTIN

Actual GSI

L Band Beam

Satellite ID

Date Last Tested

Pending PVT Flag

Call Trap Flag

LCC

Roam

Remote

Pending NV PAM Init Flag

The following illustrates the format of the

| Field | Notes |
|---|---|
| Transaction Type | Code that identifies this transaction. |
| Transaction Size | Number of bytes following this header. |
| Transaction Id | This field is provided by the sending process. It is returned to the sender as part of a Response record and indicates the original transaction that the response is for. |
| Transaction Class | Indicates the class of transaction. Request Response Event Stream (no response expected-Call Records) Batch |
| Group Id | Unique number indicating the group to which this request belongs (for chaining). All transaction records that belong to the same group will have the same Group Id. A1 Transactions will have a Group Id, although most will be single transaction (Group Count of 1). |
| Group Count | Number of transactions that are part of the group specified by Group Id. For example, if Group Id 12345 consists of 5 transactions then each transaction will have a Group Id of 12345 and a Group Count of 5. If a transaction is stand-alone (not part of a larger group) it will have a Group Count of 1. |
| Sequence | Sequence number of this transaction in the group. For a group of transactions the Sequence determines the order of each transaction in the group. For example, the third transaction of group 12345 will have a Sequence of 3. By using Group Id, Group Count, and Sequence, the receiver can reconstruct the group of transactions in the original order for sequential processing. If the transaction is a stand-alone (not part of a larger group) it will have a Sequence of 1. |
| Orig Trans Channel | Indicates the communication channel where the transaction originated. Required. |
| Return Trans Channel | Indicates the communication channel where Response messages to this transaction should be delivered. This is to support multi-channel communications. If no specific Return Transaction Channel is required, fill with blanks. |
| Transaction Date | Date transaction was created. |
| Transaction Time | Time transaction was created. |

The following illustrates a start call download record for batch transactions:

| Field | Notes |
|---|---|
| Starting Batch Id | Starting batch number with which to resume Call Accounting. CMIS will provide this as the last batch it processed successfully. In the case of a premature disconnect between CMIS and DM, this number indicates the batch that was in progress prior to the disconnect. |
| Date of Request | Request date of the start call download process. If it is in initial startup, the date is the current date. If it is in restart mode, the date contains the date of the specific batch call records that are greater than or equal to this day. |
| Time of Request | Request time of the start call download process. This field contains the number of seconds since midnight of the current day. If it is in initial startup, the time defaults to 0. If it is in restart mode, the time contains a time value that the DM will use to select call records that are greater than or equal to the time. |
| Number of Batches | Number of batches to send. If blank (space-filled) then there is no predetermined limit. |
| Maxi Batch Delay | Maximum number of seconds a batch should be delayed if the number of maximum records has not been reached. If this count is reached or exceeded, the batch is closed out and sent to CMIS. |
| Maximum Recs per Batch | Maximum number of records in each batch. |

The following illustrates a call record used in batch processing:

| Field | Notes |
|---|---|
| Batch Id | Call Batch Id |
| Batch Date | Call record batch date stamped by the DM (Julian value) |
| batch Time | Call record batch time stamped by the DM (number of seconds since midnight) |
| Total CSRs | Total Call Summary Records in batch |
| CSR Id | Call Summary Record Id |
| RTIN | The Return Terminal Identification Number of the MET associated with this call record |
| Cellular ESN | The 32-bit Electronic Serial Number used by the switch for any interaction with other cell sites for cellular call control |
| Incoming Beam Id | Beam of Incoming Message |
| Timestamp of Call Initiation | |
| Effective EIRP | Used to compute the total amount of power used on a given satellite beam |
| Virtual Network Id | The virtual network associated with the call |
| Call Type | (Voice, Data, Fax, PVT) The call type, indicated in the Access Request SU or derived from the called MET's number |
| Call Bill Type | Code for special Rating/Billing |
| Connection Type | (MET to PSTN, PSTN to MET, or MET to MET)-An indication of the origination and destination types |
| Alternate Account | The account number to charge, zero indicating that an Alternate Account Charge request was not made for this call |
| FFA Vector | Feature Field Activations |
| Timestamp Setup Complete SU | The time of the reception by the GC of the Setup of Complete SU from the SLSS |
| Timestamp of Channel Release SU | Release SU from the SLSS |

Virtual Network Assignment

Virtual Network (VN) assignment associates a VN with services for a given MET. VN assignment allows customers to have up to sixteen VNs per MET if necessary. VN requires that a MET and all of its corresponding VN memberships/ services be part of the same billing account. VN assignment allows one of each service type in a VN (voice, data, fax, avd). It requires a different VN membership for every subsequent add of a service the MET already has (for example, if a MET has one voice service, adding a second voice service requires a different VN), and allows a single instance of a service type with a unique phone number associated to it to participate in one VN only. VN assignment assigns features and call barring restrictions at the VN level thereby encompassing all services for the particular MET that are members of that VN. VN assignment separates the distinct service types (voice, data, fax, avd) into different VN memberships only when necessary to distinguish routing on the CGS, dialing plan participation, call barring limitations or feature choices.

Generic VNs are defined for subscribers with no special routing or dialing plan requirements. A minimum of sixteen generics would be required to support the possibility that a subscriber with a single MET may choose to have sixteen VN memberships for multiple occurrence of service. The order entry representative assigns a generic VN as part of Order Entry.

Pre-defined VNs set up in the CMIS on a table that is referenced by the on-line system. A list of valid values for VNs is provided if requested by the user or allow the user to enter the VN ID directly. When entered directly, CMIS validates that the VN is on the reference table. A cross reference is built on the table to service types that can be associated with the VN (all, voice only, fax only data only, avd only, fax and data, etc.), and ensures that a service is not associated with a VN that is not intended for that service type. A cross reference is included for customer accounts to disallow associating METs with a VN that were established for a particular corporate account.

When a new VN ID is entered on the cross reference table through table maintenance procedures, the MSA, MSR, and Custgrp (if any) associated with that VN ID should also be entered on the table. Each service linked to the VN ID must have those three fields included in requests to add service to the CGS.

The decision of special VN assignment is based on the customer's required routing or dialing as part of the sales cycle. The special VN is created in the NE/SE system before beginning order entry and provide the VN ID on the order form. An account number is associated to the VN to allow easy registration of new METs to that VN. To cross reference an account number, the account is created in CMIS with a unique account number. At this point, a system operator is instructed to add the VN ID to the system reference table with the account number cross referenced. No METs could be registered under this account in the special VN until this step is complete. This step could be accomplished as part of the customer network engineering phase of the sales cycle that is going to be required for special larger accounts.

VN assignment provides the following benefits:
Simplifies the correspondence of VN to MET by keeping the relationship within a single account entity and making VN generic based on service type for any customer that does not request special routing or dialing.
Most closely relates to what cellular service customers are used to.
Maintains integrity of data that does not change for the MET when multiple VNs are required.
Allows segmentation of CGS resources for different service types if necessary.
Distinguishes between the cellular type user who has no special requirements and the large fleet type account with special requirements.

NE will be able to provide CMIS the needed information on VN ID and qualifying characteristics to aid in the assignment of mobiles during the order process and entry into CMIS. A large account needing a VN for its own use will go through an engineering process to establish such a VN prior to attempting to register mobiles for service. This process includes the pre-setup of the account in CMIS to generate the account number for association with the VN ID and the entry of the VN data in CMIS.

CMIS only needs the VN ID and customer qualifying characteristics from NE all technical parameters that define the attributes of the VN for routing, etc. are provided to CGS by NE and are not provided to CMIS. The creation of the VN reference table in CMIS can be a manual process by which a system administrator populates a table with ne VN, service, account data when made available from engineering personnel. No automated link or feed is required between CMIS and NE to build the reference table or to do real-time lockups of VN information during order entry.

For VN Assignment CMIS VN Inventory table will store the following information by Market:
VN ID
Control Group
Dialing Plan Yes/No Flag
Effective Date
End Date
User of Change
Date of Change Two additional tables exist in CMIS to enforce restrictions of VN assignment by customer and by service. The VN Customer Restriction table will list the Market ID(s) for which the VN is valid, the account number(s) of which the restriction applies, and an indication of whether or not the account can be included in the VN or excluded from the VN. The VN Service Restrictions are similar to the customer restrictions but instead of listing an account to include or exclude, it will list the service type. In this manner CMIS will be able to designate certain VNs for particular customers, for particular service types or a combination of both.

To provide the MSA, MSR and Cust Group on the Service record for MET registration, the Distribution Manager maintains its own VN inventory listing the valid VN IDs and these three parameters. Each MET Service object received from the ASI by the DM is populated with these three elements by the DM based on the VN ID supplied by CMIS in the object. In this manner, CMIS is isolated from storing and maintaining data elements with no impact to or access by customer service.

The following illustrates MET data requirements for VN assignment:

| | |
|---|---|
| MET Information to MET Access Key: | Each MET may have only one Access Key. |
| MET Information to MET Virtual Network Membership: | Each MET may be a member of no more than 16 VNs; one VN membership is required to have service. |

-continued

| | |
|---|---|
| MET Virtual Network Membership to MET Service: | One VN membership must have at least one service and no more than four services where each call type (voice, data, fax, avd) is different. |
| MET Virtual Network Membership to Call Barring: | One VN membership may have up to several call barring lists but does not require any. |

MET Class Assiqnment

The antenna type is used as the basis for the MET Class ID is associated to a MET. Due to the limited number of equipment types that will be available, there are a relatively static number of MET Class IDs that will exist in a codes table within CMIS. During MET Registration, the customer service agent chooses the MET Class for the MET based upon information about the gain of the antenna displayed on the equipment packaging or in the technical documentation supplied by the manufacturer of the antenna.

The main CMIS requirements for MET Class ID include passing it to the DM during MET Registration and referencing it during rate plan selection in order entry to ensure that the MET's satellite power resource consumption is reflected in it's pricing plan. Definition of new MET Class IDs originate from NE as required and are entered into CMIS via a codes table maintenance conversation. NE provides the cross reference between the antenna information displayed on the packaging/technical documentation and the MET Class ID.

The following benefits are provided by MET class assignment:

Minimizes the amount of equipment information that must be sent from CMIS to the CGS for a particular MET Registration since MET Class ID will be sent to the CGS on the MET_Information record.

Eliminates the need to store duplicate information between the CGS, CMIS and NE.

A table of valid MET Class IDs is formed to verify valid classes when registering a MET. The MET Class codes that exist in the table will be defined by Network Engineering. CMIS Operations will require notification when new MET Class IDs are defined.

During the definition of the rate plan for a MET service, the rate plan will be validated against the MET Class to ensure that only a valid MET Class ID/Rate Plan combination is entered for a service. Validation of Rate Plan against MET Class ID prevents the instance where a less expensive rate plan for a high gain antenna is selected for a service when the MET has a MET Class ID for a lower gain antenna. Valid MET Class ID/Rate Plan combinations will be entered and maintained via a codes table maintenance conversation.

During MET Registration, the MET Class ID is passed to the CGS on the MET Information record that is created during the activation of a MET. A MET Class can also be changed if a customer purchases a new antenna. When the gain of the new antenna requires a different rate plan, the new MET Class ID is validated against the MET Class ID Rate Plan table. If the combination selected is not valid, the user will be prompted to select a new rate plan for the account. Once a valid MET Class/Rate Plan combination is selected, the MET Class is sent to the CGS on an updated MET Information record.

SASK Functionality for MET Registration

The SASK is programmed into Non-Volatile RAM in the MET by the manufacturer based upon an algorithm specified by engineering. The manufacturer sends a disk and/or paper feed of information that lists the valid ESN/SASK combinations programmed into all METs. CMIS accepts the feed of electronic information via a batch load process that updates a table of valid ESN/SASK combinations. CMIS also provides the capability to update the ESN/SASK table on-line in the event that an electronic feed of valid combinations is not available from a manufacturer.

The default SASK for any MET is the one supplied by the manufacturer of the MET. During MET Registration, the SASK generated by the manufacturer is retrieved and displayed in an adjacent field automatically when an ESN is entered. If a SASK for a MET is unavailable because of a delay in receiving information from the manufacturer or requires changing because of possible fraud, CMIS provides the capability to generate a new SASK including a 14 hex digit random number and a 2 hex digit parity check value. CMIS uses the same algorithm used by the manufacturer as specified by engineering to generate the SASK on-line.

CMIS passes the ESN and SASK to the DM which will pass the same values to the CGS. The CGS uses the ESN/SASK combination to create the encrypted FTIN as part of MET Registration. A valid FTIN will be required for a MET to gain access to the network.

The SASK functionality for MET registration provides the following benefits:

In order to prevent fraud, logic for generation of FTIN will reside only in the CGS. Random number generation of the encrypted FTIN from the ESN and SASK value during MET Registration ensures that METs are not cloned.

Ability to view the SASK on-line in CMIS will allow customer service to quickly identify errors with the SASK in either CMIS or the MET. Since the logic to generate the FTIN will reside in the CGS, on-line display of the SASK in CMIS will not compromise the security of the MET.

A new SASK can be entered into CMIS and automatically passed to the ground segment when a new SASK is required for a MET in the case of suspected fraud, etc. When the new SASK is entered into CMIS it also requires entry into the MET's NVRAM.

Engineering provides the CMIS development team with the detailed algorithm for creating the 14 hex digit SASK and the two hex digit parity and the two hex digit parity check field. The SASK does not have to be unique for each ESN.

The ESN/SASK cross reference table is placed in a secure database accessible only by authorized CMIS customer service agents.

The majority of ESN/SASK combinations are received via the automatic load from the equipment manufacturer. Creation of the SASK on-line within CMIS occurs on an as needed basis.

Figure 38:
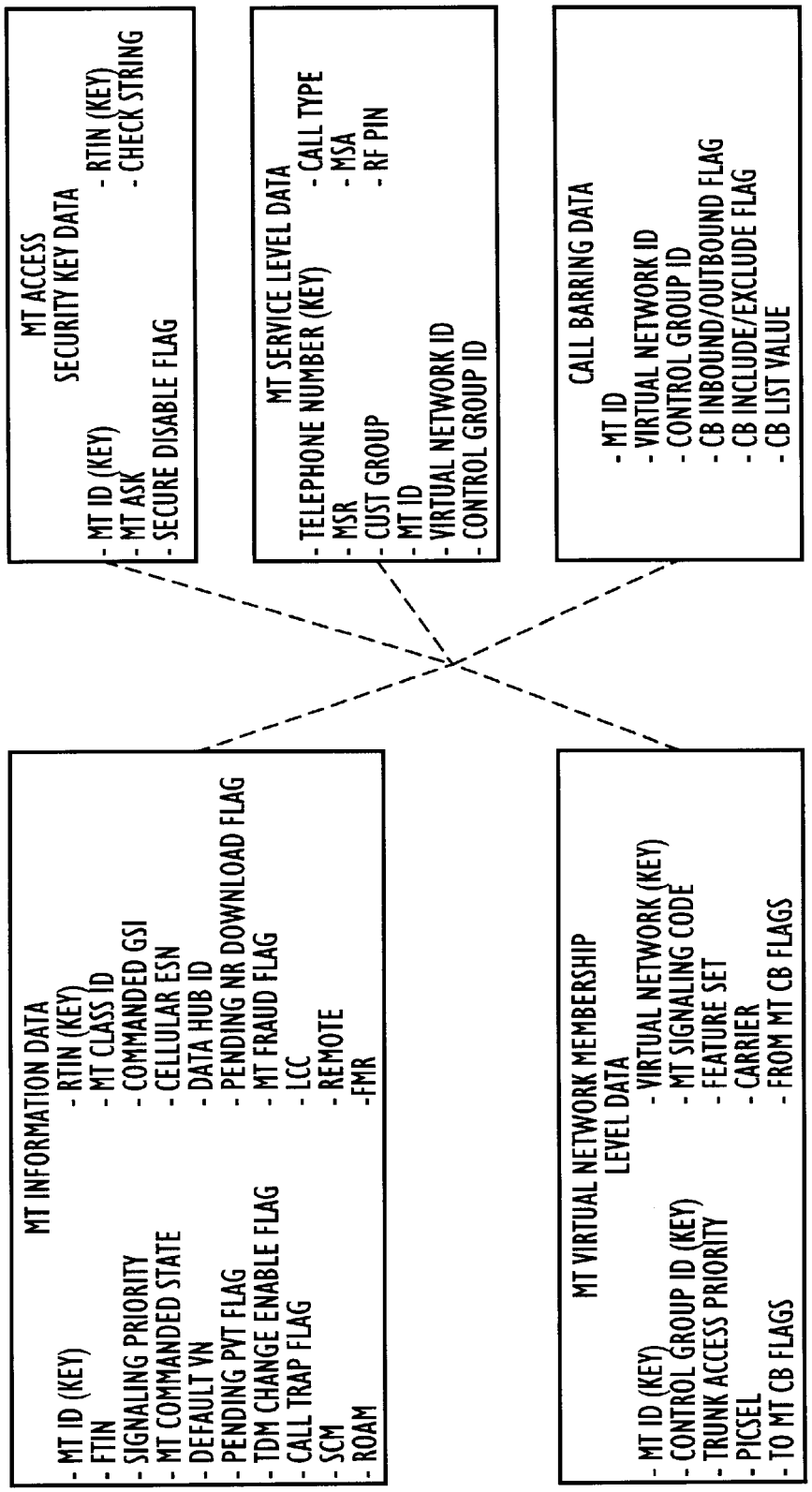
FIG. 38 is a graphical representation of the MET registration data fields utilized in CGS, DM and CMIS systems.

During order entry, the SASK is retrieved automatically from the RTIN/SASK table when the RTIN for the MET is entered in order to match the SASK programmed into the MET by the manufacturer. If a SASK is not in the codes table or a MET requires a new SASK, a separate SASK maintenance window will appear that will contain the logic necessary to generate a new SASK for the MET. If a new SASK is created, the MET is reprogrammed in order for it to gain access to the network. Once CMIS generates a SASK, it will populate the RTIN/SASK table with update information that the value was generated by the system instead of the manufacturer. SASK entries and updates are sent to the CGS on the MET ASK object. FIG. 38 is a graphical representation of the MET registration data fields utilized in CGS, DM and CMIS systems.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

DICTIONARY ITEMS AND DEFINITIONS

Actual GSI
Definition: Current GSI based on TDM changes during MET operation. This field is populated by the NOC based on actions on the CGS. The CMIS cannot create or update this field.

Call Barring Inbound/Outbound Flag
Definition: Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition: Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition: Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition: Indicates call trapping has been initiated for the MET. The GC will trap MET states as they change during MET CGS activity. This information will be provided to the CMIS on a call record.

Call Type
Definition: Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition: Name of preferred IXC carrier. This field is a switch field used to support equal access to long distance carriers.

Cellular ESN
Definition: 32 bit ESN that is used by the switch. For dual mode cellular/satellite phones it is the ESN for the cellular portion of the phone and would match the ESN used by the home cellular carrier to identify that mobile terminal.

CGS Time Stamp
Definition: Time stamp was created/modified. Part of the notification of success or failure of CGS action. Not created or updated by CMIS.

Channel Spacing
Definition: Multiple of frequency step size. This element is a characteristic of the MET Class. CMIS will only have the MET Class ID that a particular METs equipment maps to. NE originates this and other data that describes the MET Class and sends it to the NOC.

Check String
Definition: Constant used by the GC to validate the encryption/decryption algorithm. This element is related to the ASK.

Commanded GSI
Definition: Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Control Group ID
Definition: The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group
Definition: Identifier for a specialized routing information used at the switch (e.g., 1024 available cust groups per MSR). Dialing plans will be implemented for groups of customers through a Customer Group (Cust Group).

Data Hub Id
Definition: Used to route messages during PSTN to IVDM call setup to the proper data hub. This is only applicable for METs that are participating in the Mobile Packet Data Service.

Date Last Tested
Definition: Time stamp of most recent commissioning test. This field is populated by the NOC and cannot be created or updated by CMIS.

Default VN
Definition: VN selected if user does not specify VN during dialing. For METs that belong to only one VN, this can be populated with the VN ID the MET is assigned to by default.

EIRP
Definition: Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.

Event Argument Id
Definition: Part of the Event Record received from the NOC. CMIS has no part in creating or updating events—they arrive unsolicited from the NOC.

Event Argument Type
Definition: Part of the event Record received from the NOC. CMIS has no part in creating or updating events—they arrive unsolicited from the NOC.

Event Argument Value
Definition: Part of the Event Record received from the NOC. CMIS has no part in creating or updating events—they arrive unsolicited from the NOC.

Event Argument VMS Type
Definition: Part of the Event Record received from the NOC. CMIS has no part in creating or updating events—they arrive unsolicited from the NOC.

Event Code
Definition: Part of the Event Record received from the NOC. CMIS has no part in creating or updating events—they arrive unsolicited from the NOC.

Event Severity
Definition: Network impact assessment of the trouble event.

Event Time
   Definition: Time the event occurred within the network.
Event Type
   Definition: Part of the Event Record received from the NOC. CMIS has no part in creating or updating events— they arrive unsolicited from the NOC.
External Date Time Stamp
   Definition: CMIS generated time stamp used for CMIS audit purposes in exchanging messages with the CGS.
External Transaction Id
   Definition: CMIS generated transaction id used for CMIS audit purposes in exchanging messages with the CGS.
Feature Set
   Definition: Identifies MET features within a specific VN. Fixed features are set up during order processing and require no action by the MET user to invoke a feature. MET activated features must also be set up during order processing but will only be available through some action on the part of the MET use during call process.
FIXED FEATURES include:
   Calling Line Id Presentation (CLIP)—display the calling party's number to a MET.
   Calling Line Id Restriction (CLIR)—prohibition from displaying the METs number when it is calling another party.
   Connected Line Id Presentation (COLP)—display the number the calling MET is connected to.
   Connected Line Id Restriction (COLR)—prohibit display of the connected MET's number to the calling party.
   Sub-addressing (SA)—allows one or more attachments to the MET to be addressed. This is being accomplished through unique phone numbers for service types requiring different equipment.
   Call Waiting (CW)—notification to a MET engaged in the call that another call is waiting. MET may accept the other call or ignore it.
   Call Barring (CB)—restricts the MET user's from making or receiving one or more types of calls.
   Operator intervention (OI)—allows an operator to break into a call in progress for the MET.
   Operator Assistance (OA)—allows the MET to access an MSAT operator to receive assistance
   Call Priority (CP)—used in conjunction with the system's call queuing function (trunk access priority) presence of this feature gives a MET access to channels at times of congestion ahead of MET's with lower priority. Priority applies only to MET initiated calls.
MET ACTIVATED (dynamic) FEATURES include:
   Call Transfer (CT)—allows sa MET user to transfer an established call to a third party.
   Call Forwarding Unconditional (CFU)—permits a MET to have all calls forwarded to another MET or PSTN number.
   Call Forwarding Busy (CFB)—permits a MET to have all incoming calls attempted when the MET is busy to another MET or PSTN number.
   Call Forward Congestion (CFC)—permits the MET to have all incoming calls attempted when the signaling channels are congested answered with a recorded announcement intercept.
   Call Forward No Reply (CFN)—permits a MET to have all incoming calls attempted when the MET is not answering to another MET or PSTN number. This applies if the MET is blocked, turned off or not answering.
   Call Holding (CH)—allows a MET to interrupt call communication on an existing connection and then re-establish communications.
   Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.
   Conference calling (CC)—allows a MET to communicate with multiple-parties including METs and PSTN concurrently.
   Three Party Service (3PS)—allows a MET to who is active on a call to hold that call, make an additional call to a third party, switch from one call to the other (privacy being provided between the calls) and/or release one call and return to the other.
   Malicious Call Trace (MCT)—enables an MSAT operator to retrieve the complete call record at a MET's request for any terminated call in real-time. The operator can then identify the calling party to the MET and take appropriate action.
   Voice Mail (VM)—allows call forwarding to a voice mail box and retrieved of messages by the MET.
   Alternate Accounts Charging (ACC)—allows the MET user to enter in an account code to charge the call to after entering the dialed digits
Frequency Step Size
   Definition: Minimum tuning increment acquired for a MET to tune in an assigned channel. CMIS will only have the MET Class ID that a particular MET's equipment maps to. NE originates this and other data that describes the MET Class and sends it to the NOC.
From MET Call Barring Flags
   Definition: Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.
FTIN
   Definition: Forward Terminal Identification Number— Downloaded to MET from NOC during commissioning. Used for MET to GC signaling.
Internal Data Time Stamp
   Definition: NOC generated time stamp used for NOC audit purposes.
Internal Transaction Id
   Definition: NOC generated transaction is used for NOC audit purposes.
L Band Beam
   Definition: Current beam MET is logged into. Determined by the GC during commissioning. CMIS has no role in creating or updating this field.
LCC
   Definition: Line Class Code—type of phone, required by the switch.
MCC Class Id
   Definition: Part of the Event Record received from the NOC. CMIS has no part in creating or updating events— they arrive unsolicited from the NOC.
MCC Instance
   Definition: Part of the Event Record received from the NOC. CMIS has no part in creating or updating events— they arrive unsolicited from the NOC.

MCC Instance Id
   Definition: Part of the Event Record received from the NOC. CMIS has no part in creating or updating events—they arrive unsolicited from the NOC.
MCC Instance Type
   Definition: Part of the Event Record received from the NOC. CMIS has no part in creating or updating events—they arrive unsolicited from the NOC.
Message Status 1
   Definition: Used in the message initiated by the NOC to acknowledge success or failure of a previously transmitted CMIS request. Used by the DM.
Message Status 2
   Definition: Used in the message initiated by the NOC to acknowledge success or failure of a previously transmitted CMIS request. Will be used by the DM.
Message Verb
   Definition: Action required at the NOC on data passed in a message from CMIS. This field is in the message relaying the results of a CMIS request.
Modulation Scheme
   Definition: Non-standard modulation schemes. CMIS will only have the MET Class ID that a particular MET's equipment maps to. NE/SE originates this and other data that describes the MET Class and sends it to the NOC.
MSA
   Definition: Mobile Servicing Area—identifies the last call's servicing area. Atomic data element within MSR. Transient data maintained in call processing not on the cellular switch table. Same as MSR.
MSR
   Definition: Mobile Servicing Region id (table) contains multiple MSA assignments for the MET. For a roamer, the operator will input the MSR for temporary assignment. Allows up to 1024 cust groups—At CGS startup there will be 1 MSR.
MET ASK
   Definition: Access Key MET must match during call setup/validation.
MET Class ID
   Definition: Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.
MET Commanded State
   Definition: Current CGS status of MET.
MET Fraud Flag
   Definition: Indicates fraud has been detected on the MET. Updated by GC and CMIS only. This field is set at the MET level regardless of the number of services, etc. the MET has.
MET ID
   Definition: CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.
MET Signaling Code
   Definition: Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.
Net Radio Monitor Code
   Definition: Controls MET responses to specific channels after hang time limit is exceeded. A NR Net selection is made at the MET by the user.
Net Radio MET Directory Number
   Definition: Net radio MET directory number. Assigned during registration.
Net Radio Net Id
   Definition: Net ID
Net Radio MET Directory Number
   Definition: Tag number on the MET equipment that identifies a particular net radio net.
Pending NVRAM Init Flag
   Definition: Instructs the GC to download/initialize parameters for a MET.
Pending PVT Flag
   Definition: This flag indicates that a PVT is required following next MET access. If CMIS requests a PVT to help diagnose customer troubles, an update would be sent to NOC with the Flag set to Perform PVT after Next MET access (1).
Picsel
   Definition: Flag indicating if user has asked for a preferred IXC carrier. Carrier name is contained in CARRIER field.
Record Type
   Definition: Type of record defined by object. Part of the Update Results Record.
Remote
   Definition: Remote user—not required by the switch for MSAT Application.
RF Pin
   Definition: Remote feature personal identification number. A user is prompted for a pin when attempting to use a remote feature.
Roam
   Definition: Roam Capable—not required by the switch for MSAT Application.
RTIN
   Definition: Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.
Satellite Id
   Definition: Satellite Id of current L-band beam. The NOC populates this field based on MET commissioning. CMIS does not ever create or update this field.
SCM
   Definition: Station Class Mark.
Secure Disable Flat
   Definition: Channel Unit security check flag. Setting this flag to bypass security would disable ASK verification during call processing for a MET. CMIS cannot change this flag.
Signaling Priority
   Definition: Number of MET signaling requests to the GC during network congestion. Assigned at the MET level—each MET may have only one signaling priority regardless of the number of VN memberships it has. The highest priority level is 0 and the lowest is seven.

TDM Change Enable Flat
   Definition: Restriction on MET from changing TDM (TDM is the GSI)
Telephone Number
   Definition: Phone number associated with a call type (voice, data, fax, avd) in a given virtual network.
To MET Call Barring Flags
   Definition: Describes actions available to a user receiving a call at their MET.
Trunk Access Priority
   Definition: Satellite trunk queuing priority used during network congestion. Determines access to channels.
Virtual Network Id
   Definition: Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.
VMS Instance Type
   Definition: Part of the Event Message
Vocoder Id
   Definition: Vocoder version currently installed in the MET. CMIS will only have the MET Class ID that a particular METs equipment maps to. NE/SE originates this and other data that describes the MET Class and sends it to the NOC.

GLOSSARY

A Availability
AAC Airline Administrative Communications
AARM Access Authentication Request
ABH Average Busy Hour
AC Alternating Current
ACU Access Channel Unit
ACU Antenna Control Unit
AD Attribute Dictionary
AEDC After Effective Date of Contract
AFC Automatic Frequency Control
AFS Antenna/Front-end Subsystem
AGC Automatic Gain Control
AIOD Automatic Number Identification Outward Dialing
AMI Alternative Mark Inversion
AMPS North American Analog and Digital Cellular Networks
AMSC American Mobile Satellite Corporation
AMS(R)S Aeronautical Mobile Satellite (Route) Service
AMSS(R) Aeronautical Mobile Satellite Services (Reserved)
ANI Automatic Number Identification
ANSI American National Standards Institute
ANT Antenna
AOC Aircraft Operational Communications
APC Airline Passenger Communications
API Applications Program Interface
AR Automatic Roaming
ARC Atlantic Research Corporation
ASK Access Security Key
ASN.1 Abstract Syntax Notation One
AT Command set for a DTE to communicate with asynchronous host
ATC Air Traffic Control
AVD Alternate Voice/Data Calls
AWGN Additive White Gaussian Noise
AZ Azimuth
B8ZS Bipolar with 8 Zeros Substitution
BB Bulletin Board
BBS Bulletin Board Service
BER Bit Error Rate
BERT Bit Error Rate Tester
BID Beam Identifier Code
BIT Built In Test
BITE Built-In Test Equipment
BPS Bits Per Second
BS Base Station
BSPU Baseband Signaling Processing Unit
BSS Base Station Switch
C/No Carrier to Noise Power Density Ratio
CAC Channel Access and Control
CAF Call Failure Message
CCCS Command, Control, and Communications Subsystem
CCIR Consultative Committee International de Radio
CCITT Consultative Committee International Telegraph and Telephone
CCU Communications Channel Unit
CD Call Delivery
CDR Call Detail Record
CDR Critical Design Review
CDRL Contract Data Requirements List
CE Common Equipment
CG Control Group
CGID Control Group Identification Number
CGS Communications Ground Segment
CHA Channel Assignment Message
CHREL Channel Release Message
CHREQ Channel Request Message
CI Configuration Item
CIBER Cellular Intercarrier Billing Exchange Roamer
CIC Carrier Identification Code
CM Configuration Management
CMIP Common Management Information System
CMIS Configuration Management Information System
CMIS Customer Management Information System
COTS Commercial off-the-Shelf
CP Circuit Pool
CPD Call Processing Demonstration
CPS Circuit Pool Segment
CPU Central Processing Unit
C/PV Commissioning/Performance Verification
CRC Cyclic Redundancy Check
CS Communications System
CSC Computer Software Component
CSCI Computer Software Configuration Item
CSDT Channel Switchover Detection Time
CSF Critical System Functionality
CSMA/CD Carrier Sense Multiple Access with Collision Detection
CSMP Circuit Switch Management Processor
CSMPCS Circuit Switch Management Data Processor Equipment Communications System
CSPU Channel Signal Processing Unit
CSR CAC Statistics Request
CSREP Call Status Reply Message
CSREQ Call Status Request Message
CSU Computer Software Unit
CSUG Computer Software Unit Group
CTB Customer Test Bed
CTN Cellular Telephone Network CTN Cellular Terrestrial Network
CTNI Cellular Telephone Network Interface
CU Channel Unit
CUD Call User Data
CUG Closed User Group
CUP Channel Unit Pool
CUS Channel Unit Subsystem
CVR Cellular Visitor Registration
CVRACK Cellular Visitor Registration Acknowledge
CW Carrier Wave
CWCHA Call Waiting Channel Assignment Message
DAMA Demand Assignment Multiple Access
db Database
dbc Decibel Relative to Carrier
dB decibels
dBi dB Relative to Isotropic
dBm dB relative to 1 milli watt
dBW decibels relative to 1 watt
D bit 'Data Configuration' bit in X.25
DBMS DataBase Management System
dBw dB Relative to 1 Watt
DC Direct Current
DCE Data Circuit Terminating Equipment
DCE Data Communications Equipment
DCL Digital Command Language
DCN Down CoNverter
DCR# Document Control Release #
DCU Data Channel Unit
DD Design Document
DDCMP Digital Data Communications Message Protocol
DDS Direct Digital Synthesis
DEC Digital Equipment Corporation
DECmcc Digital's Network Management System
DEQPSK Differential Encoded Quadrature Phase Shift Keying
DET Data Equipment Terminal
DFD Data Flow Diagram
DH Data Hub
DH-D Outbound Time Division Multiplex Channel from Data Hub to Mobile Terminal
DHP Data Hub Processor
DHSI DH-D Selector Identification Code
DID Direct Inward Dialing
DIDs Data Item Descriptions
DME Dial-Up Modem Emulation
DMQ DEC Message Queue
DMS Digital Multiplex System
DN Directory Number
DNS Digital Name Service
DOC Canadian Department Of Communications
DOD Direct Outward Dialing
DPSK Differential Phase Shift Keying
DQPSK Differentially Encoded Quadrature Phase Shift Keying
DS0 Digital Service Level Zero (single 64 K b/s channel)
DS 1 Digital Service Level One (twenty four voice channels)
DSP Digital Signal Processing
DSSS 1 Digital Subscriber Signaling System 1
DTC Digital Trunk Controller
DTE Data Terminal Equipment
DTE Data Terminal Element
DTMF Dual Tone Multiple Frequency
DVSI Digital Voice Systems, Inc.
Eb/No Bit Energy to Noise Power Density Ratio
ECN Engineering Change Notice
EFD EF Data, Inc.
EFTIN Encrypted Forward Terminal Identification Number
E-I Exchange—Interexchange
EIA Electronic Industries Association
EICD Element Interface Control Document
EIE External Interface Equipment
EIRP Equivalent Isotropic Radiated Power
El Elevation
EMC ElectroMagnetic Compatibility
EMI ElectroMagnetic Interference
eng engineer or engineering
EO End Office
EO External Organizations
EOD End of Data
ESN Electronic Serial Number
FAX Facsimile
FCA Functional Configuration Audit
FCC Federal Communications Commission
FCS Fading Channel Simulator
FDMA Frequency Division Multiple Access
FEC Forward Error Correction
FES Feederlink Earth Station
FES-C Inbound Communication channel from Feederlink Earth Station to Mobile Terminal
FES-I Interstation signaling channel from Feederlink Earth Station to Group Controller
FES/MT Feederlink Earth Station/Mobile Terminal
FES-RE Feederlink Earth Station-Radio Frequency Equipment
FES-TE Feederlink Earth Station Terminal Equipment
FFT Fast Fourier Transform
FIS Feederlink Earth Station Interface Simulator
FIT Fault Isolation Tests
FIU Fax Interface Unit
FMT Fixed Mobile Terminal
FMA Field Programmable Gate Array
FPMH Failures per Million Hours
FRO Frequency Reference Oscillator
FT Fault Tolerant
FTE Fax Terminal Equipment
FTIN Forward Terminal Identification Number
G/T Gain to System Noise Ratio
GBF Gateway/Base Function
GBS Gateway Base System
GC Group Controller
GC-I Interstation signaling channel from Group Controller to Feederlink Earth Station
GC-S Time Division Multiplex Signaling channel from Group Controller to Mobile Terminal
GCSST GC-S Search Time
GEN Generator
GHz Giga (1,000,000,000) Hertz (cycles per second)
GMACS Graphical Monitor And Control System
GPIB General Purpose Instrument Bus
GPS Global Positioning System
GS Gateway Station
GSI GC-S Selector Identifier
GW Gateway
GWS Gateway Switch
GWS/BSS Gateway Switch/Base Station Switch
H/W Hardware
HCHREQ Handoff Channel Request
HDP Hardware Development Plan
HLR Home Location Register
HMI Human Machine Interface
HOT Hand-off Test
HPA High Power Amplifier
HRS Hardware Requirements Specification HWCI Hardware Configuration Item
HW/SW Hardware/Software
Hz Hertz
I In Phase channel
IAW In Accordance With
IC Interexchange Carrier
ICD Interface Control Document
ICI Instrument Control Interface
ICP Intelligent Cellular Peripheral
ICU Interstation Channel Unit
ICWG Interface Control Working Group/Interface Coordination Working Group
ID Identification
IEEE Institute of Electrical and Electronics Engineers
IF Intermediate Frequency
IFIS Intermediate Frequency Subsystem
IFL Interfacility Link
IF IFL Intermediate Frequency Internal Facility Link
IHO Interstation Hand-Off
IICD Internal Interface Control Document
IICWG Internal Interface Control Working Group
IM Intermodulation
IMBE Improved Multiband Excitation
IOC Input/Output Controller
IP Internet Protocol
ISCU Interstation Signaling Channel Unit/Interstation Channel Unit
ISDN Integrated Services Digital Network
ISL Interstation Signaling Link
ISO International Standards Organization
IVDCPD Integrated Voice & Data Call Processing Demonstration
IVDM Integrated Voice/Data Mobile Terminal
KBPS Kilo (1,000) Bits per Second
kHz Kilohertz
KLNA K-band Low Noise Amplifier
KP Key Pulse
LAN Local Area Network
LAP Link Access Procedure
LAPB Link Access Procedure using a balanced mode of operation
LATA Local Access and Transport Area
LBP Local Blocking Probability
LCN Logical Channel Number
LLCSC Lower Level Computer Software Component
LLNA L-band Lowe Noise Amplifier
LLS Lower Level Specification
LNA Low Noise Amplifier
LOI Level of Integration
LPP Link Peripheral Processor
LRU Line Replaceable Unit
LRU Lowest Replaceable Unit
LSSGR Loval Access and Transport Area Switching Systems Generic Requirements
MAP Maintenance Administrative Position
MAP Mobile Application Part
M bit 'More Data' bit in X.25
M&C Monitor and Control
MCC Management Control Center
MCGID Mobile Data Service Control Group Identification Number
MDLP Mobile Data Service Data Link Protocol
MDS Mobile Data Service
MDSR MDLP Statistics Request
MEA Failure Modes and Effects Analysis
MEF Minimum Essential Functionality
MELCO Mitsubishi Electronic Company
MET Mobile Earth Terminal (a.k.a. MT)
MET-C Communication Channel Between Mobile Terminal and Feederlink Earth Station
MET-DRd Inbound Slotted Aloha Data Channel
MET-DRr Inbound Slotted Aloha Reservation Channel
MET-DT Inbound Packet Time Division Multiple Access Channel
MET-SR Random Access Signaling Channel from Mobile Terminal to Group Controller
MET-ST Time Division Multiple Access signaling channel from Mobile Terminal to Group Controller
MF Multiple Frequency
MFID Manufacturer Identification
MGSP Mobile Terminal to Group Controller Signaling Protocol
MHz Mega Hertz (cycles per second)
MIB Management Information Base
MIR Management Information Region
MIRQ MT Initialization Request
MIS Mobile Terminal Interface Simulator
MIS Mobile Earth Terminal Interface Simulator
ML Message Layer
MLCSC Mid Level Computer Software Component
MLP Multilink Procedure
MMI Man Machine Interface
MMRS Mobile Road Service
MMSS Maritime Mobile Satellite Services
MNMS Mobile Data Service Network Management Subsystem
MNP Multi Network Protocol
MODEM MODulator/DEModulator
MOS Mean Opinion Score
MOV Method of Verification
MPLP Mobile Data Service Packet Layer Protocol
MPR MPR Teltech Inc.
MRI Minimum Request Interval
MRS Mobile Radio Service
MSAT Mobile Satellite
MSC Mobile Switching Center
MSS Mobile Satellite Service
MSSP Mobile Terminal Specialized Services Protocol
ms millisecond
MT Mobile Terminal
MT-C Communication Channel Between Mobile Terminal and Feederlink Earth Station
MT-DRd Inbound Slotted Aloha Data Channel
MT-DRr Inbound Slotted Aloha Reservation Channel
MT-DT Inbound Packet Time Division Multiple Access Channel
MT/NR Mobile Terminal/Net Radio
MT ASK Mobile Terminal Access Security Key
MTBF Mean-Time Between Failures
MTBRA Mean-Time Between Restoral Actions
MTCRS Mobile Telephone Cellular Roaming Service
MT-MET Mobile Terminal to Mobile Terminal
MT-MT Mobile Terminal to Mobile Terminal
MTP Mobile Data Service Transaction Protocol
MT-PSTN Mobile Terminal/Public Switched Telephone Network
MTS Mobile Telephone Service
MT-SR Random Access Signaling Channel from Mobile Terminal to Group Controller
MTSR MTP Statistics Request
MT-ST Time Division Multiple Access Signaling Channel from Mobile Terminal to Group Controller
MTTR Mean-Time to Repair
MTX Mobile Telephone Exchange MULP Mobile Data Service Unacknowledged Link Protocol
MUSR MULP Statistics Request
NACN North American Cellular Network
NADP North American Dialing Plan
NANP North American Numbering Plan
NAP Network Access Processor
NAP-C Network Access Processor for the Communications Channel
NAP-CU Network Access Processor-Channel Unit
NAP-D Network Access Processor for the Data Channel
NAP-N Network Access Processor for the Network Radio Channel
NAP-S Network Access Processor for the Signaling Channel
NAS Network Access Subsystem
NASP National Aerospace Plan
NCC Network Communications Controller
NCC Network Control Center
NCC-RE Network Communications Controller Radio frequency Equipment
NCC-TE Network Communications Controller Terminal Equipment
NCS Network Control System
NCU Net Radio Control Unit
NCU Net Radio Channel Unit
NE Network Engineering
NEBS New Equipment Building System
NE/SE Network Engineering/System Engineering
NIM Network Module
NM Network Module
NMP Network Management Process
NMS Network Management System
NMS/CMIS Network Management System/Customer Management Information System
NOC Network Operations Center
NOC-FES Network Operations Center-Feederlink Earth Station
NPA Numbering Plan Area
NR Net Radio
NRCHA Net Radio Channel Assignment
NRCHREL Net Radio Channel Release
NRCHREQ Net Radio Channel Request
NRDVI Net Radio Dispatcher Voice Interface
NRS Net Radio Service
NRZ Non-Return to Zero
NT Northern Telecom
NTL Northern Telecom Limited
NTP Northern Telecom Practice
NVM Non-Volatile Memory
OA&M Operation, Administration, and Maintenance
O&M Operations and Maintenance
OJJ On the Job Training
OM Operational Measurements (from GWS)
OS Operating System
OSF Open Software Foundation
OSI Open Systems Interconnection
OSR Operational Support Review
PA Product Assurance
PAC Pre-emption Acknowledge Message
PAD Packet Assembler/Disassembler
PAP Product Assurance Plan
PBX Private Branch Exchange
PC Process Control
PCM Pulse Code Modulation
PC-RFMCP PC Based RFM Control Processor
PC-SCP PC Based Systems Control Processor
PCSTR Physical Channel Statistics Request
PCT Provisioning Criteria Table
PCU Pilot Control Unit
PCU Pilot Channel Unit
PDAMA Priority Demand Assignment Multiple Access
PDN Packet Data Network
PDR Preliminary Design Review
PDU Protocol Data Unit
PE Protocol Extension
PER Packet Error Rate
PERSP Packet Error Rate Sample Period
PERT Packet Error Rate Threshold
PIP Program Implementation Plan
PLP Packet Layer Protocol
PLT Pilot
PMR Project Management Review
PMT Pre-emption Message
PN Private Network
PN Pseudo Noise
PNIC Private Network Identification Code
PPM Pulses per Minute
PS Processor Subsystem
PSDN Private Switched Data Network
PSDN Public Switched Data Network
PSTN Public Switched Telephone Network
PTT Push-To-Talk
PVC Performance Virtual Circuit
PVT Permanent Verification Test/Performance Verification Test
Q Quadrature Phased Channel
QA Quality Assurance
Q bit 'Qualified Data' bit in X.25
QPSK Quadrature Phase Shift Keying
RAM Random Access Memory
RAM Reliability, Availability, Maintainability
RDB Relational DataBase
REMS Remote Environmental Monitoring System
Req Requirement
Rev Revision
RF Radio Frequency
RFE Radio Frequency Equipment
RF IFL Radio Frequency Inter Facility Link
RFM Radio Frequency Monitor
RFP Request For Proposal
RFS Radio Frequency Subsystem
RHCP Right Hand Circularly Polarized
RMS Remote Monitoring Station
RMS Remote Monitor Subsystem
RNO Remote NOC Operator
ROM Read Only Memory
RR Receiver Ready
RS Requirements Specification
RS-232C Electronics Industry Standard for unbalanced data circuits
RSP Radio Standard Procedure
RTIN Reverse Terminal Identification Number
RTM Requirements Traceability Matrix
RTP Reliable Transaction Protocol
RTR Reliable Transaction Router
RTS Reliable Transaction Service
RTS Receiver/Tuner System
Rx receive
S/W Software
SCADA Supervisory Control and Data Acquisition
SCCP Signaline Connection Control Part
SCPC Single Channel Per Carrier
SCR Software Change Request
SCS System Common Software
SCU Signaling Channel Unit SDD Software Design Description
SDID Seller Data Item Description
SDLC Synchronous Data Link Control
SDP Software Development Plan
SDPAP Software Development Product Assurance Plan
SDR System Design Review
SDRL Seller Data Requirements List
SE Systems Engineering
SEC Setup Complete Message
SEDP Software Engineering Development Plan
SEE Software Engineering Environment
SEEP Software Engineering Environment Plan
SID System Identifier Code
SIF System Integration Facility
SIT Special Information Tones
SLOC Source Lines of Code
SLSS Station Logic and Signaling Subsystem
SM Site Manager
SMAC Station Monitor Alarm and Control Subsystem
SMDS Satellite Mobile Data Service
SMP Software Management Plan
SMRS Satellite Mobile Radio Service
SMSC Satellite Mobile Switching Center
SMTS Satellite Mobile Telephone Service
SNA Systems Network Architecture
SNAC Satellite Network Access Controller
SNACS Satellite Network Access Controller Subsystem
SNMP Simple Network Management Protocol
SNR Signal to Noise Ratio
SOC Satellite Operation Center
SOW Statement of Work
SP Start Pulse
SPAP Software Product Assurance Plan
SPP Satellite Protocol Processor
SQL Software Query Language
SRR Systems Requirements Review
SRS Software Requirements Specification
SS7 Signaling System No. 7
SSA Sloppy Slotted Aloha
SSTS Satellite Transmission Systems, Inc.
STP Signal Transfer Point
STP System Test Program
STS System Test Station.
STSI Satellite Transmission Systems, Inc.
SU Signaling Unit
SUES Shared-Use Earth Station
SVC Switched Virtual Circuit
SWP Software Verification and Validation Plan
SVVPR Software Verification and Validation Plan Review
S/W Software
[TI] Top Level Specification
T- 1 Digital Transmission link, 1.544 Mega-bits per second
TCP/IP Transmission Control Protocol/Internet Protocol
TCAP Transactions Capabilities Application Part
TCF Training Check Frame
TD Transmission Demonstration
TDM Time Division Multiplex
TDMA Time Division Multiple Access
TDMSI Time Division Multiplex Selector ID
TE Terminal Equipment
Telecom Telephonic Communications
TDM Time Division Multiplex
TDMA TDM Access
TID Terminal Identification
TIM Timing
TIM Technical Interchange Meeting
TIN Terminal Identification Number
TIS Terrestrial Interface Subsystem
TLCSC Top Level Computer Software Component
TLS Top Level Specification
TMI Telesat Mobile Incorporated
TMS Test and Monitor Station
TNI Terrestrial Network Interface
TPP Test Plan and Procedure
TT&C Telemetry, Tracking and Control
Tx Transmit
UCN Up CoNverter
UDS Unacknowledged Data Delivery Service
UIS User Interface Subsystem
UPC Uplink Power Control
UTR Universal Tone Receiver
UW Unique Words
V&V Verification and Validation
VAC Value-Added Carrier
VAX Model Identification of a Digital Equipment Corporation system
VAX Virtual Address extension (proprietary name used by DEC for some of its computer systems)
VCN Virtual Circuit Number
VF Voice Frequency
VLR Visitor Location Register
VN Virtual Network
VPN Virtual Private Network
VUP VAX Unit of Processing
V.22bis Modem Standard for 24()0 Baud Service Over Telephone Lines
V.25 Procedure for setting up a data connection on the Public Switched Telephone Network
V.26, V.28 Electrical specification of interchange circuits at both the Data Terminal Equipment and Data Communications Equipment sides of the interface (similar to RS-232-C)
V.32 High Speed Serial Link, Physical Layer Definition
V.35 X.25 physical layer interface used to access wideband channels (at data rates up to 64 kbit/s)
WAN Wide Area Network
WEC Westinghouse Electric Corporation
XCR X.25 Configuration Request
XICD External Interface Control Document
XICWG External Interface Control Working Group
X.3 Specification for facilities provided by the Packet Assembler/Disassembler
X.21 X.25 physical layer interface for Data Terminal Equipment and Data Communications Equipment using synchronous transmission facilities
X.21bis X.25 physical layer interface for Data Terminal Equipment designed for interfacing to synchronous V-series modems to access data networks
X.25 Specification for interface between Data Terminal Equipment and Data Communications Equipment for terminals operating in packet mode
X.28 Specification for interaction between loval terminal and Packet Assembler/Disassembler
X.29 Specification for interaction between Packet Assembler/Disassembler and remote packet mode terminal

What is claimed is:

1. In a mobile satellite system including a satellite communication switching office having a satellite antenna for receiving/transmitting a satellite message via a satellite from/to a mobile communication system, a satellite interface system, a central controller receiving/transmitting the satellite message from/to the satellite communication switching office issued from the vehicle via the satellite and the satellite interface system, a method of managing a mobile satellite system and a mobile communication system responsively connected thereto for registration, said method comprising the steps of:

(a) requesting registration of the mobile communication system in the satellite communication system in a management system (CMIS) and creating a CMIS record;

(b) transmitting the CMIS record from the CMIS to a protocol conversion system (DM);

(c) converting, via the DM, the CMIS record to a common record;

(d) logging, via the DM, the common record in a message log with a log status of captured from the CMIS;

(e) transmitting, via the DM, the common record to a DM server corresponding thereto;

(f) receiving, via the DM server, the common record and updating the log status to started;

(g) storing, via the DM server, an object in a DM object table responsive to the registration request;

(h) determining, via the DM server, whether all messages including the common record have been received;

(i) repeating steps (e)–(h) until all the messages are received as determined in step (h);

(j) retrieving, by the DM server, when all the messages are received, data records from a database relating to the common record, validating the data and reformatting the registration request to be transmitted to the satellite communication system (CGS);

(k) updating, by the DM server, an outbound CGS queue for transmission of the registration request to the CGS;

(l) determining a communication status of the CGS before transmitting the registration request;

(m) transmitting, by the DM server, the registration request to the central controller of the CGS, and updating the log status to transmitted to the CGS;

(n) receiving, by the DM server, an acknowledgment that the central controller received the registration request;

(o) converting, by the DM server, the acknowledgment into the common record;

(p) logging, by the DM server, the log status to captured from the central controller with respect to the registration request;

(q) updating, by the DM server, a functional status of the registration request to acknowledged by the central controller;

(r) receiving, by the DM server, a registration acknowledgement from the central controller indicating that the registration request was completed by the CGS;

(s) converting, by the DM server, the registration acknowledgement into the common record and logging the registration acknowledgement as captured;

(t) updating, by the DM server, the functional status of the registration request to registered;

(u) formatting, by the DM server, a status change response;

(v) determining, by the DM server, the communication status of the CMIS before transmitting the status change response;

(w) transmitting, by the DM server, the status change response to the CMIS;

(x) receiving, by the DM server, a ready indication for a commissioning status message from the central controller;

(y) converting, by the DM server, the ready indication into the common record and logging the ready indication as captured;

(z) updating, by the DM server, the functional status of the registration request to ready for commissioning;

(aa) transmitting, by the DM server, the status change response to the CMIS indicating that the mobile communication system is ready to be commissioned;

(bb) receiving, by the DM server, an operational/failed status message indicating whether the mobile communication system was successfully commissioned;

(cc) converting, by the DM server, the operational/failed status message into the common record and logging the operational/failed status message as captured;

(dd) updating, by the DM server, the functional status of the registration request to one of operational and failed;

(ee) formatting the status change response reflecting the functional status updated in step (dd);

(ff) determining, by the DM server, the communication status of the CMIS before transmitting the status change response;

(gg) transmitting, by the DM server, the status change response to the CMIS indicating that the mobile communication system is the one of operational and failed;

(hh) updating, by the DM server, the functional status of the registration request to complete;

(ii) transmitting, by the DM server, each discrete transaction to the CMIS indicating that the registration request is complete.

2. A method of managing a mobile satellite system and a mobile communication system responsively connected thereto for registration according to claim 1, further comprising the step of performing a performance verification test on the mobile communication system to verify that the mobile communication system is the one of operational and failed.

3. A method of managing a mobile satellite system and a mobile communication system responsively connected thereto for registration according to claim 1, further comprising the step of collecting registration data from the CMIS record generated by step (a), and formatting the registration data for the registration request including at least one of mobile communication system equipment information, virtual network membership, mobile communication system access, requested service and call barring.

4. A method of managing a mobile satellite system and a mobile communication system responsively connected thereto for registration according to claim 1, further comprising the step of validating a registration request responsive to receipt in the registration request of only one mobile communication system equipment information, at least one virtual network membership, only one mobile communication system access, and at least one requested service received by the DM server.

5. A method of managing a mobile satellite system and a mobile communication system responsively connected thereto for registration according to claim 1, further comprising the step of chaining, by the DM server, discrete transactions related to each other comprising the registration request by the CMIS for transmission to the DM server.

6. A method of managing a mobile satellite system and a mobile communication system responsively connected thereto for registration according to claim 1, wherein the registration request and the registration acknowledgement are exchanged between the DM server, the CMIS and the CGS in near real-time.

7. In a mobile satellite system including a satellite communication switching office having a satellite antenna for receiving/transmitting a satellite message via a satellite from/to a mobile communication system, a satellite interface system, a central controller receiving/transmitting the satellite message from/to the satellite communication switching office issued from the vehicle via the satellite and the satellite interface system, a method of managing a mobile satellite system and a mobile communication system responsively connected thereto for registration, said method comprising the steps of:

(a) requesting registration of the mobile communication system in the satellite communication system in a management system (CMIS) and creating a CMIS record;

(b) transmitting the CMIS record from the CMIS to a protocol conversion system (DM);

(c) converting, via the DM, the CMIS record to a common record;

(d) transmitting, by the DM, the registration request to the central controller of the CGS, and updating the log status to transmitted to the COS;

(e) receiving, by the DM, a registration acknowledgement from the central controller indicating that the registration request was completed by the CGS; (f) converting, by the DM, the registration acknowledgement into the common record and logging the registration acknowledgement;

(g) transmitting, by the DM, the registration acknowledgement to the CMIS;

(h) receiving, by the DM, a ready indication for a commissioning status message from the central controller;

(i) converting, by the DM, the ready indication into the common record and logging the ready indication;

(j) transmitting, by the DM, the status change response to the CMIS indicating that the mobile communication system is ready to be commissioned;

(k) receiving, by the DM, an operational/failed status message indicating whether the mobile communication system was successfully commissioned;

(l) converting, by the DM, the operational/failed status message into the common record and logging the operational/failed status message; and (m) transmitting, by the DM, the status change response to the CMIS indicating that the mobile communication system is one of operational and failed.

8. A method of managing a mobile satellite system and a mobile communication system responsively connected thereto for registration according to claim 7, further comprising the step of performing a performance verification test on the mobile communication system to verify that the mobile communication system is the one of operational and failed.

9. A method of managing a mobile satellite system and a mobile communication system responsively connected thereto for registration according to claim 7, further comprising the step of collecting registration data from the CMIS record generated by step (a), and formatting the registration data for the registration request including at least one of mobile communication system equipment information, virtual network membership, mobile communication system access, requested service and call barring.

10. A method of managing a mobile satellite system and a mobile communication system responsively connected thereto for registration according to claim 7, further comprising the step of validating a registration request responsive to receipt in the registration request of only one mobile communication system equipment information, at least one virtual network membership, only one mobile communication system access, and at least one requested service received by the DM server.

11. A method of managing a mobile satellite system and a mobile communication system responsively connected thereto for registration according to claim 7, further comprising the step of chaining, by the DM server, discrete transactions related to each other comprising the registration request by the CMIS for transmission to the DM server.

12. A method of managing a mobile satellite system and a mobile communication system responsively connected thereto for registration according to claim 7, wherein the registration request and the registration acknowledgement are exchanged between the DM server, the CMIS and the CGS in near real-time.

13. In a mobile satellite system including a satellite communication switching office having a satellite antenna for receiving/transmitting a satellite message via a satellite from/to a mobile communication system, a satellite interface system, a central controller receiving/transmitting the satellite message from/to the satellite communication switching office issued from the vehicle via the satellite and the satellite interface system, a system for managing a mobile satellite system and a mobile communication system responsively connected thereto for registration, said system comprising:

means for requesting registration of the mobile communication system in the satellite communication system in a management system (CMIS) and creating a CMIS record;

means for transmitting the CMIS record from the CMIS to a protocol conversion system (DM);

means for converting the CMIS record to a common record;

means for transmitting the registration request to the central controller of the CGS, and updating the log status to transmitted to the CGS;

means for receiving a registration acknowledgement from the central controller indicating that the registration request was completed by the CGS;

means for converting the registration acknowledgement into the common record and logging the registration acknowledgement;

means for transmitting the registration acknowledgement to the CMIS;

means for receiving a ready indication for a commissioning status message from the central controller;

means for converting the ready indication into the common record and logging the ready indication;

means for transmitting the status change response to the CMIS indicating that the mobile communication system is ready to be commissioned;

means for receiving an operational/failed status message indicating whether the mobile communication system was successfully commissioned;

means for converting the operational/failed status message into the common record and logging the operational/failed status message; and means for transmitting the status change response to the CMIS indicating that the mobile communication system is one of operational and failed.

14. A system for managing a mobile satellite system and a mobile communication system responsively connected thereto for registration according to claim 13, further comprising means for performing a performance verification test on the mobile communication system to verify that the mobile communication system is the one of operational and failed.

15. A system for managing a mobile satellite system and a mobile communication system responsively connected thereto for registration according to claim 13, further comprising means for collecting registration data from the CMIS record, and for formatting the registration data for the registration request including at least one of mobile communication system equipment information, virtual network membership, mobile communication system access, requested service and call barring.

16. A system for managing a mobile satellite system and a mobile communication system responsively connected thereto for registration according to claim 13, further comprising means for validating a registration request responsive to receipt in the registration request of only one mobile communication system equipment information, at least one virtual network membership, only one mobile communication system access, and at least one requested service received by the DM server.

17. A system for managing a mobile satellite system and a mobile communication system responsively connected thereto for registration according to claim 13, further comprising means for chaining, by the DM server, discrete transactions related to each other comprising the registration request by the CMIS for transmission to the DM server.

18. A system for managing a mobile satellite system and a mobile communication system responsively connected thereto for registration according to claim 13, wherein the registration request and the registration acknowledgement are exchanged between the DM server, the CMIS and the CGS in near real-time.

19. In a mobile satellite system including a satellite communication switching office having a satellite antenna for receiving/transmitting a satellite message via a satellite from/to a mobile communication system, a satellite interface system, a central controller receiving/transmitting the satellite message from/to the satellite communication switching office issued from the vehicle via the satellite and the satellite interface system, a system for managing a mobile satellite system and a mobile communication system responsively connected thereto for registration, said system comprising:

a management system (CMIS) requesting registration of the mobile communication system in the satellite communication system and creating a CMIS record responsive thereto, and transmitting the CMIS record;

a protocol conversion system (DM), responsively connected to said CMIS, said DM performing the following functions:

receiving and converting the CMIS record to a common record, and transmitting the registration request to the central controller of the CGS, and updating the log status to transmitted to the CGS;

receiving a registration acknowledgement from the central controller indicating that the registration request was completed by the CGS;

converting the registration acknowledgement into the common record and logging the registration acknowledgement;

transmitting the registration acknowledgement to the CMIS;

receiving a ready indication for a commissioning status message from the central controller;

converting the ready indication into the common record and logging the ready indication;

transmitting the status change response to the CMIS indicating that the mobile communication system is ready to be commissioned;

receiving an operational/failed status message indicating whether the mobile communication system was successfully commissioned;

converting the operational/failed status message into the common record and logging the operational/failed status message; and transmitting the status change response to the CMIS indicating that the mobile communication system is one of operational and failed.

20. In a mobile satellite system including a satellite communication switching office having a satellite antenna for receiving/transmitting a satellite message via a satellite from/to a mobile communication system, a satellite interface system, a central controller receiving/transmitting the satellite message from/to the satellite communication switching office issued from the vehicle via the satellite and the satellite interface system, a system for managing a mobile satellite system and a mobile communication system responsively connected thereto for registration, said system comprising:

a management system (CMIS) requesting registration of the mobile communication system in the satellite communication system and creating a CMTS record responsive thereto, and transmitting the CMIS record;

a protocol conversion system (DM), responsively connected to said CMIS, said DM performing the following functions:

receiving and converting the CMIS record to a common record, and transmitting the registration request to the central controller of the CGS for processing of the registration request;

receiving a registration acknowledgment from the central controller indicating that the registration request was completed by the CGS, and converting the registration acknowledgment into the common record;

transmitting the registration acknowledgment to the CMIS;

transmitting a ready message the CMIS indicating that the mobile communication system is ready to be commissioned;

receiving a status message from the central controller indicating whether the mobile communication system was successfully commissioned;

converting the status message into the common record, and transmitting the status message to the CMIS indicating that the mobile communication system is one of operational and failed.

21. A satellite network system comprising:

a satellite antenna for receiving and transmitting messages via a satellite and satellite beams to and from feederlink earth stations (FESS) connected to at least one land line communications network and mobile earth terminals (METs) of a mobile communication system;

a satellite communication switching office connected to said antenna and coupled through a satellite interface system to a central controller; and a network operations center (NOC) for managing and controlling resources of the satellite network system, the NOC communicating with various internal and external entities via a control network;

a first management system (NCC) transmitting first information to, and receiving second information from, the network operations center, said management system allocating system resources, and updating network functions;

a second management system (CMIS) requesting registration of the mobile communication system in the satellite communication system and creating a CMIS record responsive thereto, and transmitting the CMIS record; and a protocol conversion system (DM), responsively connected to said CMIS, said DM receiving and converting the CMIS record to a common record, and transmitting the registration request to the network operations controller of the satellite network system for processing, wherein said NCC further sets up the call, initiates a call record with information on satellite usage, and hands off the call to the satellite communication switching office, wherein at call completion, said NCC tears down the call and sends a performance record to the NOC, and a switch record is also forwarded to the NOC at call completion from the satellite communication switching office, wherein the NOC merges the call and switch records to produce a call summary record, and the NOC bundles one or more call summary records before transmitter to the DM for conversion and transmission to said CMIS.

22. In a mobile satellite system including a satellite communication switching office and network system having a satellite antenna for receiving and transmitting a satellite message via a satellite and satellite beams to and from feederlink earth stations (FESs) and mobile earth terminals (METs) using a mobile communication system, a satellite interface system, a central controller receiving and transmitting the satellite message to and from the satellite communication switching office, the mobile satellite system being responsively connected to said mobile communication system and comprising:

a network operations center (NOC) managing and controlling the resources of the satellite network system and carrying out the administrative functions associated with the management of the network system, the NOC communicating with various internal and external entities via a control network;

a first network communications controller (NCC) managing the real time allocation of circuits between METs and FESs for the purposes of supporting communications, available circuits being held in circuit pools managed by group controllers (GCs) within the NCC, the NCC communicating with the NOC via a satellite network internet work, with FESs via interstation signaling channels or terrestrial links, and with METs via signaling channels;

a FES supporting communications links between METs, the public switched telephone network (PSTN), private networks, and other METs, call completion and service feature management being accomplished via signaling over the communication channel following the establishment of a channel, the FES including a gateway FES providing at least one of mobile telephone service (MTS) and mobile telephone cellular roaming service (MTCRS) services, and an optional base FES providing mobile radio service (MRS) and net radio (NR) services; and a group controller subsystem (GCS) incorporating one or multiple group controllers (GC), each GC controlling every call in progress within its control group and allocating and de-allocating circuits for FES-MET calls, managing MET authentication, and providing elements of call accounting, the GC optionally providing satellite bandwidth resources to the NOC for AMS(R)S resource provisioning and monitoring the performance of call processing and satellite circuit pool utilization, and performing MET management, and optionally commissioning, periodic performance verification testing and database management;

a billing management system (CMIS) for billing of the mobile communication system usage in the satellite communication system;

a protocol conversion system (DM), responsively connected to said CMIS and said NOC, and said DM converting messages transmitted therebetween, wherein said group controller further sets up the call, initiates a call record with information on satellite usage, and hands off the call to the satellite communication switching office, wherein at call completion, the GC tears down the call and sends a performance record to the NOC, and a switch record is also forwarded to the NOC at call completion from the satellite communication switching office, wherein the NOC merges the call and switch records to produce a call summary record, and the NOC bundles one or more call summary records before transmitting to the DM for conversion and transmission to said CMIS.

23. In a mobile satellite system according to claim 22, wherein the transmission between the NOC and the DM is an unsolicited event occurring on a one-way logical link from the NOC to the DM.

24. In a mobile satellite system according to claim 22, wherein the DM is integral with, or within, the CMIS.

25. A mobile satellite system, comprising:

a network operations center (NOC) managing and controlling the resources of the satellite network system and carrying out the administrative functions associated with the management of the network system, the NOC communicating with various internal and external entities via a control network;

a network communications controller (NCC) managing the real time allocation of circuits for supporting communications, available circuits being held in circuit pools managed by group controllers (GCs) within the NCC, the NCC communicating with the NOC, and with mobile communication systems (METs);

a feeder link earth station (FES) supporting communications links between the METs, at least one public switched telephone network (PSTN), private networks, and other METs, and call completion and service feature management being accomplished via signaling over the communication channel, the FES including a gateway FES providing at least one of mobile telephone service (MTS) and mobile telephone cellular roaming service (MTCRS) services, and an optional base FES providing mobile radio service (MRS) and net radio (NR) services;

a group controller subsystem (GCS) incorporating one or multiple group controllers (GC), each GC controlling every call in progress within its control group and allocating and de-allocating circuits for FES-MET calls, managing MET authentication, and providing elements of call accounting, the GC optionally providing satellite resources to the NOC for priority resource provisioning and monitoring call processing and satellite circuit pool utilization, and performing MET management, and optionally one of commissioning, periodic performance verification testing and database management;

a billing management system (CMIS) for billing of the mobile communication system usage in the satellite communication system;

a protocol conversion system (DM), responsively connected to said CMIS and said NOC, and said DM converting messages transmitted therebetween for the billing of the mobile communication system usage in the satellite communication system, wherein said group controller further sets up the call, initiates a call record with information on satellite usage, and hands off the call to the satellite communication switching office, wherein at call completion, the GC tears down the call and sends a performance record to the NOC, and a switch record is also forwarded to the NOC at call completion from a satellite communication switching office, wherein the NOC merges the call and switch records to produce a call summary record, and the NOC bundles one or more call summary records before transmitting to the DM for conversion and transmission to said CMIS.

26. In a mobile satellite system, including a network operations center (NOC) managing and controlling the resources of the satellite network system and performing administrative functions, the NOC communicating with various internal and external entities via a control network; a network communications controller (NCC) managing the real time allocation of circuits for supporting communications, available circuits being held in circuit pools managed by group controllers (GCs) within the NCC, the NCC communicating with the NOC, and with mobile communication systems (METs); a feeder link earth station (FES) supporting communications links between the METs, at least one public switched telephone network (PSTN), private networks, and other METS, and supporting call completion and service feature management, the FES including a gateway FES providing at least one of mobile telephone service (MTS) and mobile telephone cellular roaming service (MTCRS), and an optional base FES providing at least one of mobile radio service (MRS) and net radio (NR) services; a group controller subsystem (GCS) incorporating one or multiple group controllers (GC), each GC controlling allocating and de-allocating circuits, optionally at least one of managing authentication, call accounting, providing satellite resources to the NOC for priority resource provisioning, monitoring call processing and satellite circuit pool utilization, performing MET management, commissioning, performing periodic performance verification testing and database management, a satellite communication billing system, comprising:

a billing management system (CMIS) billing mobile communication system usage in the satellite communication system;

a protocol conversion system (DM), responsively connected to said CMIS and said NOC, and said DM converting messages transmitted therebetween for the billing of the mobile communication system usage in the satellite communication system, wherein said group controller further sets up the call, initiates a call record with information on satellite usage, and hands off the call to the satellite communication switching office, wherein at call completion, the GC tears down the call and sends a performance record to the NOC, and a switch record is also forwarded to the NOC at call completion from a satellite communication switching office, wherein the NOC merges the call and switch records to produce a call summary record, and the NOC bundles one or more call summary records before transmitting to the DM for conversion and transmission to said CMIS.

* * * * *